(12) United States Patent
Matsubayashi

(10) Patent No.: US 8,485,304 B2
(45) Date of Patent: Jul. 16, 2013

(54) BRAKE OPERATION STRUCTURE AND BRAKE/DIFFERENTIAL-LOCK OPERATION STRUCTURE

(75) Inventor: Toshikazu Matsubayashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 606 days.

(21) Appl. No.: 12/678,633

(22) PCT Filed: Sep. 10, 2008

(86) PCT No.: PCT/JP2008/066284
§ 371 (c)(1),
(2), (4) Date: Mar. 17, 2010

(87) PCT Pub. No.: WO2009/037997
PCT Pub. Date: Mar. 26, 2009

(65) Prior Publication Data
US 2010/0200341 A1 Aug. 12, 2010

(30) Foreign Application Priority Data

Sep. 18, 2007 (JP) ................................ 2007-241388
Oct. 3, 2007 (JP) ................................ 2007-259723
Oct. 3, 2007 (JP) ................................ 2007-259724
Oct. 19, 2007 (JP) ................................ 2007-273141
Oct. 25, 2007 (JP) ................................ 2007-277161

(51) Int. Cl.
*B60T 7/04* (2006.01)
*B60K 17/04* (2006.01)

(52) U.S. Cl.
USPC .......................................... 180/364; 180/336

(58) Field of Classification Search
USPC ............... 74/471 R, 473.15, 473.3, 481, 485, 74/527, 528, 532; 188/2 D, 71.5, 106 A, 106 P; 180/336, 364, 370; 192/215
See application file for complete search history.

(56) References Cited

U.S. PATENT DOCUMENTS 4,629,023 A * 12/1986 Carpanelli et al. ............ 180/357
6,708,805 B2 * 3/2004 Samejima et al. .......... 192/13 A
(Continued)

FOREIGN PATENT DOCUMENTS

JP 2003-185000 7/2003
JP 2003-220933 8/2003
(Continued)

OTHER PUBLICATIONS

International Search Report for International Application No. PCT/JP2008/066284, Japanese Patent Office mailed Dec. 16, 2008, 2 pgs.

(Continued)

*Primary Examiner* — Christopher Schwartz
(74) *Attorney, Agent, or Firm* — Sterne, Kessler, Goldstein & Fox P.L.L.C.

(57) ABSTRACT

The present invention provides a brake operation structure capable of realizing facilitation of adjustment work of a brake operation mechanism for operating a brake mechanism based on manual operation. The brake operation structure includes a brake operation mechanism that rotates a brake pressing member of the brake mechanism about a rotational axis line into a brake actuation direction in accordance with manual operation, and a brake adjustment mechanism that adjusts an initial position of the brake pressing member around the rotational axis line at a time when the brake operation mechanism is not in operation. The brake adjustment mechanism is inserted in the brake operation mechanism at a position allowing the brake adjustment mechanism to be accessed from above a fender trough an opening that is provided at the fender for allowing a driver's seat support frame to be mounted.

2 Claims, 36 Drawing Sheets

U.S. PATENT DOCUMENTS

| | | | |
|---|---|---|---|
| 7,213,674 B2 * | 5/2007 | Maeda et al. | 180/364 |
| 2004/0140146 A1 * | 7/2004 | Maeda et al. | 180/364 |

FOREIGN PATENT DOCUMENTS

| | | |
|---|---|---|
| JP | 2003-320963 | 11/2003 |
| JP | 2006-290121 | 10/2006 |
| JP | 2007-055281 | 3/2007 |

OTHER PUBLICATIONS

International Preliminary Report on Patentability for International Appl. No. PCT/JP2008/066284, providing the Written Opinion of the International Search Authority, mailed on Jun. 10, 2010, 7 pages.

\* cited by examiner

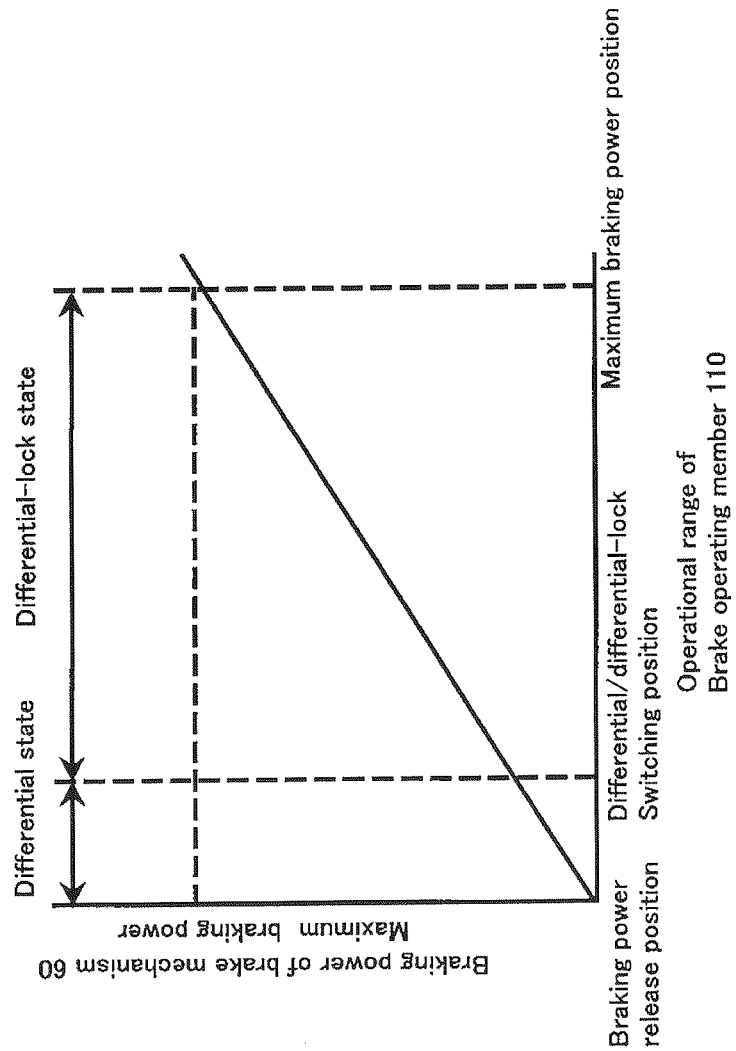

BRAKE OPERATION STRUCTURE AND BRAKE/DIFFERENTIAL-LOCK OPERATION STRUCTURE

BACKGROUND OF THE INVENTION

1. Field of the Invention

The present invention relates to a brake operation structure applied to a working vehicle including a friction-plate type brake mechanism, a transmission case that accommodates the brake mechanism, a driver's seat that is disposed above the transmission case, and a fender that covers a side of the driver's seat.

The present invention also related to a brake/differential-lock operation structure applied to a working vehicle including a friction-plate type brake mechanism and a differential mechanism capable of switching between a differential state and a differential-lock state.

2. Background Art

There is known a brake operation structure used for operating a friction-plate type brake mechanism that includes group of friction plates and a brake pressing member and is configured so that, in accordance with rotation of the brake pressing member about a rotational axis line into a brake actuation direction, the group of friction plates are brought into frictional contact with each other to operatively apply braking power to a drive axle. The brake operation structure is provided with a brake adjustment mechanism that is capable of adjusting an initial position of the brake pressing member around the rotational axis line at which the brake pressing member is positioned when the brake operating member is located at a brake release position (see Patent Document 1 to be described later, for example).

More specifically, the brake operation structure operatively connects the brake operating member and the brake pressing member so that the brake pressing member is rotated about the rotational axis line by an amount corresponding to a manual operation amount of the brake operating member. The group of friction plates are brought into frictional contact with each other at a level corresponding to the rotation amount of the brake pressing member about the rotational axis.

That is, the brake mechanism is set to generate braking power by the magnitude corresponding to the manual operation amount of the brake operating member. However, if the group of friction plates are abraded way or worn out, there is caused change in the relationship between the manual operation amount of the brake operating member and the level of frictional contact in the group of friction plates (that is, the magnitude of braking power generated by the brake mechanism). As a result, the brake mechanism may be incapable of generating sufficient braking power despite the fact that the brake operating member is manipulated by a predetermined amount.

The brake adjustment mechanism is provided in order to prevent such a defect.

However, the conventional brake operation structure had a problem of difficulty in operating the brake adjustment mechanism since the brake adjustment mechanism is disposed below the step of the working vehicle.

FIGS. 16A and 16B are a schematic side view and a schematic plan view of conventional brake operation structure, respectively.

As shown in FIGS. 16A and 16B, the conventional brake operation structure includes a brake operating member 1110, a brake operation shaft 1120, a brake actuating member 1130, a brake release biasing member (not shown), a brake control shaft 1160, a brake link member 1140, and a brake control atm 1150. The brake operating member 1110 can be manually operated. The brake operation shaft 1120 is rotated around its axis line in accordance with manual operation on the brake operating member 1110. The brake actuating member 1130 is supported by the brake operation shaft 1120 in a relatively non-rotatable manner with respect thereto. The brake release biasing member biases the brake actuating member 1130 toward a brake release position. The brake control shaft 1160 is supported by one of side walls of a transmission case 40 in a rotatable manner around its axis line in a state of straddling the one side wall so as to be extended inside and outside the transmission case 40 and being along the vehicle width direction. Axial rotation of the brake control shaft 1160 into the brake actuation direction causes the brake pressing member 63 to rotate about a rotational axis line 63X into the brake actuation direction. The brake link member 1140 has a first end operatively connected to the brake actuating member 1130 so as to be axially shifted in accordance with rotation of the brake actuating member 1130 about the brake operation shaft 1120. The brake control arm 1150 is connected to the brake control shaft 1160 in a relatively non-rotatable manner with respect thereto and is also connected with a second end of the brake link member 1140. A brake adjustment mechanism 1200 is inserted within the brake link member 1140 that is disposed below the step with being along a vehicle lengthwise direction.

In the conventional configuration described above, a worker is required to go underneath the step or to detach the step in order to reach the brake adjustment mechanism 1200, so that adjustment of the brake adjustment mechanism 1200 has been a troublesome job.

Patent Document 1 also discloses a brake/differential-lock operation structure applied to a working vehicle including a differential mechanism that switches between a differential state and a differential-lock state in accordance with a position of a differential-lock shaft in its axis line direction, and a friction-plate type brake mechanism that has group of friction plates and a brake pressing member and is configured so that, upon rotation of the brake pressing member about a rotational axis line into a brake actuation direction, the group of friction plates are brought into frictional contact with each other to operatively apply braking power to a travel power transmission path. The brake/differential-lock operation structure shifts the differential mechanism from the differential state into the differential-lock state in association with the brake operation of causing the brake mechanism to be shifted from the brake release state into the brake actuation state while allowing independent switch operation of the differential mechanism.

The brake/differential-lock operation structure is particularly useful in such a working vehicle in which the brake mechanism is disposed so as to apply braking power to a portion of the travel power transmission path that is positioned on an upstream side of the differential mechanism in the power transmission direction.

The brake/differential-lock operation structure operatively connects the brake operating member and the brake pressing member so that the brake pressing member is rotated about the rotational axis line by an amount corresponding to the manual operation amount on a brake operating member included in the working vehicle. Further, the group of friction plates are brought into frictional contact with each other at a level corresponding to the amount of rotation of the brake pressing member about the rotational axis line.

More specifically, the brake mechanism is set to generate braking power by the magnitude corresponding to the manual operation amount of the brake operating member. However, if the group of friction plates are abraded away, the relationship between the manual operation amount of the brake operating member and the level of frictional contact of the group of friction plates (that is, the magnitude of braking power generated by the brake mechanism) is changed. As a result, the brake mechanism may be incapable of generating sufficient braking power despite the fact that the brake operating member is manually operated by the predetermined amount.

In this regard, the conventional brake/differential-lock operation structure is provided with a brake adjustment mechanism.

The brake adjustment mechanism is capable of adjusting the position of the brake pressing member around the rotational axis line (that is, the initial position of the brake pressing member) in a case where the brake operating member is located at the brake release position.

The conventional brake/differential-lock operation structure with the brake adjustment mechanism is capable of maintaining appropriate relationship between the manual operation amount of the brake operating member and the level of frictional contact of the group of friction plates even in a case where the group of friction plates are abraded. On the other hand, readjustment of the brake adjustment mechanism changes an initial relative position between the brake operating member and a differential-lock pressing member, which is to be described later, thereby requiring readjustment of a link mechanism between the brake operating member and the differential-lock pressing member and/or readjustment of a link mechanism between the differential-lock operating member and the differential-lock pressing member.

FIGS. 16A and 16B are a pattern side view and a pattern plan view each showing the conventional brake/differential-lock operation structure.

As shown in FIGS. 16A and 16B, the conventional brake/differential-lock operation structure includes a brake operating member 1110, a brake operation shaft 1120, a brake actuating member 1130, a brake release biasing member (not shown), a brake control shaft 1160, a brake link member 1140, a brake control arm 1150, a differential-lock interlocking rod 1170, a first differential-lock pressing member 1180, a differential-lock operating member 1310, a differential biasing member (not shown), a differential-lock link member 1320, and a second differential-lock pressing member 1330. The brake operation shaft 1120 is rotated around its axis line in accordance with manual operation on the brake operating member 1110. The brake actuating member 1130 is supported by the brake operation shaft 1120 in a relatively non-rotatable manner with respect thereto. The brake release biasing member biases the brake actuating member 1130 toward a brake release position. The brake control shaft 1160 is rotatable about an axis line parallel to the rotational axis line 63X of the brake pressing member 63, and causes the brake pressing member 63 to rotate about the rotational axis line 63X into the brake actuation direction in accordance with rotation of the brake control shaft 1160 into the brake actuation direction. The brake link member 1140 has a first end operatively connected to the brake actuating member 1130 so as to be axially shifted in accordance with rotation of the brake actuating member 1130 about the brake operation shaft 1120. The brake control arm 1150 is connected to the brake control shaft 1160 in a relatively non-rotatable manner with respect thereto and has a first arm portion 1151 connected with a second end of the brake link member 1140 and a second arm portion 1152 provided separately from the first arm portion 1151. The differential-lock interlocking rod 1170 has a first end connected to the second arm portion 1152 so as to be axially shifted in accordance with rotation of the brake control arm 1150 about the brake control shaft 1160. The first differential-lock pressing member 1180 is rotatable about a first differential-lock control shaft 1180X that is substantially along the vertical direction, and has a connection portion 1181 connected to a second end of the differential-lock interlocking rod 1170 and a press portion 1182 axially pressing the differential-lock shaft 56. The first differential-lock pressing member 1180 is turned about the first differential-lock control shaft 1180X into the differential-lock direction via the differential-lock interlocking rod 1170 in association with movement of the brake control arm 1150 in a case where the brake operating member 1110 is shifted from the brake release position to the brake actuation position, so that the press portion 1182 presses the differential-lock shaft 56 toward the differential-lock position. The differential-lock operating member 1310 is supported in a rotatable manner about a differential-lock operation shaft 1310X. The differential biasing member biases the differential-lock operating member 1310 about the differential-lock operation shaft 1310X toward the differential position. The differential-lock link member 1320 has a first end operatively connected to the differential-lock operating member 1310 so as to be axially shifted in accordance with rotation of the differential-lock operating member 1310 about the differential-lock operation shaft 1310X. The second differential-lock pressing member 1330 is rotatable about a second differential-lock control shaft 1330X that is along the vertical direction, and has a connection portion 1331 operatively connected to a second end of the differential-lock link member 1320 and a press portion 1332 axially pressing the differential-lock shaft 56. The second differential-lock pressing member 1330 is turned about the second differential-lock control shaft 1330X into the differential-lock direction in accordance with movement of the differential-lock link member 1320 upon the differential-lock operating member 1310 being shifted from the differential position to the differential-lock position, so that the press portion 1332 presses the differential-lock shaft 56 toward the differential-lock position.

As shown in FIG. 16A, a brake adjustment mechanism 1200 is inserted within the brake link member 1140.

In the conventional configuration described above, readjustment of the relative position between the brake operating member 1110 and the brake control shaft 1160 by operating the brake adjustment mechanism 1200 also changes the relative position between the first differential-lock pressing member 1180 and the brake operating member 1110. Thus, in some cases, the first differential-lock pressing member 1180 unfavorably presses the differential-lock shaft 56 into the differential-lock direction despite the fact that the brake operating member 1110 is not manually operated.

The relative position among the brake operating member 1110, the brake control arm 1150, and the first differential-lock pressing member 1180 may be appropriately maintained by readjusting the initial position of the differential-lock shaft 56 after readjustment of the brake adjustment mechanism 1200. In this case, however, readjustment is also required to the differential-lock operation path connecting from the differential-lock operating member 1310 to the second differential-lock pressing member 1330.

Furthermore, sufficient consideration has not been made to the conventional brake/differential-lock operation structure in regard to the timing of switching the differential mechanism from the differential state into the differential-lock state in association with the manual operation on the brake operating member.

More specifically, the brake operation mechanism is configured such that the brake mechanism generates braking power by the magnitude corresponding to the manual operation amount of the brake operating member. In other words, the brake mechanism is shifted from a braking power release state into a maximum braking power generation state in accordance with the manual operation on the brake operating member from a braking power release position to a maximum braking power generation position.

Upon such brake operation, assume that the differential mechanism is shifted from the differential state into the differential-lock state after the brake mechanism is brought into the maximum braking power generation state. In this case, the maximum braking power is applied to the input portion of the differential mechanism in a state where a pair of drive axles are differentially driven. Accordingly, the working vehicle may turn in an unintended direction at the time when stopping the working vehicle by the braking power of the brake mechanism.

Particularly in a state where the pair of drive axles receive traveling loads unequal to each other as in traveling across an inclined road, upon stopping the working vehicle by braking power of the brake mechanism, the braking power may not be effectively applied to the drive axle receiving a smaller traveling load, thereby increasing the danger of causing the working vehicle to turn in an unintended direction.

To the contrary, considered is a case where the brake mechanism is configured to start generation of braking power after the differential mechanism is shifted from the differential state into the differential-lock state upon the brake operation. In this case, if the brake mechanism is actuated while the working vehicle is making a turn, braking power of the brake mechanism is applied to the travel power transmission path with the differential mechanism being in the differential-lock state. Therefore, one of driving wheels that is positioned on an outer side with turning center as a reference unfavorably slips.

Prior document 1: Japanese unexamined patent application publication No. 2007-055281

BRIEF SUMMARY OF THE INVENTION

In view of the above conventional art, it is a first object of the present invention to provide a brake operation structure applicable to a working vehicle including a friction-plate type brake mechanism, wherein the brake operation structure is capable of realizing facilitation of adjustment work, in accordance with abrasion of group of friction plates, with use of a brake adjustment mechanism that adjusts an initial position of a brake pressing member relative to a brake operating member, the group of the frictional plates of the brake mechanism being shifted into frictional contact with each other in response to positioning of the braking pressing member at the initial position.

Further, it is a second object of the present invention to provide a brake/differential-lock operation structure applicable to a working vehicle including a friction-plate type brake mechanism and a differential mechanism, wherein the brake/differential-lock operation structure includes a brake operation mechanism that rotates a brake pressing member of the friction-plate type brake mechanism about a rotational axis line into a brake actuation direction in accordance with manual operation, a differential-lock operation mechanism that switches a transmission state of the differential mechanism in accordance with manual operation, and a brake adjustment mechanism that adjusts an initial position of the brake pressing member around the rotational axis line at a time when the brake operation mechanism is not in operation, and wherein the brake/differential-lock operation structure is capable of shifting the differential mechanism into a differential-lock state in association with operation on the brake operation mechanism while allowing an independent operation of the differential-lock operation mechanism, and is further capable of preventing readjustment by the brake adjustment mechanism from influencing neither an operation path used for shifting the differential mechanism into the differential-lock state in association with the brake operation mechanism nor an operation path used for independently shifting the differential mechanism into the differential-lock state via the differential-lock operation mechanism.

Moreover, it is a third object of the present invention to provide a brake/differential-lock operation structure applicable to a working vehicle including a differential mechanism that switches between a differential state and a differential-lock state in accordance with an axial position of a differential-lock shaft, and a friction-plate type brake mechanism that has group of friction plates and a brake pressing member, the friction-plate type mechanism being configured so that the group of friction plates are brought into frictional contact with each other by a magnitude corresponding to a rotation amount of the brake pressing member about a rotational axis line into a brake actuation direction to apply braking power to a portion of a travel power transmission path that is positioned on an upstream side of the differential mechanism in the power transmission direction, wherein the brake/differential-lock operation structure includes a brake operation mechanism that rotates the brake pressing member about the rotational axis line into the brake actuation direction in accordance with manual operation, and a differential-lock operation mechanism that switches the transmission state of the differential mechanism in accordance with manual operation, wherein the brake/differential-lock operation structure is capable of applying braking power equally to a pair of drive axles in a case where the brake mechanism is in the maximum braking power generation state as in brake operation or the like for stopping the working vehicle, and wherein, the brake/differential-lock operation structure is further capable of applying braking power of the brake mechanism to the travel power transmission path with differential operation of the differential mechanism being maintained in a case where the travel speed of the working vehicle is reduced by braking power of the brake mechanism as in brake operation or the like at the time when the working vehicle is making a turn.

The present invention provides, in order to achieve the first object, a brake operation structure applied to a working vehicle including a friction-plate type brake mechanism that has group of friction plates and a brake pressing member and is configured so that, in accordance with rotation of the brake pressing member about a rotational axis line into a brake actuation direction, the group of friction plates are brought into frictional contact with each other to operatively apply braking power to a drive axle, a transmission case that accommodates the brake mechanism, a driver's seat that is supported on an upper surface of the transmission case via a driver's seat support frame, and a fender that covers a side of the driver's seat; the brake operation structure comprising a brake operation mechanism that rotates the brake pressing member about the rotational axis line into the brake actuation direction in accordance with manual operation, and a brake adjustment mechanism that adjusts an initial position of the brake pressing member around the rotational axis line at a time when the brake operation mechanism is not in operation; wherein the brake adjustment mechanism is inserted in the brake operation mechanism at a position allowing the brake adjustment mechanism to be accessed from above the fender trough an opening that is provided at the fender for allowing the driver's seat support frame to be mounted.

The brake operation structure according to the present invention makes it possible to facilitate access to the brake adjustment mechanism in comparison with a conventional structure since the brake adjustment mechanism is interposed in the brake operation mechanism so as to be located at a position allowing the brake adjustment mechanism to be accessed from above the fender trough the opening that is provided at the fender for allowing the driver's seat support frame to be mounted.

The present invention also provides, in order to achieve the first object, a brake operation structure applied to a working vehicle including a friction-plate type brake mechanism that has group of friction plates and a brake pressing member and is configured so that, in accordance with rotation of the brake pressing member about a rotational axis line into a brake actuation direction, the group of friction plates are brought into frictional contact with each other to operatively apply braking power to a drive axle, a transmission case that accommodates the brake mechanism, a driver's seat that is disposed above the transmission case, a fender that covers a side of the driver's seat and to which a lever guide member is detachably mounted so as to cover a lever opening formed in the fender, and a speed change lever that is disposed so that grip portion thereof is positioned beside the driver's seat and above the fender trough a guide hole formed in the lever guide member; the brake operation structure comprising a brake operation mechanism that rotates the brake pressing member about the rotational axis line into the brake actuation direction in accordance with manual operation, and a brake adjustment mechanism that adjusts an initial position of the brake pressing member around the rotational axis line at a time when the brake operation mechanism is not in operation; wherein the brake adjustment mechanism is inserted in the brake operation mechanism at a position allowing the brake adjustment mechanism to be accessed from above the fender trough the lever opening that appears by detaching the lever guide member from the fender.

The brake operation structure according to another aspect of the present invention makes it also possible to facilitate access to the brake adjustment mechanism in comparison with a conventional structure since the brake adjustment mechanism is interposed in the brake operation mechanism so as to be located at a position allowing the brake adjustment mechanism to be accessed from above the fender trough the lever opening that appears by detaching the lever guide member from the fender.

In each of the above configurations, the brake operation mechanism preferably includes a brake operating member capable of being manually operated, a brake operation shaft that is rotated around its axis line in accordance with manual operation on the brake operating member, a brake actuating member that is supported by the brake operation shaft in a relatively non-rotatable manner with respect thereto, a brake release biasing member that operatively biases a brake operating-side link mechanism, which includes the brake operating member, the brake operation shaft and the brake actuating member, toward a brake release position, a brake control shaft that is supported in a rotatable manner around its axis line by one of side walls of the transmission case so as to extend across inside and outside of the transmission case in a state of being along the vehicle width direction, the brake control shaft rotating the brake pressing member about the rotational axis line into the brake actuation direction as the brake control shaft being rotated around the axis line into a brake actuation direction, and a brake operated-side link mechanism that operatively connects the brake operating-side link mechanism to the brake control shaft so that the brake control shaft is rotated around the axis line by an angle corresponding to manual operation amount of the brake operating member.

The brake operated-side link mechanism includes a first operated-side link member that has a first end operatively connected to the brake actuating member so as to be shifted along its axis line in accordance with rotation of the brake actuating member about the brake operation shaft, a brake control arm that has a proximal end connected to the brake control shaft so as to be relatively non-rotatable manner with respect thereto, a second operated-side link member that has a proximal end connected to the brake control arm in a rotatable manner about an axis line parallel to the brake control shaft and is positioned upward as it goes from the proximal end to a free end, and a connecting member that is supported in a rotatable manner by a pivot shaft parallel to the brake control shaft and has a first arm portion connected to a second end of the first operated-side link member and a second arm portion connected to the free end of the second operated-side link member.

The break adjustment mechanism is provided at the free end side of the second operated-side link member so as to change a connecting position at which the second arm portion is connected to the second operated-side link member.

The brake adjustment mechanism may include a slit that is formed on the free end side of the second operated-side link member so as to be along the axial line direction, an engagement projection that is provided on the second arm portion of the connecting member and is engaged into the slit, and a position-adjusting member that is capable of adjusting a position, in the longitudinal direction of the slit, at which the engagement projection is engaged into the slit.

The position-adjusting member may include a hollow guide member that is fixed to the second operated-side link member so as to have an axis line aligned along the longitudinal direction of the slit, a bolt member that is inserted through the guide member and has a proximal end connected to the engagement projection, and an adjusting nut in which the bolt member is screwed while being in contact with an upper end surface of the guide member.

The present invention further provides, in order to achieve the second object, a brake/differential-lock operation structure applied to a working vehicle including a differential mechanism that switches between a differential state and a differential-lock state in accordance with an axial position of a differential-lock shaft, and a friction-plate type brake mechanism that has group of friction plates and a brake pressing member, the friction-plate type mechanism being configured so that, upon rotation of the brake pressing member around an rotational axis line into a brake actuation direction, the group of friction plates are brought into frictional contact with each other to apply braking power to a portion of a travel power transmission path that is positioned on an upstream side of the differential mechanism in the power transmission direction; the brake/differential-lock operation structure including a brake operation mechanism that rotates the brake pressing member about the rotational axis line into the brake actuation direction in accordance with manual operation, a differential-lock operation mechanism that switches the transmission state of the differential mechanism in accordance with manual operation, and a brake adjustment mechanism that adjusts an initial position of the brake pressing member around the rotational axis line at a time when the brake operation mechanism is not in operation; the brake/differential-lock operation structure further including a brake and differential-lock interlock/prevention mechanism that causes the brake operation mechanism and the differential-lock operation mechanism to be interacted with each other such that the differential mechanism is brought into the differential-lock state in association with braking operation of the brake operation mechanism, while allowing the differential-lock operation mechanism to be independently operated, and the brake adjustment mechanism being inserted into the brake operation mechanism so as to be positioned on a downstream side, in the operational power transmission direction, of a connected portion of the brake operation mechanism at which the brake and differential-lock interlock/prevention mechanism is connected to the brake operation mechanism.

Since the brake/differential-lock operation structure according to the present invention includes the brake and differential-lock interlock/prevention mechanism that causes the brake operation mechanism and the differential-lock operation mechanism to be interacted with each other such that the differential mechanism is brought into the differential-lock state in association with braking operation of the brake operation mechanism, while allowing the differential-lock operation mechanism to be independently operated, and causes the brake adjustment mechanism to be inserted into the brake operation mechanism so as to be positioned on a downstream side, in the operational power transmission direction, of the connected portion of the brake operation mechanism at which the brake and differential-lock interlock/prevention mechanism is connected to the brake operation mechanism, the brake/differential-lock operation structure according to the present invention makes it possible to shift the differential mechanism into the differential-lock state in association with braking operation of the brake operation mechanism while allowing the independent operation of the differential-lock operation mechanism. Further, the brake/differential-lock operation structure makes it possible to prevent readjustment of the brake adjustment mechanism from having impact on an operation path for bringing the differential mechanism into the differential-lock state in association with braking operation of the brake operating member as well as an operation path for independently bringing the differential mechanism into the differential-lock state in accordance with differential-lock operation of the differential-lock operating member. Consequently, the readjustment work in the brake adjustment mechanism could be facilitated.

In one embodiment, the brake operation mechanism may include a brake operating member capable of being manually operated, a brake operation shaft that is rotated around its axis line in accordance with manual operation on the brake operating member, a brake actuating member that is supported by the brake operation shaft in a relatively non-rotatable manner with respect thereto, a brake release biasing member that operatively biases a brake operating-side link mechanism, which includes the brake operating member, the brake operation shaft and the brake actuating member, toward a brake release position, a brake control shaft that is rotatable around its axis line in parallel with the rotational axis line of the brake pressing member and rotates the brake pressing member about the rotational axis line into the brake actuation direction as the brake control shaft being rotated around the axis line into a brake actuation direction, and a brake operated-side link mechanism that operatively connects the brake operating-side link mechanism to the brake control shaft so that the brake control shaft is rotated around the axis line by an angle corresponding to manual operation amount of the brake operating member.

The differential-lock operation mechanism may include a differential-lock operating member that is supported in a rotatable manner about a differential-lock operation shaft parallel to the brake operation shaft and that is capable of being manually operated, a differential biasing member that biases the differential-lock operating member about the differential-lock operation shaft toward a differential position, a differential-lock link member that has a first end side operatively connected to the differential-lock operating member so as to be shifted along its axis line in accordance with rotation of the differential-lock operating member about the differential-lock operation shaft, and a differential-lock pressing member that is supported in a rotatable manner about a differential-lock control shaft extending substantially along the vertical direction and has a connection portion operatively connected with a second end side of the differential-lock link member and a pressing portion pressing the differential-lock shaft in the axis line direction, the differential-lock pressing member being turned about the differential-lock control shaft into the differential-lock direction via the differential-lock link member upon operation of the differential-lock operating member to the differential-lock position, so that the pressing portion presses the differential-lock shaft toward the differential-lock position.

The brake and differential-lock interlock/prevention mechanism may include an elongated hole that is formed in the brake actuating member so as to have a close end located on a side close to the differential-lock operating member, a distant end located on a side away from the differential-lock operating member and an intermediate portion communicating with the close end and the distant end, and an interlocking member that has a first end engaged into the elongated hole and a second end operatively connected to the differential-lock operating member.

The interlocking member is configured so that the first end is located at the close end in a brake/differential-lock non-operation state where the brake operating member is located at the brake release position and the differential-lock operating member is located at the differential position, and the first end is shifted from the close end to the distant end in the elongated hole as the differential-lock operating member is shifted to the differential-lock position from the brake/differential-lock non-operation state.

The brake adjustment mechanism is inserted in the brake operated-side link mechanism.

The brake operated-side link mechanism may include a first operated-side link member that has a first end operatively connected to the brake actuating member so as to be shifted along its axis line in accordance with rotation of the brake actuating member about the brake operation shaft, a brake control arm that has a proximal end connected to the brake control shaft so as to be relatively non-rotatable manner with respect thereto, a second operated-side link member that has a proximal end connected to the brake control arm in a rotatable manner about an axis parallel to the brake control shaft, and a connecting member that is supported in a rotatable manner by a pivot shaft parallel to the brake control shaft and has a first arm portion connected to a second end of the first operated-side link member and a second arm portion connected to a free end of the second operated-side link member.

The brake adjustment mechanism may include a slit that is formed on the free end side of the second operated-side link member so as to be along the axial line direction, an engagement projection that is provided on the second arm portion of the connecting member and is engaged into the slit, and a position-adjusting member that is provided at the free end side of the second operated-side brake link member and is capable of adjusting a position, in the longitudinal direction of the slit, at which the engagement projection is engaged into the slit.

For example, the position-adjusting member may include a hollow guide member that is fixed to the second operated-side link member so as to have an axis line aligned along the longitudinal direction of the slit, a bolt member that is inserted through the guide member and has a proximal end connected to the engagement projection, and an adjusting nut in which the bolt member is screwed and that is brought into contact with the upper end surface of the guide member.

In a case where the working vehicle includes a transmission case that accommodates the brake mechanism and the differential mechanism, a driver's seat that is disposed above the transmission case, and a fender that covers a side of the driver's seat, the brake control shaft is supported by one of side walls of the transmission case so as to extend across inside and outside of the transmission case in a state of being along the vehicle width direction, and the second operated-side link member is positioned upward as it goes from the proximal end side to the free end side so that the brake adjustment mechanism provided at the free end side of the second operated-side link member could be accessed from above the fender.

The present invention also provides, in order to achieve the third object, a brake/differential-lock operation structure applied to a working vehicle including a differential mechanism that switches between a differential state and a differential-lock state in accordance with an axial position of a differential-lock shaft, and a friction-plate type brake mechanism that has group of friction plates and a brake pressing member, the friction-plate type mechanism being configured so that, upon rotation of the brake pressing member around an rotational axis line into a brake actuation direction, the group of friction plates are brought into frictional contact with each other to apply braking power to a portion of a travel power transmission path that is positioned on an upstream side of the differential mechanism in the power transmission direction; the brake/differential-lock operation structure including a brake operation mechanism that rotates the brake pressing member about the rotational axis line into the brake actuation direction in accordance with manual operation, and a differential-lock operation mechanism that switches the transmission state of the differential mechanism in accordance with manual operation, the brake/differential-lock operation structure further including a brake and differential-lock interlock/prevention mechanism that causes the brake operation mechanism and the differential-lock operation mechanism to be interacted with each other such that the differential mechanism is brought into the differential-lock state in association with braking operation of the brake operation mechanism while allowing the differential-lock operation mechanism to be independently operated, wherein the brake operation mechanism includes a brake operating member capable of being manually operated in an operational range extending between a braking power release position and a maximum braking power position, and is configured to rotate the brake pressing member about the rotational axis line into the brake actuation direction by an amount corresponding to the manual operation amount of the brake operating member, wherein the brake and differential-lock interlock/prevention mechanism operatively connects the brake operation mechanism and the differential-lock operation mechanism such that the differential mechanism is brought into the differential state when the brake operating member is located closer to the braking power release position than a differential/differential-lock switching position within the operational range, and such that the differential mechanism is brought into the differential-lock state when the brake operating member is located closer to the maximum braking power position than the differential/differential-lock switching position.

Since the brake/differential-lock operation structure according to the present invention includes the brake and differential-lock interlock/prevention mechanism that causes the brake operation mechanism and the differential-lock operation mechanism to be interacted with each other such that the differential mechanism is brought into the differential-lock state in association with braking operation of the brake operation mechanism, while allowing the differential-lock operation mechanism to be independently operated, and the brake and differential-lock interlock/prevention mechanism operatively connects the brake operation mechanism and the differential-lock operation mechanism such that the differential mechanism is brought into the differential state when the brake operating member is located closer to the braking power release position than the differential/differential-lock switching position within the operational range, and such that the differential mechanism is brought into the differential-lock state when the brake operating member is located closer to the maximum braking power position than the differential/differential-lock switching position, the brake/differential-lock operation structure according to the present invention makes it possible to apply braking power of the brake mechanism equally to a pair of drive axles in a case where the brake mechanism is brought into the maximum braking power generation state as in brake operation or the like for stopping the working vehicle, and also apply braking power of the brake mechanism to the travel power transmission path with differential operation of the differential mechanism being maintained in a case where the travel speed of the working vehicle is reduced by braking power of the brake mechanism as in brake operation or the like at the time when the working vehicle is making a turn.

Consequently, it is possible to prevent that the working vehicle is turned in an unintended direction when stopping the working vehicle by the braking power of the brake mechanism, and also reduce travel speed of the working vehicle while maintaining differential function of the differential mechanism when the working vehicle is making a turn.

Preferably, the brake/differential-lock operation structure may include a brake adjustment mechanism capable of adjusting an initial position of the brake pressing member around the rotational axis line at the time when the brake operating member is positioned at the braking power release position.

The brake adjustment mechanism is inserted in the brake operation mechanism so as to be on a downstream side, in the operational power transmission direction, of a connecting portion at which the brake and differential-lock interlock/prevention mechanism is connected to brake operation mechanism.

Furthermore, the present application provides the following invention relating to a travel speed operation apparatus applicable to a working vehicle such as a tractor which includes an HST inserted in a travel power transmission path. More specifically, the travel speed operation apparatus includes a speed changing operation mechanism used for operating the HST, a cruise operation mechanism used for switching between a cruising state where the output from the HST is constantly maintained by holding the speed changing operation mechanism at an arbitrary speed changing position and a cruise release state where the cruising state is released, and a brake operation mechanism used for operating a brake actuator of a travel brake apparatus included in the working vehicle.

More specifically, as described in Patent Document 1, there has been conventionally well known a travel speed operation apparatus that includes a speed changing operation mechanism that operates an output adjusting member in an HST inserted in the a travel power transmission path, a cruise operation mechanism capable of holding the speed changing operation mechanism at an arbitrary operation position, and a brake operation mechanism that operates a brake actuator of a travel brake apparatus, wherein a cruising state caused by the cruise operation mechanism is released not only by release operation of the cruise operation mechanism but also by speed changing operation of a speed changing member of the speed changing operation mechanism as well as brake operation of a brake operating member of the brake operation mechanism.

The conventional travel speed operation apparatus is useful in that, in a state where a working vehicle is maintained in the cruising state (traveling at a constant speed) by the cruise operation mechanism, the cruising state can be released with no operation of the cruise operation mechanism upon changing the travel speed by the speed changing operation mechanism or upon reducing the travel speed by the brake operation mechanism.

However, in the conventional travel speed operation apparatus, the speed changing operation mechanism and the brake operation mechanism are provided completely independently from each other. Accordingly, there is a possibility that outputting action of the HST that outputs rotational power and braking action of the travel brake apparatus that applies braking power occur simultaneously.

More specifically, in the conventional travel speed operation apparatus, the speed changing operation mechanism can be operated to increase the speed even while the travel brake apparatus is actuated by the brake operation mechanism. Accordingly, if the speed changing operation mechanism is operated to increase the speed due to some factor while the travel brake apparatus is in operation, driving power is to be outputted to a travel power transmission path by the HST with braking power being applied to the travel power transmission path by the travel brake apparatus.

Such an operation state may cause abrasion and damages to the travel brake apparatus and/or the HST.

In view of the above conventional art, the present application provides a travel speed operation apparatus that includes a speed changing operation mechanism, a cruise operation mechanism, and a brake operation mechanism, and is capable of preventing simultaneous occurrences of braking action by a travel brake apparatus and power outputting action by an HST.

Specifically, the present application provides a travel speed operation apparatus including (a) a speed changing operation mechanism that operates an output adjusting member of the HST, and has a speed change operating member capable of being manually operated, a speed change operation shaft rotated around its axis line in accordance with manual operation on the speed change operating member, a speed change actuating member supported by the speed change operation shaft in a relatively non-rotatable manner with respect thereto and an HST operation link operatively connects the speed change actuating member and the output adjusting member, (b) a cruise operation mechanism that switches between a cruising state of holding the speed change operation mechanism at an arbitrary speed change position and a cruise release state where the cruising state is released, and has a cruise operating member capable of being manually operated, a plurality of ratchet teeth provided on the speed change actuating member, a cruising member capable of taking, around a cruise shaft, a cruising position of engaging with one of the ratchet teeth and a cruise release of disengaging from the ratchet teeth in accordance with manual operation on the cruise operating member and a cruise release biasing member operatively biasing the cruising member toward the cruise release position, and (c) a brake operation mechanism that operates a brake actuator of the travel brake apparatus, and has a brake operating member capable of being manually operated, a brake operation shaft rotated around its axis line in accordance with manual operation on the brake operating member, a brake actuating member supported by the brake operation shaft in a relatively non-rotatable manner with respect thereto, a brake link operatively connecting the brake actuating member and the brake actuator, and a brake release biasing member operatively biasing the brake actuating member toward a brake release position, the travel speed operation apparatus further including (d) a brake interlock arm that is supported by the brake operation shaft in a relatively non-rotatable manner with respect thereto, and has a cruise release arm portion pressing the cruising member, which has been located at the cruising position about the cruise shaft, toward the cruise release position in accordance with operation of the brake operating member from the brake release position to the brake actuation position, and (e) a speed change interlock arm that is supported in a swingable manner about a pivot shaft disposed in parallel with the speed change operation shaft, and is provided with a speed change interlocking cam portion and a brake interlocking cam portion.

The speed change operating member is provided with a speed change interlocking cam surface that includes a deepest portion located at the radially innermost end with the axis line of the speed change operation shaft being as a reference, and a pair of inclined portions extending in one and the other sides in a circumferential direction with the axis line of the speed change operation shaft being as a reference in a state of sandwiching the deepest portion so as to be positioned away from the axis line as a distance from the deepest portion in the circumferential direction is increased, the pair of inclined portions being engaged with the speed change interlocking cam portion at the time when the speed change operating member is located at a non-neutral position.

The speed change interlock arm is biased by a speed change interlock arm biasing member about the pivot shaft in such a direction as to cause the speed change interlocking cam portion to be engaged with the speed change interlocking cam surface.

The brake interlock arm is further provided with a neutral groove in which the brake interlocking cam portion is engaged at the time when the brake operating member is located at the brake actuation position so that the speed change interlock arm is held at the neutral position.

The travel speed operation apparatus is provided with the brake interlock arm that moves in accordance with the brake operating member and the speed change interlock arm that moves in accordance with the speed change operating member, as described above. The speed change interlock arm is provided with the speed change interlocking cam portion and the brake interlocking cam portion. The speed change operating member that moves in accordance with the speed change operating member is provided with the speed change interlocking cam surface including the pair of inclined portions with which the speed change interlocking cam portion is engaged. The brake interlock arm is also provided with the neutral groove in which the brake interlocking cam portion is engaged at the time when the brake operating member is located at the brake actuation position so that the speed change interlock arm is held at the neutral position.

The configuration makes it possible to effectively prevent that the HST is brought into the outputting state through the speed change operation mechanism in a state where the travel brake apparatus is brought into the brake actuation state through the brake operation mechanism, thereby effectively preventing abrasion and damages to the travel brake apparatus and the HST.

The speed change interlocking cam portion and the brake interlocking cam portion are preferably disposed coaxially with each other.

In a preferable embodiment, the brake interlock arm is provided with a guide surface that guides the brake interlocking cam portion into the neutral groove when the brake operating member is operated from the brake release position to the brake actuation position in a state where the speed change operating member is located at the non-neutral position.

In the various configurations, the travel speed operation apparatus may preferably include a neutral switch that detects the neutral state of the HST.

The neutral switch is configured to detect whether or not the speed change interlock arm is located at the neutral position.

In the various configurations, there may be provided a rigid link member that has a first end operatively connected to the brake actuating member and a second end operatively connected to a differential-lock operating member, which is rotatable about a differential-lock operation shaft in parallel with the brake operating shaft so as to operate the differential-lock mechanism.

The brake actuating member is formed with an elongated hole that has a close end on a side close to the differential-lock operating member, a distant end on a side away from the differential-lock operating member and an intermediate portion communicating between the close end and the distant end.

The link member is configured so that the first end is located at the close end of the elongated hole when the brake actuating member is located at the brake release position and the differential-lock operating member is located at the differential-lock release position, and is located at the distant end of the elongated hole when the brake actuating member is located at the brake release position and the differential-lock operating member is located at the differential-lock position.

The present application also provides the following invention relating to a hood structure applicable to a working vehicle.

More specifically, in the working vehicle such as a tractor, a hood is made openable for inspection and maintenance inside an engine compartment.

As one of the hood structures in which the hood is openable, there is proposed a configuration inclusive of a biasing member that is provided between the hood and a vehicle body so as to bias the hood into an open direction (see, for example, Japanese Unexamined Patent Publication No. 2003-320963 (hereinafter, referred to as Patent Document 2)).

The configuration described in Patent Document 2 is useful in that the biasing member reduces operational power required to open the hood. However, the hood is locked at the open position by a lock mechanism including a stand rod and a rod support stay, so that the lock mechanism needs to be operated in order to hold the hood at the open position as well as to turn the hood being held at the open position to the closed position.

In addition, no consideration is made to reduction in operational power required to close the hood in the configuration described in Patent Document 2.

On the other hand, Japanese Unexamined Patent Publication No. 2006-290121 (hereinafter, referred to as Patent Document 3) discloses a configuration in which a gas spring is inserted between the hood and the vehicle body and biases to open the hood, so that the hood is held at the open position by the biasing force of the gas spring.

The configuration described in Patent Document 3 is useful in that no operation is required to the lock mechanism when opening/closing the hood. However, constant biasing force for opening the hood by the gas spring is always applied to the hood, thereby increasing the operational power required to close the hood.

Further, in the configuration described in Patent Document 3, the gas spring forms a folding link mechanism in cooperation with a support stay that is mounted to the vehicle body in such a manner as to be rotatable about a rotation axis line along the vehicle width direction. Accordingly, there is required a larger space to accommodate the gas spring.

In view of the above conventional art, the present application provides a hood structure, which allows the hood to be held at an open position with no provision of a lock mechanism as well as to be easily opened and closed.

Specifically, the present application provides a hood structure that has a hood supported by a vehicle body, and includes a pivot shaft directly or indirectly supported by the vehicle body in a state of being along a vehicle width direction, a first support body causing the hood to be supported by the pivot shaft so that the hood is rotatable around the pivot shaft, a second support body having a proximal end fixed to the pivot shaft and a distal end extending radially outward with the axis line of the pivot shaft as a reference, a first biasing member having a first end connected to the second support body and a second end connected directly or indirectly to the hood so as to generate a closing biasing force that biases the hood into a closed direction toward a first direction around the pivot shaft in a state where the closing biasing force is increased in proportion to an opened movement of the hood from the first direction to a second direction around the pivot shaft, and a second biasing member having a first end connected to the second support body and a second end connected directly or indirectly to the hood so as to generate an opening biasing force that biases with a constant magnitude the hood toward an opened direction on the second direction around the pivot shaft, wherein the hood is configured so that its center of gravity is located on a virtual vertical plane passing through the pivot shaft at the time when the hood is located at a halfway position between the closed position and the open position, and wherein the closing biasing force of the first biasing member is made equal to the sum of the opening biasing force caused by the own weight of the hood and the opening biasing force of the second biasing member at the time when the hood is located at the open position.

The configuration makes it possible to hole the hood at the open position with no provision of an open position hold mechanism such as a support rod exclusive for holding the hood at the open position, since the closing biasing force of the first biasing member is made equal to the sum of the opening biasing force caused by the own weight of the hood and the opening biasing force of the second biasing member at the time when the hood is located at the open position.

Further, in the configuration, the closing biasing force of the first biasing member is gradually increased as the hood is opened from the first side toward the second side around the pivot shaft. In other words, out of area through which the hood passes through when being operated from the closed position to the open position, in a range from the closed position to the halfway position where the own weight of the hood is applied into the closing direction, the closing biasing force applied by the first biasing member becomes small. Accordingly, it is possible to prevent as much as possible that the first biasing member adversely affects the opening of the hood. On the other hand, in the case where the hood is located at the open position, the first biasing member applies the maximum closing biasing force. As a result, the hood can be easily closed irrespective of the opening biasing force applied by the second biasing member.

Preferably, the first biasing member is provided as the tension spring, and the second biasing member is provided as a gas spring.

The configuration makes it possible to smoothly perform opening and closing motion of the hood 31C thanks to the buffering effect of the gas spring.

In more preferable configuration, the tension spring has substantially a natural length in the case where the hood is located at the closed position.

The configuration makes it possible to reduce as much as possible closing biasing force that has been generated by the tension spring upon opening the hood from the closed position toward the open position. As a result, the hood can be opened more easily In the configuration where a tension spring and a gas spring are used as the first and second biasing members, the tension spring may be preferably mounted to surround the gas spring.

The configuration makes it possible to reduce as much as possible a space required to arrange the first and second biasing members.

BRIEF DESCRIPTION OF THE DRAWINGS/FIGURES

FIGS. 7A and 7B show a differential state and a differential-lock state of the differential mechanism, respectively.

FIG. 15 is a graph showing a relationship between an operation position of a brake operating member of the brake/differential-lock operation structure according to the first embodiment of the present invention and a strength of the braking power generated by the brake mechanism.

Figure 1:
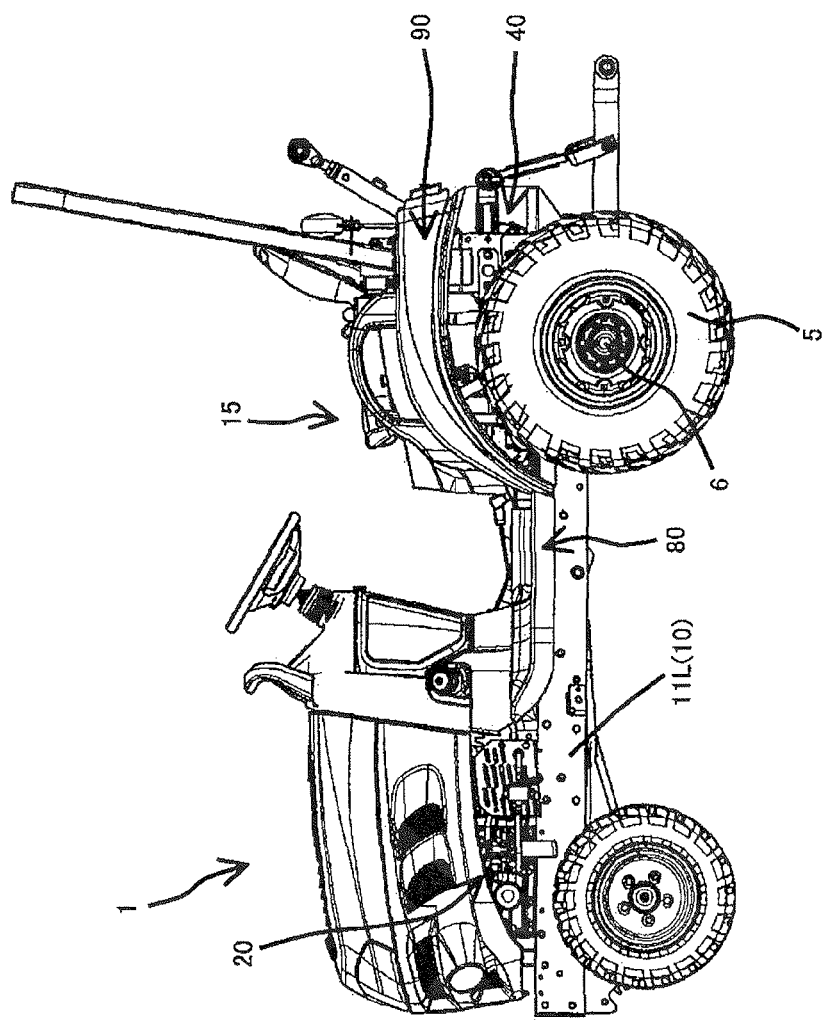
FIG. 1 is a side view of a working vehicle in the form of a tractor to which a brake/differential-lock operation structure according to a first embodiment of the present invention is applied.

DESCRIPTION OF THE REFERENCE NUMERALS 1 working vehicle
6 drive axle
15 driver's seat
16 driver's seat support frame
17 travel system speed change lever
18 PTO system speed change lever
40 transmission case
50 differential mechanism
56 differential-lock shaft
60 brake mechanism
62 group of friction plates
63 brake pressing member
63X rotational axis line
90 fender
91 opening
95 lever guide member
100 brake operation mechanism
110 brake operating member
120 brake operation shaft
130 brake actuating member
140 brake release biasing member
150 brake control shaft
160 first operated-side link member
170 connecting member
171 first arm portion
172 second arm portion
180 second operated-side link member
190 brake control arm
200 brake adjustment mechanism
210 slit
220 engagement projection
230 position-adjusting member
231 guide member
232 bolt member (external screw member)
233 adjusting nut
300 differential-lock operation mechanism
310 differential-lock operating member
310X differential-lock operation shaft
320 differential biasing member
330 differential-lock link member
340 differential-lock pressing member
342 connection portion
343 pressing portion
340X differential-lock control shaft
400 brake and differential-lock interlock/prevention mechanism
410 elongated hole
411 close end
412 distant end
413 intermediate portion
420 interlocking member
421 first end
422 second end

DETAILED DESCRIPTION OF THE INVENTION

First Embodiment

Described below is a preferred embodiment of the present invention with reference to the accompanying drawings.

FIG. 1 is a side view of a working vehicle 1 to which a brake/differential-lock operation structure according to the present embodiment is applied.

Figure 2:
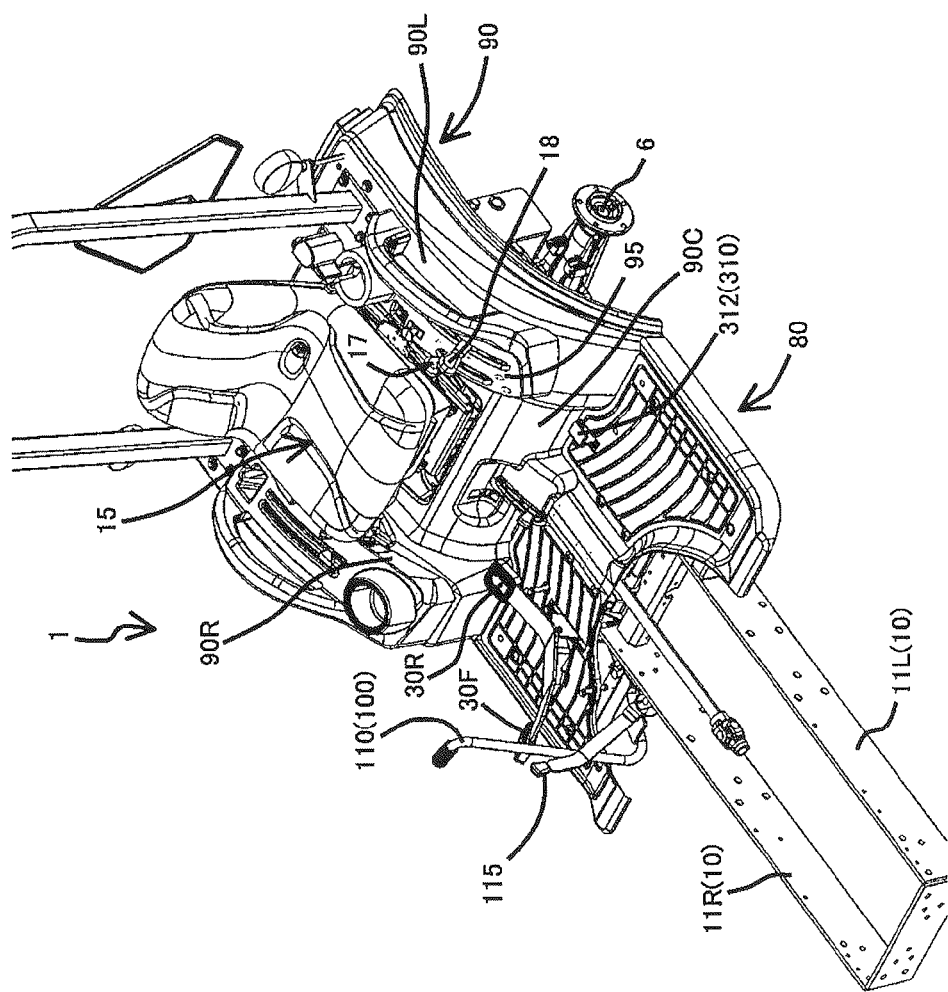
FIG. 2 is a partial perspective view of the working vehicle shown in FIG. 1.
Figure 3:
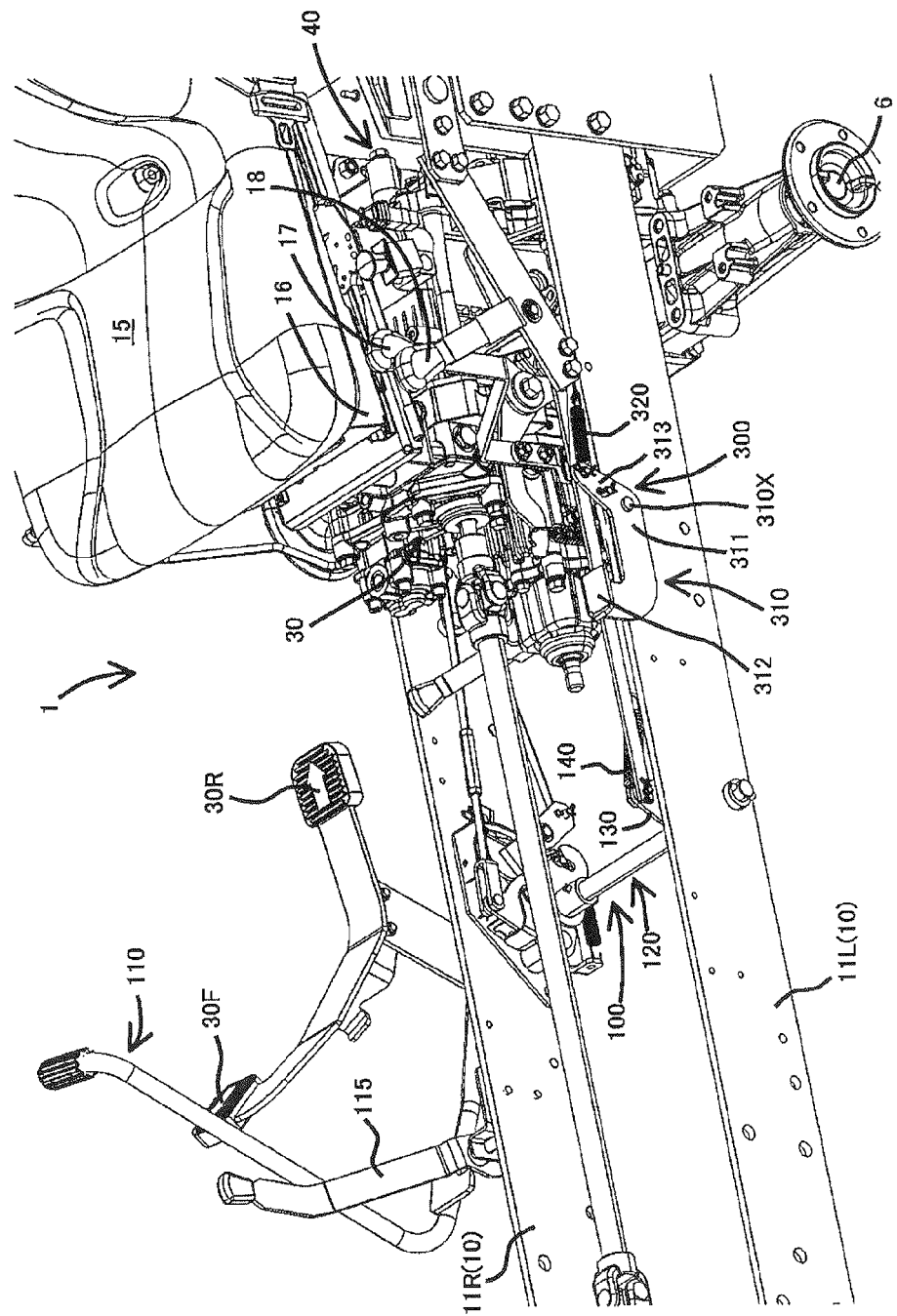
FIG. 3 is a partial perspective view of the working vehicle with a step and a fender being removed from the state shown in FIG. 2.

FIG. 2 is a partial perspective view of the working vehicle 1, and FIG. 3 is a partial perspective view of the working vehicle 1 with a step 80 and a fender 90 being removed from the illustration in FIG. 2.

As shown in FIGS. 1 to 3, the working vehicle 1 includes a vehicle frame 10 that has a pair of left and right main frames 11L and 11R each extending along the vehicle lengthwise direction, a driving power source 20 that is disposed on a front portion of the vehicle frame 10, a transmission case 40 that is connected to a rear portion of the vehicle frame 10, an HST 30 that is supported on a front surface of the transmission case 40 while being operatively connected to the driving power source 20, a travel power transmission mechanism (not shown) as well as a PTO transmission mechanism (not shown) which are each provided in the transmission case 40, a pair of driving wheels 5 that are driven respectively via a pair of drive axles 6, a differential mechanism 50 (see FIG. 8A to be described later) which differentially transmits dynamic power from the travel power transmission mechanism to the pair of drive axles 6, a brake mechanism 60 that operatively applies braking power to the pair of drive axles 6 (see FIGS. 8A and 8B to be described later), the brake/differential-lock operation structure according to the present embodiment, a driver's seat 15 that is disposed above the transmission case 40, the fender 90 that covers the sides of the driver's seat 15, and the step 80 that is disposed in front of the driver's seat 15 and is supported directly or indirectly by the vehicle frame 10.

It is noted that, in the present specification, left and right indicates the left and the right in a state of facing in a forward travel direction of the working vehicle 1.

Figure 4:
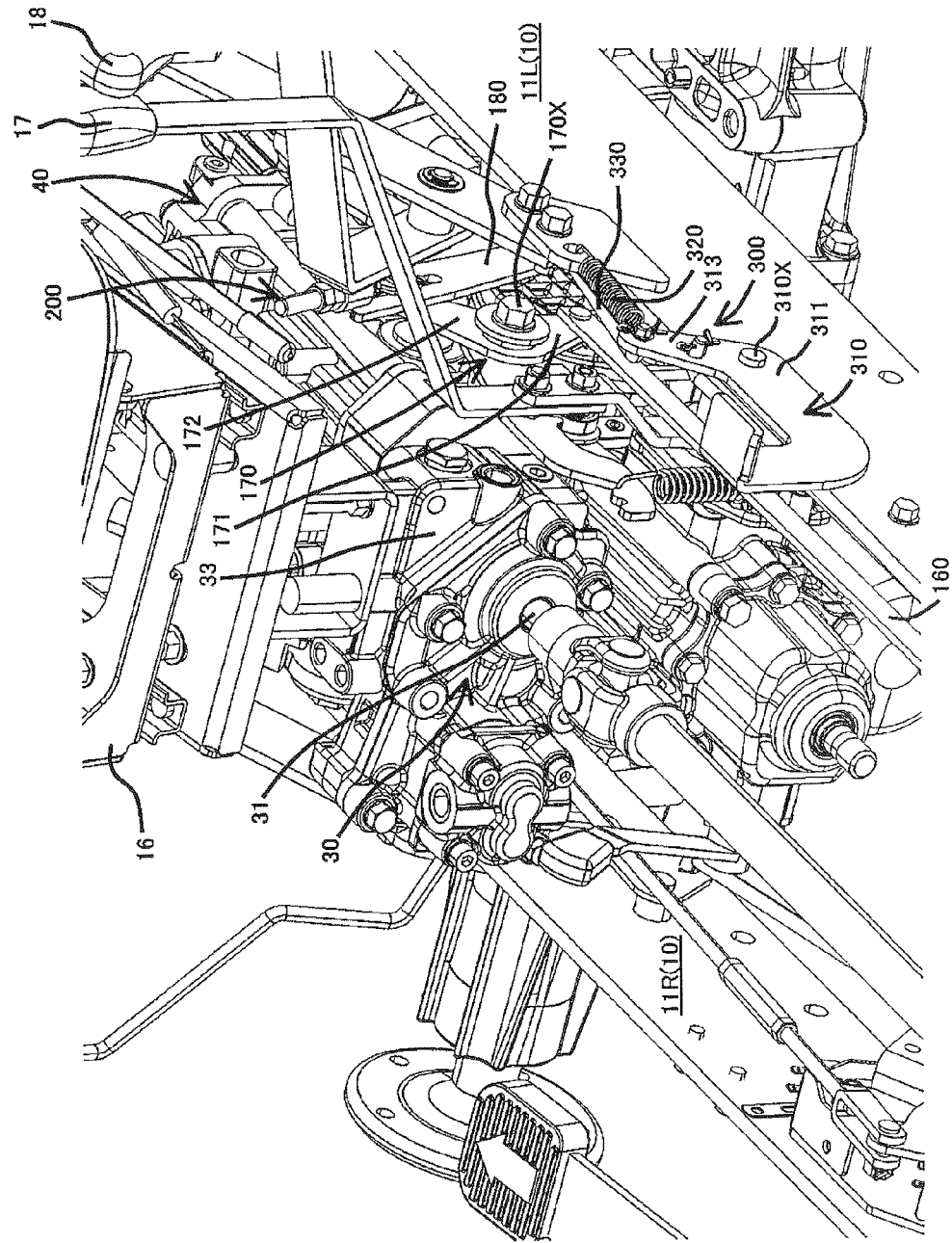
FIG. 4 is a perspective view of a vicinity of a transmission case and an HST in the working vehicle shown in FIGS. 1 to 3, as viewed from front and left side.
Figure 5:
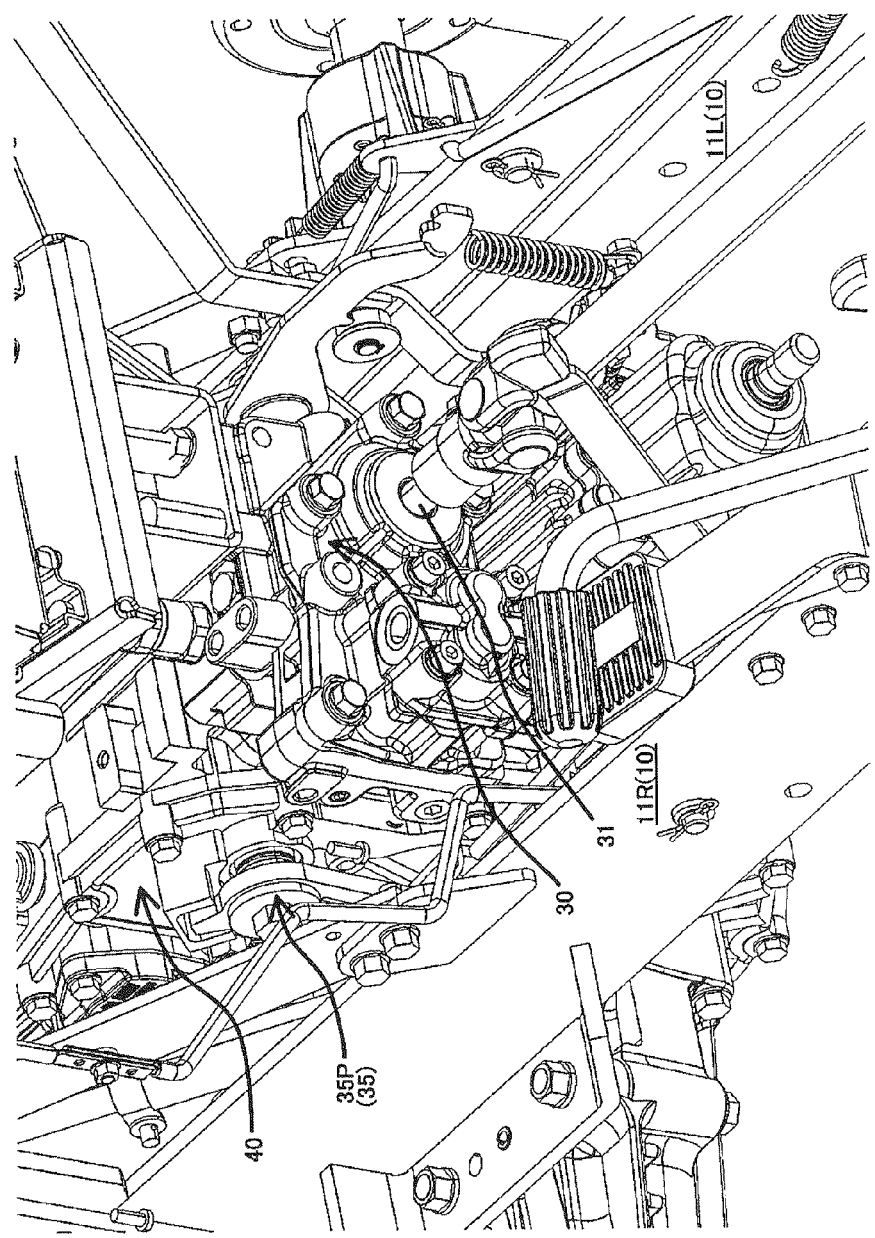
FIG. 5 is a perspective view of the vicinity of the transmission case and the HST in the working vehicle shown in FIGS. 1 to 3, as viewed from front and right side.

FIGS. 4 and 5 are front perspective views of the transmission case 40 and the HST 30 as well as the vicinities thereof when seen from the left side and the right side, respectively.

Figure 6:
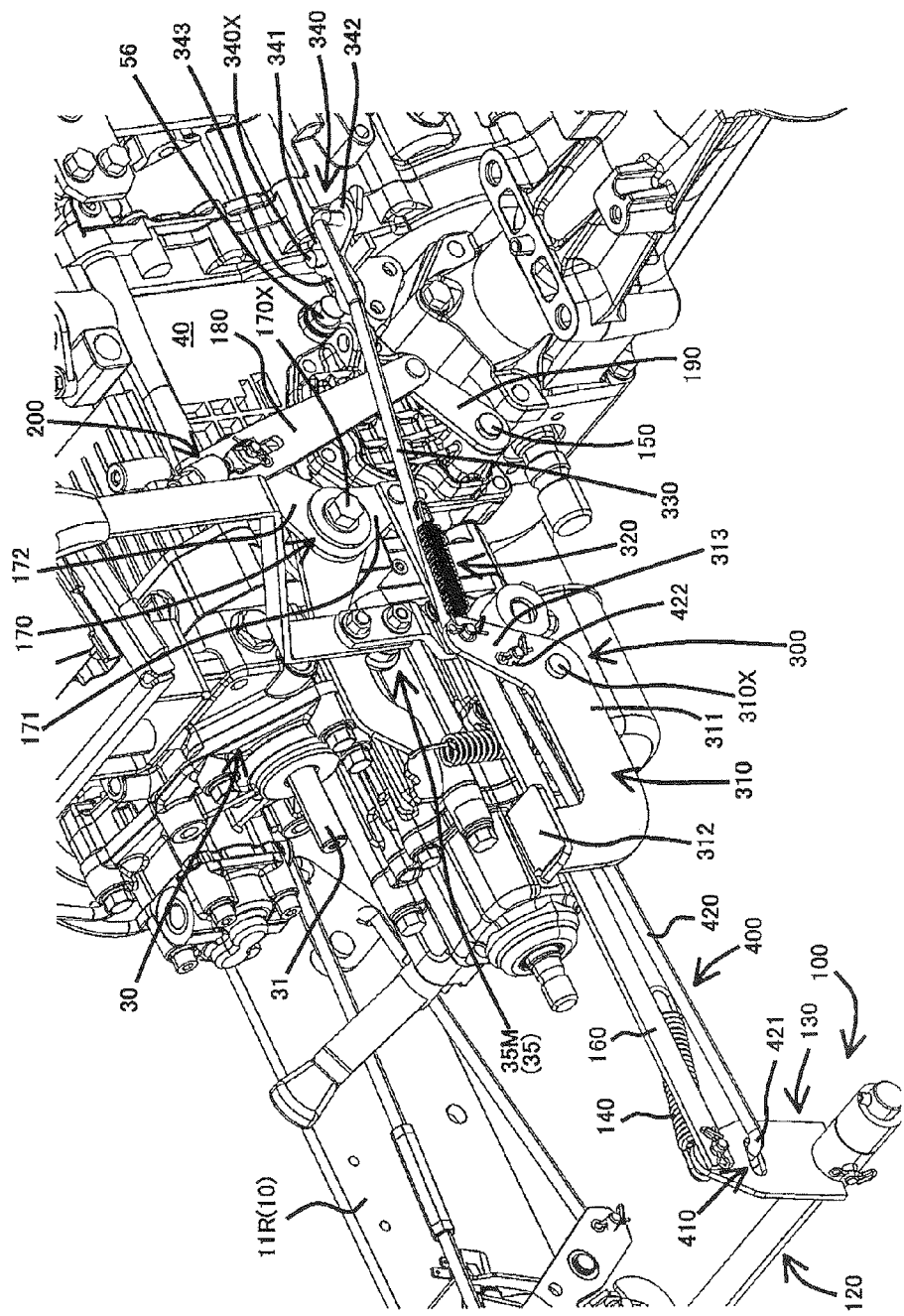
FIG. 6 is a perspective view showing a state where some of the members such as a left main frame are removed from the state shown in FIG. 4.

FIG. 6 is a perspective view showing a state where some of the members such as the left main frame 11L are removed from the state shown in FIG. 4.

As shown in FIGS. 4 to 6, the HST 30 includes a pump shaft 31 that is operatively connected to the driving power source 20, a hydraulic pump main body (not shown) which is supported by the pump shaft 31 in a relatively non-rotatable manner with respect thereto, a hydraulic motor main body (not shown) which is fluidly connected to the hydraulic pump main body, a motor shaft (not shown) which supports the hydraulic motor main body in a relatively non-rotatable manner with respect thereto, and an HST case 33 that accommodates the hydraulic pump main body and the hydraulic motor main body integrally or separately.

In the HST 30, at least one of the hydraulic pump main body and the hydraulic motor main body is of the variable displacement type. Variation in suction/discharge amount of at least one (hereinafter, referred to as variable displacement member(s)) of the hydraulic pump main body and/or the hydraulic motor main body, which are/is of the variable displacement type, changes the rotational speed of the rotational power outputted from the motor shaft relative to the rotational speed of the rotational power inputted to the pump shaft 31.

The HST 30 is thus provided, in addition to the above components, with an output adjusting member 35 that varies the suction/discharge amount of the variable displacement member.

In the configuration shown in the drawings, both the hydraulic pump main body and the hydraulic motor main body are of the variable displacement type.

Accordingly, the HST 30 includes a pump-side output adjusting member 35P (see FIG. 5) and a motor-side output adjusting member 35M (see FIG. 6) which function as the output adjusting member 35.

The pump-side output adjusting member 35P and the motor-side output adjusting member 35M are operatively connected to a speed change operating member that is disposed in front of the driver's seat 15.

More specifically, each of the pump-side output adjusting member 35P and the motor-side output adjusting member 35M varies a volume of the corresponding variable displacement member in accordance with manual operation on the speed change operating member.

As shown in FIGS. 2 and 3, in the present embodiment, the speed change operating member is configured as a seesaw pedal that is integrally provided with a forward travel pedal 30F and a rearward travel pedal 30R.

The HST 30 is further provided with a neutral return mechanism (not shown) which returns the output adjusting member to the neutral position upon release of manual operation on the speed change operating member.

As already described, in the present embodiment, the output adjusting member 35 includes the pump-side output adjusting member 35P and the motor-side output adjusting member 35M.

The neutral return mechanism thus includes a pump neutral return mechanism and a motor neutral return mechanism that return the pump-side output adjusting member 35P and the motor-side output adjusting member 35M to the neutral positions, respectively, upon release of manual operation on the speed change operating member.

The differential mechanism 50 is configured to be brought into a differential state of differentially transmitting, to the pair of drive axles 6, rotational power that is inputted from the driving power source 20 via the HST 30, and a differential-lock state of constantly transmitting rotational power to the pair of drive axles 6.

Figure 7A:
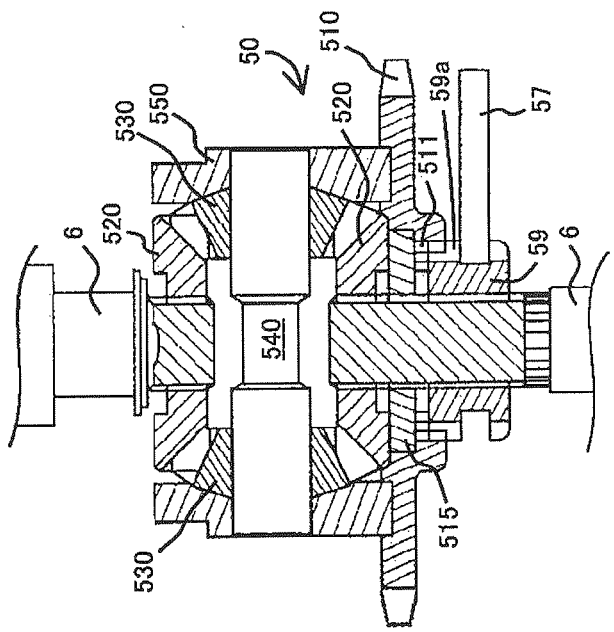
FIGS. 7A and 7B are schematic cross sectional views of a differential mechanism in the working vehicle.
Figure 7B:
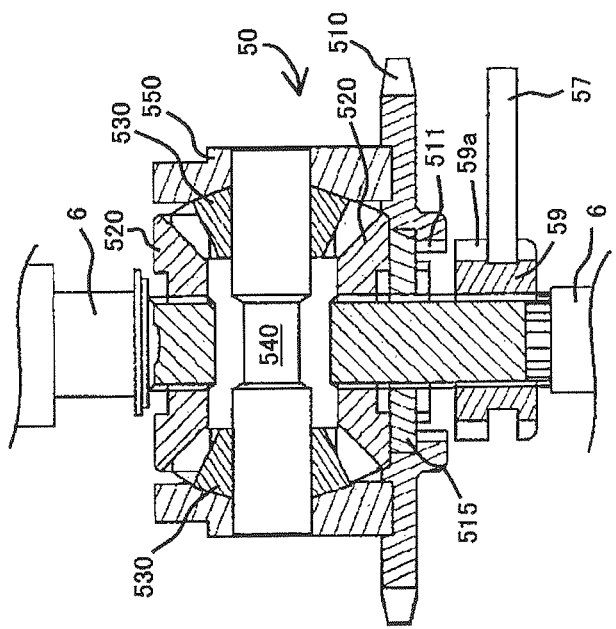

FIGS. 7A and 7B are schematic cross sectional views of the differential mechanism 50. FIGS. 7A and 7B show the differential state and the differential-lock state of the differential mechanism 50, respectively.

As shown in FIGS. 7A and 7B, the differential mechanism 50 includes an input gear 510 that is disposed coaxially with the rotational axis lines of the pair of drive axles 6 and receives driving power, a pair of side bevel gears 520 that are supported by the pair of drive axles 6 in a relatively non-rotatable manner with respect thereto, a bevel pinion 530 that is engaged with both the pair of side bevel gears 520, a pinion shaft 540 that supports the bevel pinion 530 in a relatively rotatable manner with respect thereto and is rotated about the rotational axis line together with the input gear 510, and a differential/differential-lock switch mechanism 55 (see FIG. 8A to be described later) which switches between the differential state and the differential-lock state.

A reference numeral 550 in FIGS. 7A and 7B denotes a differential case 550 that is rotated about the rotational axis line together with the input gear 510. The pinion shaft 540 is supported by the differential case 550 so as to be rotated about the rotational axis together with the differential case 550.

A reference numeral 515 in FIGS. 7A and 7B denotes a collar 515 that supports the input gear 510. The collar 515 is supported by a first one of the drive axles 6 in a relatively rotatable manner with respect thereto, while the input gear 510 is supported by the collar 515 in a relatively rotatable mariner with respect thereto.

Figures 8A, 8B:
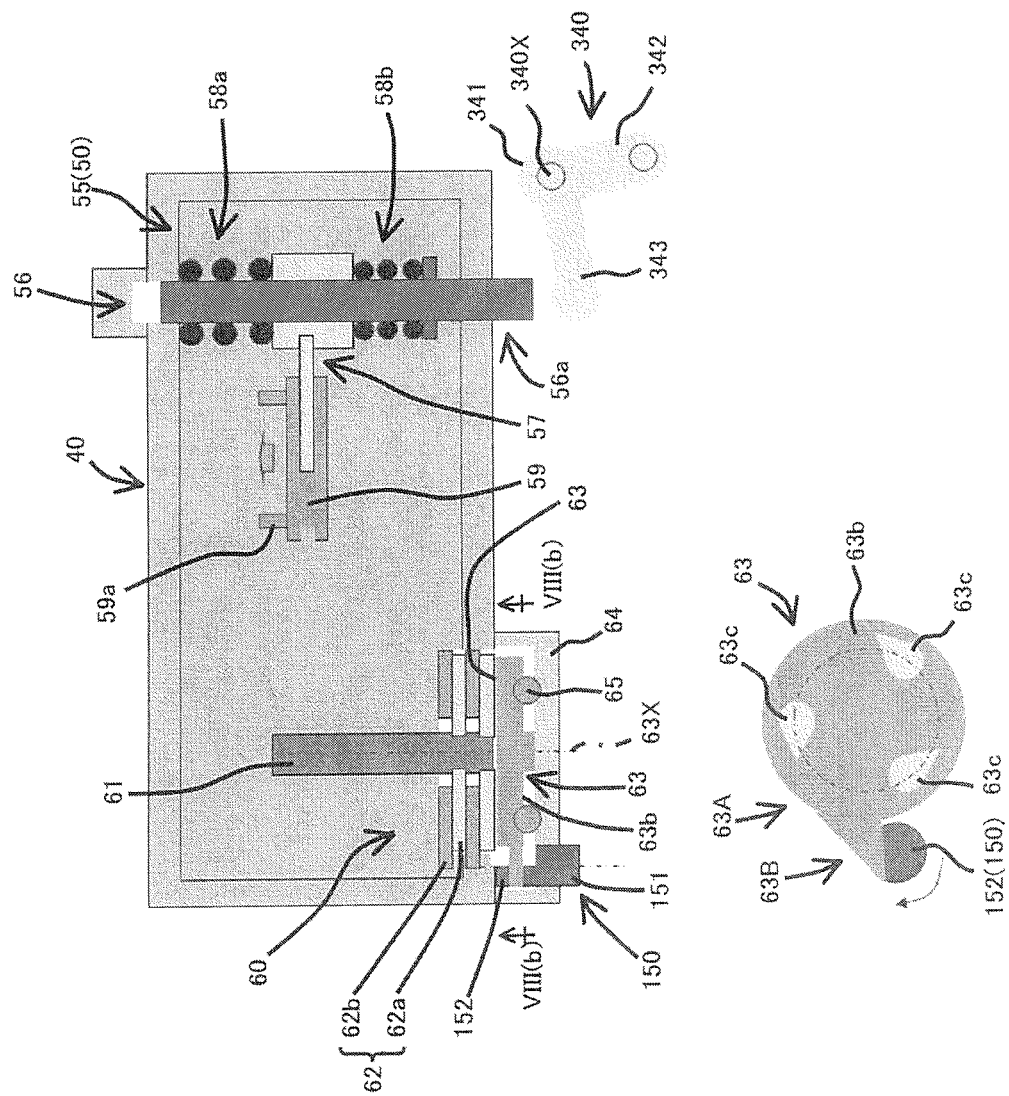
FIG. 8A is a partial schematic cross sectional view of the transmission case in the working vehicle, and shows a brake mechanism and the differential mechanism provided in the working vehicle.
FIG. 8B is an end view taken along line VIII(b)-VIII(b) in FIG. 8A.

FIG. 8A is a partial schematic plan view of the transmission case 40.

As shown in FIGS. 7A, 7B, and 8A, the differential/differential-lock switch mechanism 55 has a differential-lock shaft 56 that is supported by the transmission case 40, a differential-lock member 59 that is supported by the first drive axle 6 in a relatively non-rotatable manner with respect thereto and in a movable manner along the axis line of the first drive axle 6, a differential-lock fork 57 that has a proximal end fixed to the differential-lock shaft 56 in a relatively immovable manner along the axis line with respect thereto and a free end engaged with the differential-lock member 59, and a first biasing member 58a that directly or indirectly biases the differential-lock shaft 56 toward the differential position.

The differential-lock shaft 56 is movable along its axis line so as to be placed at the differential position and the differential-lock position along the axis line.

More specifically, as shown in FIG. 8A, the differential-lock shaft 56 is supported by the transmission case 40 in a movable manner in the axis line along the vehicle width direction with a first end 56a thereof, which serves as a pressed portion, being extended outward from one of a pair of side walls (the left side wall in the configuration shown in the drawing) of the transmission case 40.

The differential-lock fork 57 has the proximal end supported by the differential-lock shaft 56 in a relatively immovable manner in the axis line with respect thereto and the free end engaged with the differential-lock member 59.

More specifically, the differential-lock fork 57 moves the differential-lock member 59 along the axis line of the first drive axle 6 in accordance with movement of the differential-lock shaft 56 along its axis line.

The differential-lock member 59 is moved along the axis line of the first drive axle 6 so as to be brought into a relatively non-rotatable state and a relatively rotatable state with respect to the input gear 510.

More specifically, as shown in FIGS. 7A and 7B, the input gear 510 is provided with an engaged portion 511 (such as an inner tooth), while the differential-lock member 59 is provided with an engaging portion 59a (such as an outer tooth) which is engageable with the engaged portion 511.

As described above, the differential-lock member 59 is moved along the axis line of the first drive axle 6 by the differential-lock fork 57 in accordance with movement of the differential-lock shaft 56 along its axis line.

In other words, the differential-lock member 59 is shifted to a differential-lock position and to a differential position along the axis line of the first drive axle 6 as the differential-lock shaft 56 is located at the differential-lock position and at the differential position, respectively.

When the differential-lock member 59 is shifted to the differential-lock position along the axis line of the first drive axle 6, the engaging portion 59a is engaged with the engaged portion 511, so that the differential-lock member 59 is made relatively non-rotatable with respect to the input gear 510 (see FIG. 7B). In this state, the input gear 510, the differential-lock member 59, a first one of the pair of side bevel gears 520 that is supported by the first drive axle 6 in a relatively non-rotatable with respect thereto, the pinion shaft 540, and the bevel pinion 530 are rotated about the drive axle 6 at an identical speed. Along therewith, a second one of the pair of side bevel gears 520 is rotated about the drive axle 6 at the identical speed. Accordingly, the differential mechanism 50 is brought into the differential-lock state of driving both the first drive axle 6 and the second drive axle 6 at the identical rotational speed.

On the other hand, when the differential-lock member 59 is shifted to the differential position along the axis line of the first drive axle 6, engagement of the engaging portion 59a into the engaged portion 511 is released (see FIG. 7A). In this state, the differential mechanism 50 is brought into the differential state where the bevel pinion 530 is rotated about the pinion shaft 540 in accordance with the difference in loads between the pair of drive axles 6 to differentially drive the first drive axle 6 and the second drive axle 6.

The first biasing member 58a has a first end supported by the transmission case 40 in a fixed manner and a second end engaged with the proximal end of the differential-lock fork 57 so as to bias the differential-lock shaft 56 toward the differential position (downward in FIG. 8A).

In the present embodiment, the differential/differential-lock switch mechanism 55 is further provided with a second biasing member 58b that faces the first biasing member 58a with the proximal end of the differential-lock fork 57 being interposed therebetween.

The differential/differential-lock switch mechanism 55 operates as follows.

In a state where no operational power is applied to the differential-lock shaft 56, the differential-lock shaft 56 is sandwiched between the first and second biasing members 58a and 58b to be held at the differential position. In this state, the differential-lock member 59 is located at the differential position, so that the differential mechanism 50 is brought into the differential state of differentially transmitting, to the pair of drive axles 6, driving power operatively transmitted from the driving power source 20.

On the other hand, when the differential-lock shaft 56 is pressed into a first axial direction (upward in FIG. 8A) to the differential-lock position against biasing force of the first biasing member 58a, the differential-lock member 59 is located at the differential-lock position. Accordingly, the engaging portion 59a is engaged with the engaged portion 511 to rotate the pair of side bevel gears 520 at an identical speed. In this state, the differential mechanism 50 is brought into the differential-lock state of constantly transmitting to the pair of drive axles 6 the driving power operatively transmitted from the driving power source 20.

As shown in FIG. 8A, the brake mechanism 60 is of the friction-plate type that includes group of friction plates 62 and a brake pressing member 63, and is configured so that, upon rotation of the brake pressing member 63 about a rotational axis line 63X into a brake actuation direction, the group of friction plates 62 are brought into frictional contact with each other to apply braking power.

The brake mechanism 60 is disposed in such a manner as to apply braking power to a portion of a travel power transmission path that is located on an upstream side of the differential mechanism 50 in the power transmission direction, the travel power transmission path extending from the driving power source 20 to the pair of driving wheels 5.

For example, the brake mechanism 60 may be disposed so as to operatively apply braking power to a main drive shaft that outputs rotational power to the differential mechanism 50.

More specifically, the brake mechanism 60 includes a brake shaft 61 that is operatively connected to a braked member (such as the main drive shaft), the group of friction plates 62 having group of rotatable friction plates 62a that are supported by the brake shaft 61 so as to be rotated around the axis line of the brake shaft 61 along therewith and group of fixed friction plates 62b that are non-rotatable, the brake pressing member 63 that brings the group of friction plates 62 into frictional contact with each other when rotated about the rotational axis line 63X into the brake actuation direction, a fixing member 64 that is disposed to face the group of friction plates 62 with the brake pressing member 63 being interposed therebetween, and a rolling element 65 such as a ball that is inserted between the brake pressing member 63 and the fixing member 64.

FIG. 8B is an end view of the brake pressing member 63 taken along line VIII(b)-VIII(b) in FIG. 8A.

As shown in FIGS. 8A and 8B, the brake pressing member 63 has a first surface 63a that faces the group of friction plates 62, a second surface 63b that faces in an opposite direction from the first surface 63a and faces the fixing member 64, and engagement grooves 63c foamed in the second surface 63b along the circumferential direction with the rotational axis line 63X as a reference.

Each of the engagement grooves 63c is configured as an inclined groove of which depth is increased from one end to the other end in the circumferential direction.

The fixing member 64 has a concave portion that is formed in the surface facing the second surface 63b of the brake pressing member 63 to hold the rolling element 65.

The brake mechanism 60 operates as follows.

When the brake pressing member 63 is located at the brake release position around the rotational axis line 63X, the rolling element 65 is engaged in the deepest positions of the engagement grooves 63c. In this state, the brake pressing member 63 does not influence the group of friction plates 62, so that the brake mechanism 60 is brought into the brake release state.

On the other hand, when the brake pressing member 63 is rotated from the brake release position about the rotational axis line 63X into the brake actuation direction (clockwise direction in FIG. 8B), the rolling element 65 is moved relatively with respect to the brake pressing member 63 so as to be engaged into the shallowest positions of the engagement grooves 63c. In this case, the brake pressing member 63 is pressed by the rolling element 65 along the rotational axis line 63X to be brought close to the group of friction plates 62, so that the group of friction plates 62 are brought into frictional contact with each other. Thus, the brake mechanism 60 is brought into the brake actuation state.

As described earlier, the brake mechanism 60 is disposed so as to apply braking power to a portion that is positioned on an upstream side of the differential mechanism 50 in the power transmission direction. Specifically, in the present embodiment, the brake mechanism 60 is configured to operatively apply braking power to an input ring gear (not shown) of the differential mechanism 50.

The brake/differential-lock operation structure includes a brake operation mechanism 100 that switches the actuation state of the brake mechanism 60 and a differential-lock operation mechanism 300 that switches the transmission state of the differential mechanism 50.

Figure 9:
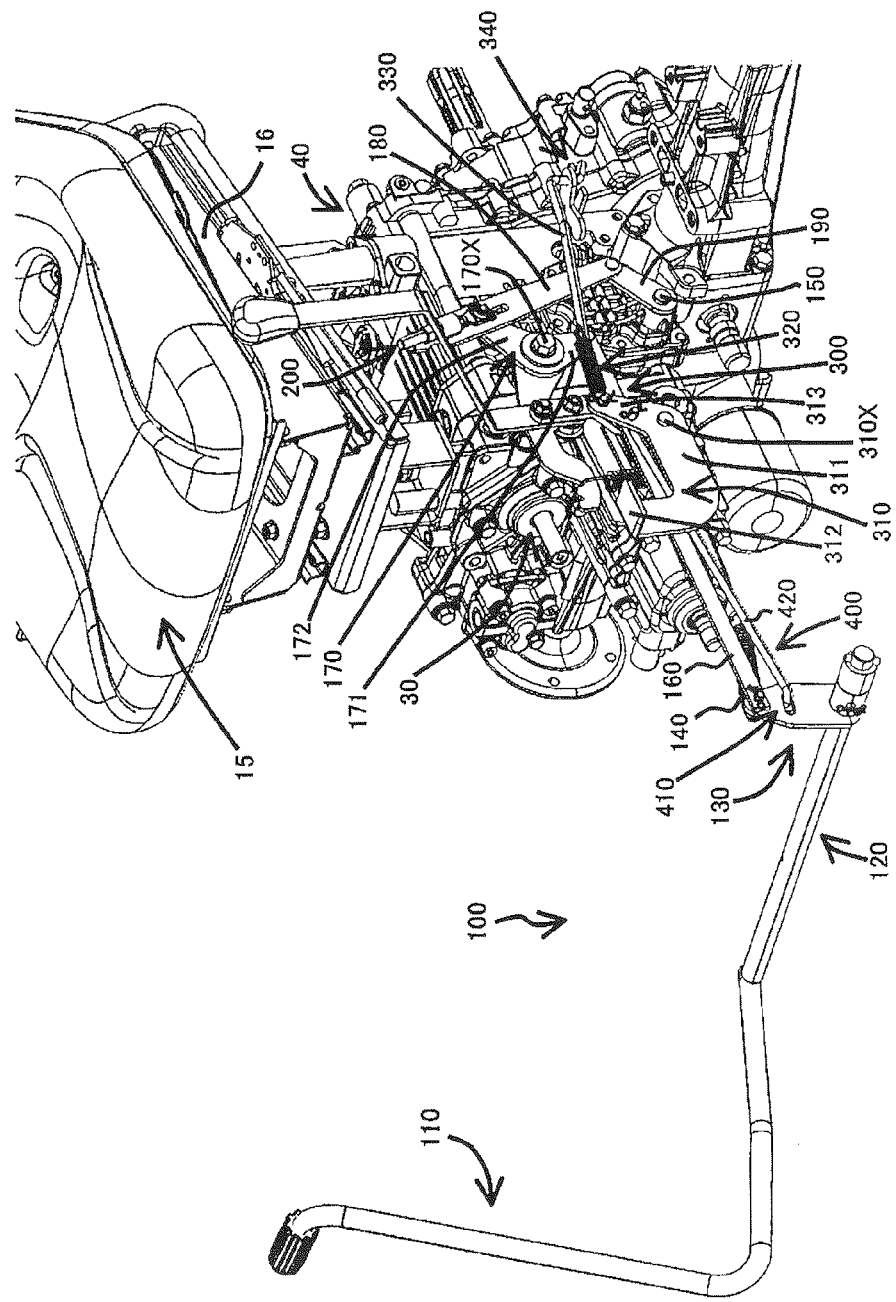
FIG. 9 is a partial perspective view of the working vehicle with some components thereof being omitted.

FIG. 9 is a partial perspective view of the working vehicle 1 that includes the brake/differential-lock operation structure. It is noted that FIG. 9 does not show some of the components of the working vehicle in order to clearly show the brake/differential-lock operation structure.

The brake operation mechanism 100 is firstly described.

The brake operation mechanism 100 is configured to selectively bring the brake mechanism 60 into the brake actuation state and the brake release state in accordance with manual operation.

More specifically, as shown in FIGS. 2, 3, 9 and the like, the brake operation mechanism 100 includes a brake operating member 110 capable of being manually operated by a driver, a brake operation shaft 120 that is rotated around its axis line in accordance with manual operation on the brake operating member 110, a brake actuating member 130 that is supported by the brake operation shaft 120 in a relatively non-rotatable manner with respect thereto, a brake release biasing member 140 that operatively biases the brake operating member 110 toward the brake release position, a brake control shaft 150 that rotates the brake pressing member 63 about the rotational axis line 63X into the brake actuation direction (see also FIGS. 8A and 8B), and a brake operated-side link mechanism that operatively connects a brake operating-side link mechanism, which includes the brake operating member 110, the brake operation shaft 120 and the brake actuating member 130, to the brake control shaft 150.

As shown in FIG. 3 and the like, the brake operation shaft 120 is supported by the pair of left and right main frames 11L and 11R in a rotatable manner around the axis line with being along the vehicle width direction.

The brake operating member 110 has a proximal end connected to a first end (right end in configuration shown in the drawings) of the brake operation shaft 120 that is positioned on one side along the vehicle width direction so as to be relatively non-rotatable with respect thereto, and a free end extended upward above the step 80 to form an operational end (see FIG. 2).

A reference numeral 115 in FIGS. 2 and 3 denotes a brake position lock member 115 that holds the brake operating member 110 at the brake actuation position.

The brake actuating member 130 is supported by the brake operation shaft 120 in a relatively non-rotatable with respect thereto, so that the brake actuating member 130 swings about the axis line of the brake operation shaft 120 upon rotation of the brake operation shaft 120 around its axis line.

In the present embodiment, as shown in FIG. 3 and the like, the brake actuating member 130 is supported by the brake operation shaft 120 in a relatively non-rotatable manner with respect thereto in a state of being positioned between the pair of left and right main frames 11L and 11R and closer to the left main frame 11L.

The brake release biasing member 140 biases, toward the brake release position, the brake operating-side link mechanism including the brake operating member 110, the brake operation shaft 120 and the brake actuating member 130.

In the present embodiment, as shown in FIG. 3 and the like, the brake release biasing member 140 has a first end connected to the free end of the brake actuating member 130 and a second end connected to the left main frame 11L, and biases the brake actuating member 130 and the brake operation shaft 120 into the brake release direction around the axis line of the brake operation shaft 120 (clockwise direction as viewed from left side in the configuration shown in the drawings).

As shown in FIGS. 6 to 9 and the like, the brake control shaft 150 is supported by one of the side walls (left side wall in the configuration in the drawings) of the transmission case 40 in a rotatable manner around its axis line in a state of being extended across inside and outside of the transmission case 40 and in a state of being along the vehicle width direction so as to be in parallel with the brake operation shaft 120. When being rotated into the brake actuation direction (clockwise direction as viewed from left side in the configuration in the drawings) in accordance with manual operation from outside, the brake control shaft 150 causes the brake pressing member 63 to be rotated about the rotational axis line 63X into the brake actuation direction (clockwise direction in the configuration shown as viewed from left side in the drawings).

More specifically, as shown in FIG. 8, the brake control shaft 150 has an outer end 151 extended outward from the transmission case 40 and an inner end 152 penetrating into the transmission case 40.

The inner end 152 is engaged with the brake pressing member 63 so as to rotate the brake pressing member 63 about the rotational axis line 63X into the brake actuation direction.

More specifically, as shown in FIGS. 8A and 8B, the brake pressing member 63 has a main body 63A formed with the engagement grooves 63c, and an engaging portion 63B extended radially outward from the main body 63A.

The inner end 152 of the brake control shaft 150 has a portion to be engaged with the engaging portion 63B, the portion being formed into a noncircular shape in cross section.

With the configuration described above, upon axial rotation of the brake control shaft 150 into the brake actuation direction (clockwise direction in the configuration shown in left side), the brake pressing member 63 is rotated about the rotational axis line 63X into the brake actuation direction (clockwise direction as viewed from left side).

The brake operated-side link mechanism operatively connects the brake operating-side link mechanism to the brake control shaft 150 so that the brake control shaft 150 is rotated around the axis line by an angle corresponding to manual operation amount of the brake operating member 110.

More specifically, as shown in FIGS. 6, 9 and the like, the brake operated-side link mechanism includes a first operated-side link member 160 that has a first end operatively connected to the brake actuating member 130 so as to be shifted along its axis line in accordance with rotation of the brake actuating member 130 about the brake operation shaft 120, a brake control arm 190 that has a proximal end connected to the brake control shaft 150 so as to be relatively non-rotatable manner with respect thereto, a second operated-side link member 180 that has a proximal end connected to the brake control arm 190 in a rotatable manner about an axis parallel to the brake control shaft 150 and is positioned upward as it goes from the proximal end to a free end, and a connecting member 170 that is supported in a rotatable manner by a pivot shaft 170X parallel to the brake control shaft 150 and operatively connects the first operated-side link member 160 and the second operated-side link member 180.

The connecting member 170 has a first arm portion 171 that is connected to a second end of the first operated-side link member 160 and a second arm portion 172 that is connected to the free end of the second operated-side link member 180.

The brake operated-side link mechanism operates as follows.

When the brake actuating member 130 swings into the brake actuation direction (counterclockwise direction as viewed from left side in the present embodiment) in accordance with braking operation on the brake operating member 110, the first operated-side link member 160, which is connected to the brake actuating member 130, is shifted to a first axial direction (forward in the configuration shown in the drawings), and the connecting member 170 is accordingly turned about the pivot shaft 170X into a first direction (clockwise direction as viewed from left side in the configuration shown in the drawings).

The second operated-side link member 180 is shifted to a first axial direction (downward in the configuration shown in the drawings) in association with turn of the connecting member 170 about the pivot shaft 170X into the first direction so as to turn the brake control arm 190 about the brake control shaft 150 into a first direction (clockwise direction as viewed from left side in the configuration shown in the drawings) as well as to rotate the brake control shaft 150 around its axis line into the brake actuation direction (clockwise direction as viewed from left side in the configuration shown in the drawings).

The brake operation mechanism 100 configured as described above rotates the brake pressing member 63 (see FIGS. 8A and 8B) about the rotational axis line 63X by an amount corresponding to the manual operation amount of the brake operating member 110, whereby the group of friction plates 62 are brought into frictional contact with each other at the level corresponding to the manual operation amount of the brake operating member 110.

However, abrasion of the group of friction plates 62 changes the relationship between the manual operation amount of the brake operating member 110 and the level of frictional contact of the group of friction plates 62 (in other words, the magnitude of braking power generated by the brake mechanism 60), and thus sufficient braking power may not be generated by the brake mechanism 60 despite the fact that the brake operating member 110 is manually operated by a predetermined amount.

In order to prevent such a defect, the brake operation mechanism 100 further includes a brake adjustment mechanism 200 capable of adjusting the position of the brake control shaft 150 around its axis line in the case where the brake operating member 110 is located at the brake release position.

Figure 10:
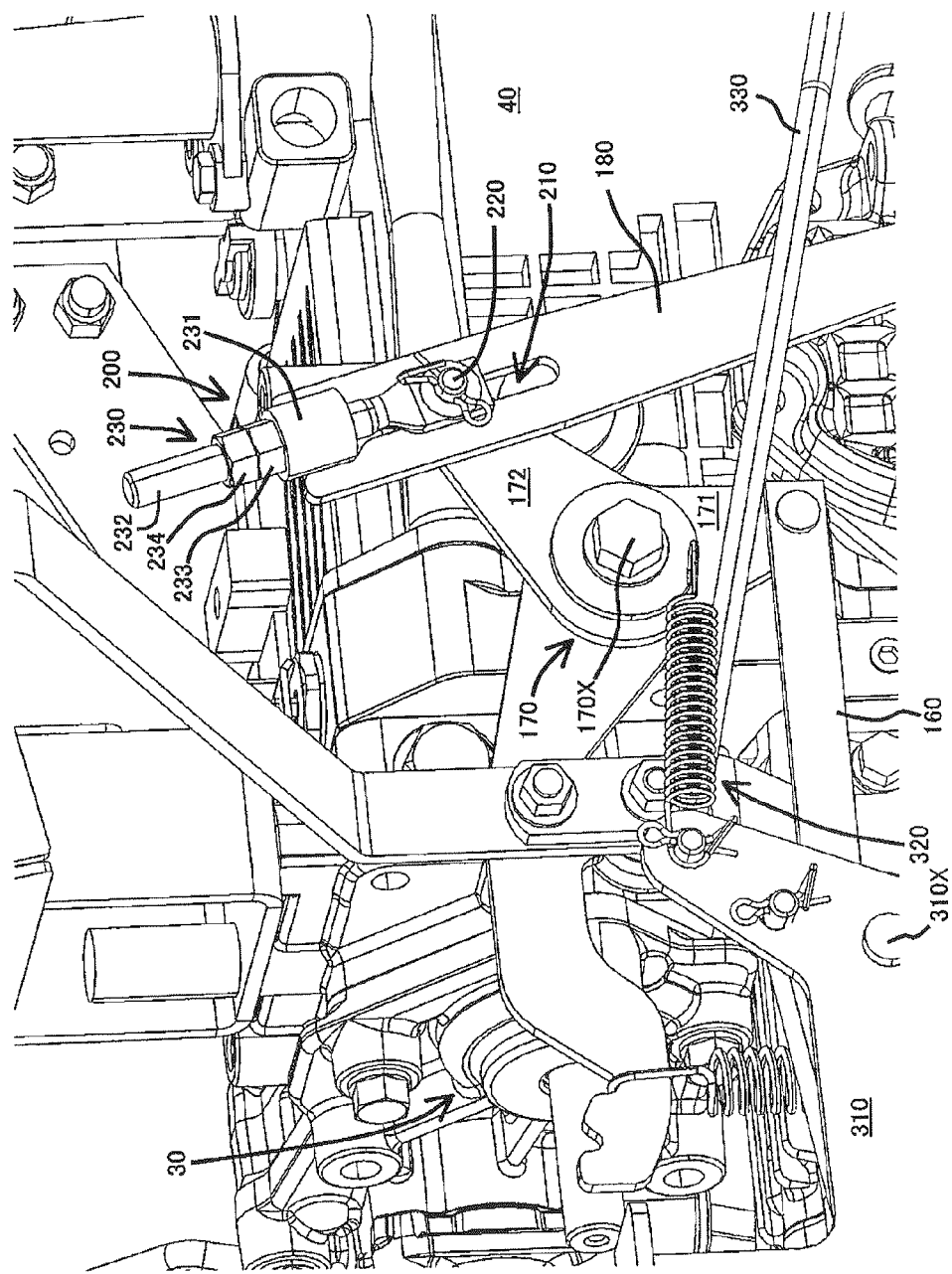
FIG. 10 is a partial enlarged perspective view of the working vehicle.

FIG. 10 is an enlarged side view of the connecting member 170 and the vicinity thereof.

It is noted that FIG. 10 does not show some of the components in order to clearly show the brake adjustment mechanism 200.

The brake adjustment mechanism 200 is configured to adjust the position of the brake control shaft 150 around the axis line in the case where the brake operating member 110 is located at the brake release position by changing a connecting position at which the second arm portion 172 of the connecting member 170 is connected to the second operated-side link member 180.

More specifically, as shown in FIG. 10, the brake adjustment mechanism 200 includes a slit 210 that is formed on the free end side of the second operated-side link member 180 so as to be along the axial line direction, an engagement projection 220 that is provided on the second arm portion 172 of the connecting member 170 and is engaged into the slit 210, and a position-adjusting member 230 that is capable of adjusting a position, in the longitudinal direction of the slit 210, at which the engagement projection 220 is engaged into the slit 210.

Although the position-adjusting member 230 can be embodied in various configurations, the position-adjusting member 230 in the present embodiment includes, as shown in FIG. 10, a hollow guide member 231 that is fixed to the second operated-side link member 180 so as to have an axis line aligned along the longitudinal direction of the slit 210, a bolt member 232 that is inserted through the hollow portion of the guide member 231 and has a proximal end connected to the engagement projection 220 and a free end extended upward beyond the free end of the second operated-side link member 180, and an adjusting nut 233 that allows the bolt member 232 to be screwed thereinto while being in contact with the upper end surface of the guide member 231.

A reference numeral 234 in FIG. 10 denotes a locking nut 234 that is screwed to the bolt member 232 at a position closer to the free end of the bolt member 232 than the adjusting nut 233 and is in contact with the upper end surface of the adjusting nut 233 so as to prevent slackening of the adjusting nut 233.

The brake adjustment mechanism 200 thus configured operates as follows.

In the case where the group of friction plates 62 are not abraded, the brake adjustment mechanism 200 is set in an initial state where the second operated-side link member 180 is connected to the second arm portion 172 of the connecting member 170 in a state where the second operated-side link member 180 is positioned at an initial position in the longitudinal direction.

When the brake operating member 110 is located at the brake release position, the connecting member 170 is located at the brake release position around the pivot shaft 170X via the brake operation shaft 120, the brake actuating member 130, and the first operated-side link member 160. Accordingly, when the brake operating member 110 is located at the brake release position with the brake adjustment mechanism 200 being set in the initial state, the second operated-side link member 180 is located at an initial brake release position that is defined by the initial state of the brake adjustment mechanism 200.

When the brake operating member 110 is shifted from the brake release position to the brake actuation position, the second operated-side link member 180 is shifted substantially downward in the axial line direction to an initial brake actuation position via the brake operation shaft 120, the brake actuating member 130, the first operated-side link member 160, and the connecting member 170.

In association with the movement of the second operated-side link member 180 from the initial brake release position to the initial brake actuation position, the brake control shaft 150 is rotated around its axis line via the brake control arm 190 from an initial brake release position to an initial brake actuation position so as to press the brake pressing member 63 from an initial brake release position to an initial brake actuation position toward the group of friction plates 62, whereby the group of friction plates 62 are brought into frictional contact with each other.

Described next is the case where the group of friction plates 62 are abraded.

If the abraded group of friction plates 62 are abraded away, they are not sufficiently brought into frictional contact with each other even when the brake pressing member 63 is pressed to the initial brake actuation position.

When such situation occurs due to the abrasion of the group of friction plates 62, in the state where the brake operating member 110 is located at the brake release position (in other words, in the state where the connecting member 170 is located at the brake release position around the pivot shaft 170X), the brake adjustment mechanism 200 is operated so as to locate the second operated-side link member 180 at a position that is shifted from the initial brake release position toward the initial brake actuation position.

More specifically, at the time when the brake operating member 110 is not operated, the brake adjustment mechanism 200 is adjusted such that the second arm portion 172 of the connecting member 170 is connected to the second operated-side link member 180 at a position closer to the free end of the second operated-side link member 180 rather than the connecting position at which the second arm portion 172 is connected to the second operated-side link member 180 at the initial brake release position.

In the present embodiment, it is possible to change the length of the portion of the bolt member 232 that is extended downward from the guide member 231 by shifting the locking nut 234 so as to be distant from the adjusting nut 233 and then turning the adjusting nut 233.

More specifically, the adjusting nut 233 is turned so that the connecting position at which the proximal end of the bolt member 232 (in other words, the free end of the second arm portion 172) is connected to the second operated-side link member 180 is relatively shifted toward the free end of the second operated-side link member 180. Such operation shifts the second operated-side link member 180 downward. After turning the adjusting nut 233, the locking nut 234 is brought into contact with the upper end surface of the adjusting nut 233 so as to hold the adjusting nut 233 and the bolt member 232 respectively at the adjusted positions.

Upon adjustment of the brake adjustment mechanism 200 as described above, positions of the brake control arm 190, the brake control shaft 150, and the brake pressing member 63 in the case where the brake operating member 110 is located at the brake release position are shifted respectively from the initial brake release positions toward the initial brake actuation positions.

Accordingly, when the brake operating member 110 is located at the brake actuation position, the brake pressing member 63 is pressed beyond the initial brake actuation position to a position of further pressing the group of friction plates 62, thereby realizing sufficient frictional contact of the abraded group of friction plates 62.

As shown in FIGS. 4, 6, 9, 10 and the like, in the present embodiment, the free end side of the second operated-side link member 180 that is provided with the brake adjustment mechanism 200 is extended upward to a position accessible from above the fender 90 (see FIG. 2), thereby realizing easy access to the brake adjustment mechanism 200.

As shown in FIGS. 3, 4, 9 and the like, in the present embodiment, there is provided a driver's seat support frame 16 on the upper surface of the transmission case 40, and the driver's seat 15 is supported on the upper surface of the transmission case 40 via the driver's seat support frame 16.

As shown in FIG. 2, the fender 90 is embodied as an integral fender that has a left fender portion 90L and a right fender portion 90R respectively covering the left side and the right side of the driver's seat 15, and a central fender portion 90C connecting the left and right fender portions 90L and 90R, which are all integrally formed.

Figure 11:
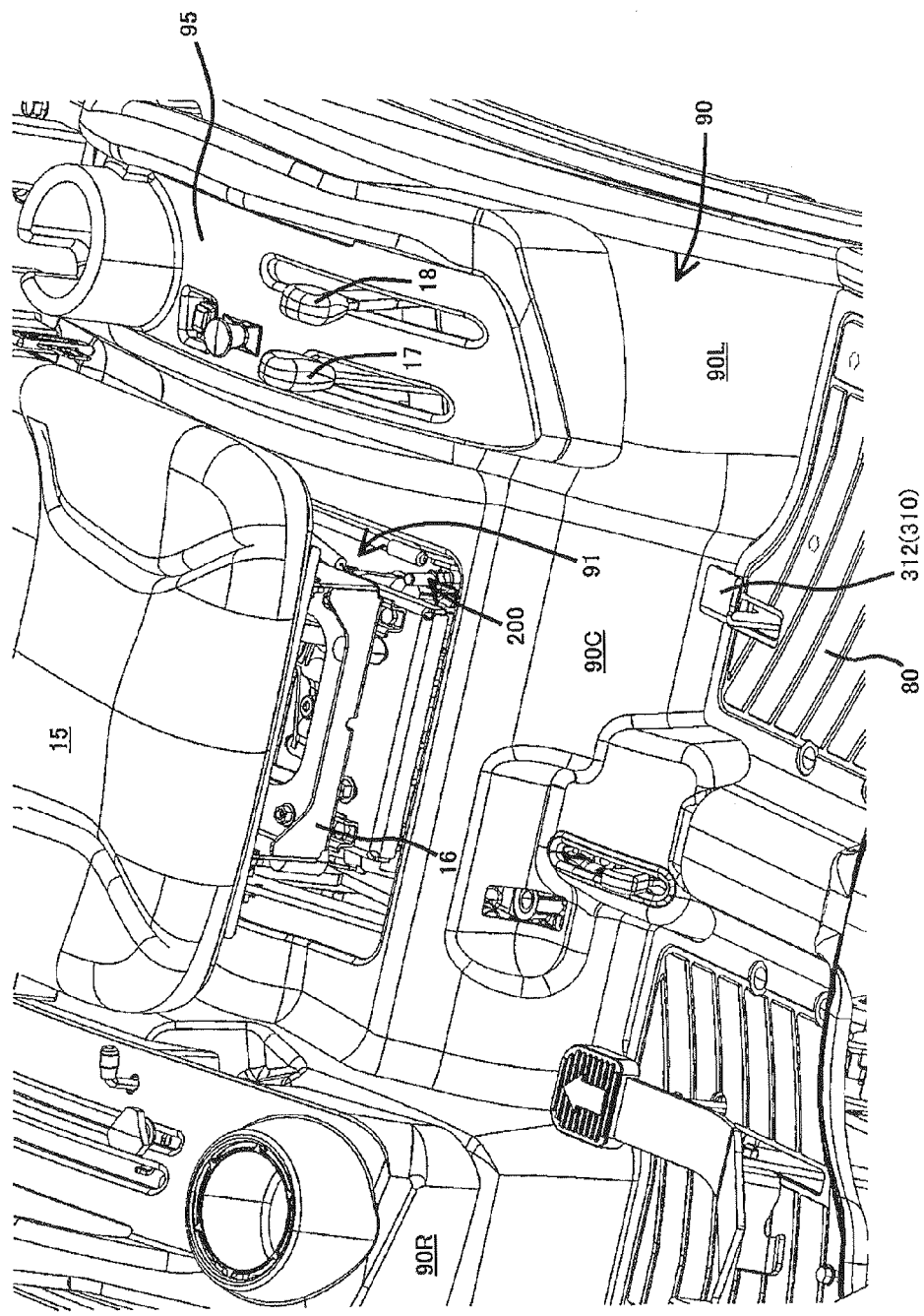
FIG. 11 is a partial enlarged perspective view of a vicinity of a driver's seat in the working vehicle.

FIG. 11 is a perspective view of the driver's seat 15 and the vicinity thereof.

As shown in FIG. 11, in the integral fender 90, the central fender portion 90C is formed with an opening 91 formed for allowing the driver's seat support frame 16 to be mounted.

The present embodiment makes it possible to access the brake adjustment mechanism 200 from above the fender 90 through the opening 91.

More specifically, the free end of the second operated-side link member 180 is extended upward along the side wall of the transmission case 40 between the pair of left and right main frames 11L and 11R to the vicinity of the opening 91, so that the brake adjustment mechanism 200 provided at the free end side of the second operated-side link member 180 is made accessible through the opening 91 from above the fender 90.

In place of or in addition to the above configuration, in a case where the driver's seat 15 is configured to be capable of taking a mount position and an open position around a rotational shaft 15X so as to allow access to the upper surface of the transmission case 40 (see FIG. 12), the brake adjustment mechanism 200 is made accessible by locating the driver's seat 15 at the open position to provide a space to access the opening 91.

This arrangement is effective in a case where the space to access the opening 91 is too small with the driver's seat 15 being located at the mount position or in a case where the left fender portion 90L, the right fender portion 90R, and the central fender portion 90C are provided separately from one another and the opening 91 is blocked with the driver's seat 15 being located at the mount position.

Figure 12:
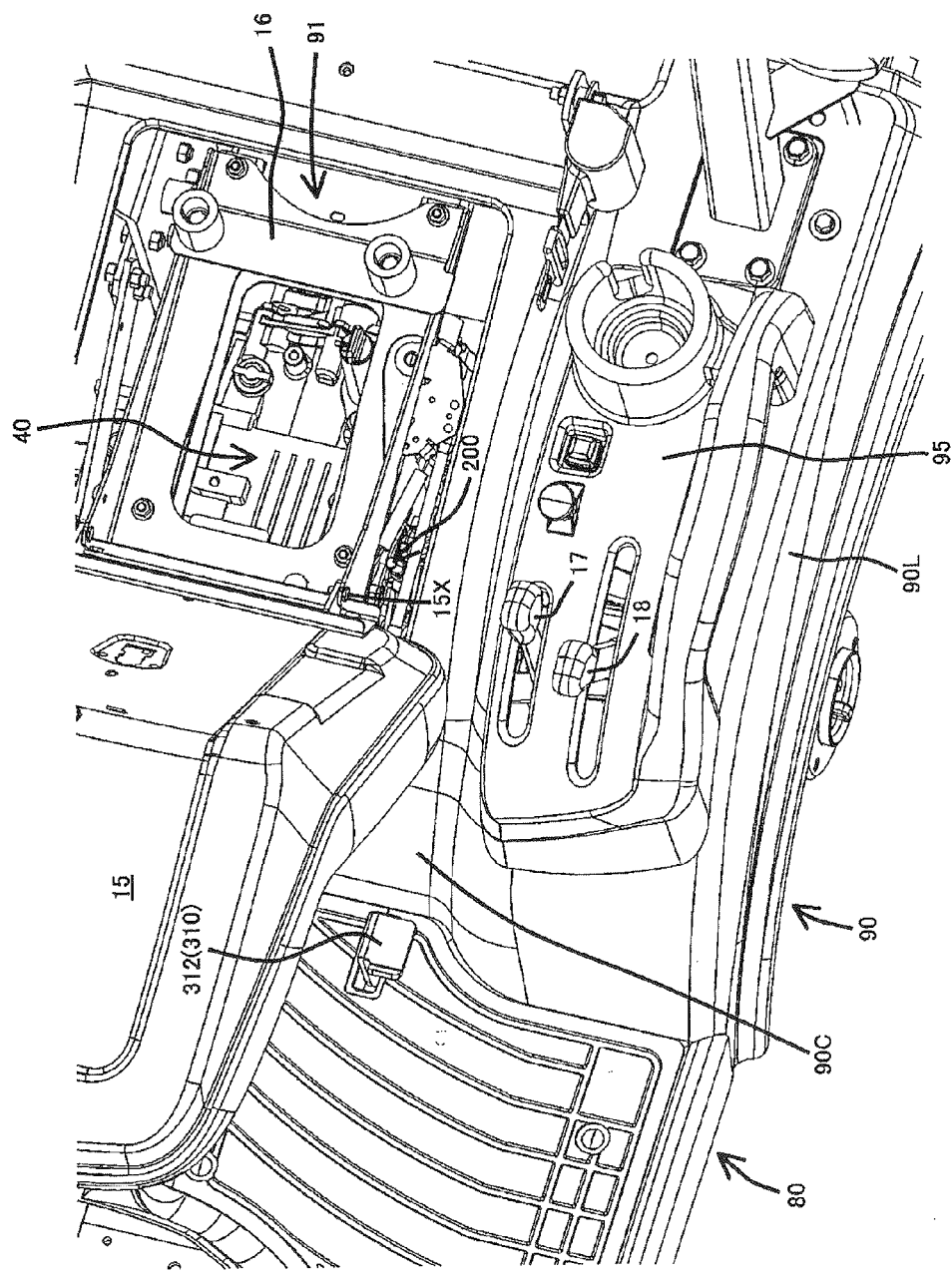
FIG. 12 is a partial enlarged perspective view with the driver's seat being opened.

Furthermore, as shown in FIGS. 2, 11, and 12, in the configuration in which a lever guide member 95 is detachably provided to the fender 90 so as to cover a lever opening (not shown) formed in the fender 90, the brake adjustment mechanism 200 can be accessed through the lever opening that appears by detaching the lever guide member 95 from the fender 90.

More specifically, as shown in FIGS. 2 to 4, 11, and 12, the working vehicle 1 is provided with speed change levers such as a travel system speed change lever 17 (sub speed change lever, for example) and a PTO system speed change lever 18 each disposed such that a grip portion is located above the fender 90 on one of sides of the driver's seat 15.

In the working vehicle 1 thus configured, the fender 90 is provided with the lever opening that is blocked by the lever guide member 95, and the grip portions of the speed change levers are extended upward above the fender 90 through a guide hole fowled in the lever guide member 95.

Accordingly, when the free end side of the second operated-side link member 180 that is provided with the brake adjustment mechanism 200 is extended upward to the vicinity of the lever opening, the brake adjustment mechanism 200 is made accessible from above the fender 90 through the lever opening that appears by detaching the lever guide member 95 from the fender 90.

Next described below is the differential-lock operation mechanism 300.

The differential-lock operation mechanism 300 is configured to locate the differential-lock shaft 56 at the differential-lock position in accordance with manual operation.

More specifically, as shown in FIGS. 3, 4, 6, 8, 9 and the like, the differential-lock operation mechanism 300 includes a differential-lock operating member 310 that is supported in a rotatable manner about a differential-lock operation shaft 310X parallel to the brake operation shaft 120 in a state capable of being manually operated, a differential biasing member 320 that biases the differential-lock operating member 310 about the differential-lock operation shaft 310X toward a differential position, a differential-lock link member 330 that is operatively connected to the differential-lock operating member 310, and a differential-lock pressing member 340 that is supported in a rotatable manner about a differential-lock control shaft 340X extending substantially along the vertical direction and presses the differential-lock shaft 56 in accordance with movement of the differential-lock link member 330.

As shown in FIGS. 3 and 4, the differential-lock operation shaft 310X is supported by one of the pair of left and right main frames 11L and 11R (the left main frame 11L in the configuration shown in the drawings) so as to be in parallel with the brake operation shaft 120.

The differential-lock operating member 310 is supported in a rotatable manner about the differential-lock operation shaft 310X and is configured to take, in accordance with manual operation, a differential-lock position and a differential position that are positioned respectively on a first direction side (counterclockwise direction side as viewed from left side in the configuration shown in the drawings) and a second direction side (clockwise direction side as viewed from left side) about the differential-lock operation shaft 310X.

In the present embodiment, the differential-lock operating member 310 is embodied as a differential-lock pedal.

More specifically, as shown in FIGS. 3, 4, 6, and 9, the differential-lock operating member 310 has a support portion 311 that is supported by the differential-lock operation shaft 310X, a step portion 312 that is extended from the support portion 311 forward and upward so as to be above the step 80 supported directly or indirectly by the pair of left and right main frames 11L and 11R (see also FIGS. 2, 11, and 12), and a rear end portion 313 that is extended rearward and upward from the support portion 311.

The differential biasing member 320 biases the differential-lock operating member 310 toward the differential position that is positioned on the second direction side about the differential-lock operation shaft 310X.

In the present embodiment, as shown in FIGS. 3, 4 and the like, the differential biasing member 320 is provided as a coil spring that has a first end connected to the rear end portion 313 of the differential-lock operating member 310 and a second end connected to the left main frame 11L.

The differential-lock link member 330 has a first end side operatively connected to the differential-lock operating member 310 so as to be shifted along its axis line in accordance with rotation of the differential-lock operating member 310 about the differential-lock operation shaft 310X.

In the present embodiment, as shown in FIGS. 6, 9 and the like, the differential-lock link member 330 is extended along the vehicle lengthwise direction with the first end side (a front end side in the present embodiment) being connected to the rear end portion 313 of the differential-lock operating member 310, and is shifted to a differential-lock position and a differential position that are positioned on front and rear sides, respectively, in association with operation of the differential-lock operating member 310 to the differential-lock position and the differential position about the differential-lock operation shaft 310X.

The differential-lock pressing member 340 is configured to be located at a differential-lock position and a differential position around the differential-lock control shaft 340X respectively in association with movement of the differential-lock link member 330 into forward and rearward directions.

More specifically, as shown in FIGS. 6 and 8, the differential-lock pressing member 340 has a central portion 341 that is supported by the differential-lock control shaft 340X, a connection portion 342 that is extended radially outward from the central portion 341 and is connected with the second end side (rear end side in the present embodiment) of the differential-lock link member 330, and a pressing portion 343 that is extended radially outward from the central portion 341 to face a pressed portion 56a of the differential-lock shaft 56.

The differential-lock pressing member 340 is turned about the differential-lock control shaft 340X into the differential-lock direction (clockwise direction in plan view, see FIG. 8) via the differential-lock link member 330 upon operation of the differential-lock operating member 310 to the differential-lock position, so that the pressing portion 343 presses the differential-lock shaft 56 toward the differential-lock position.

The transmission state of the differential mechanism 50 is switchable independently from the actuation state of the brake mechanism 60. However, as in the present embodiment, in the case where the brake mechanism 60 applies braking power to a portion on an upstream side of the differential mechanism 50 in the power transmission direction, the differential mechanism 50 needs to be shifted into the differential-lock state when the brake mechanism 60 is shifted into the brake actuation state.

More specifically, in the configuration described above, braking power is operatively applied to the input ring gear of the differential mechanism 50 when the brake mechanism 60 is brought into the brake actuation state. If the differential mechanism 50 remains in the differential state (that is, the state where the pair of drive axles 6 are rotatable about the respective axis lines relatively to each other) in this brake actuation state, the braking power may not be applied equally to the pair of drive axles 6.

In order to prevent such a defect, the brake/differential-lock operation structure according to the present embodiment is further provided with a brake and differential-lock interlock/prevention mechanism 400.

Figure 13:
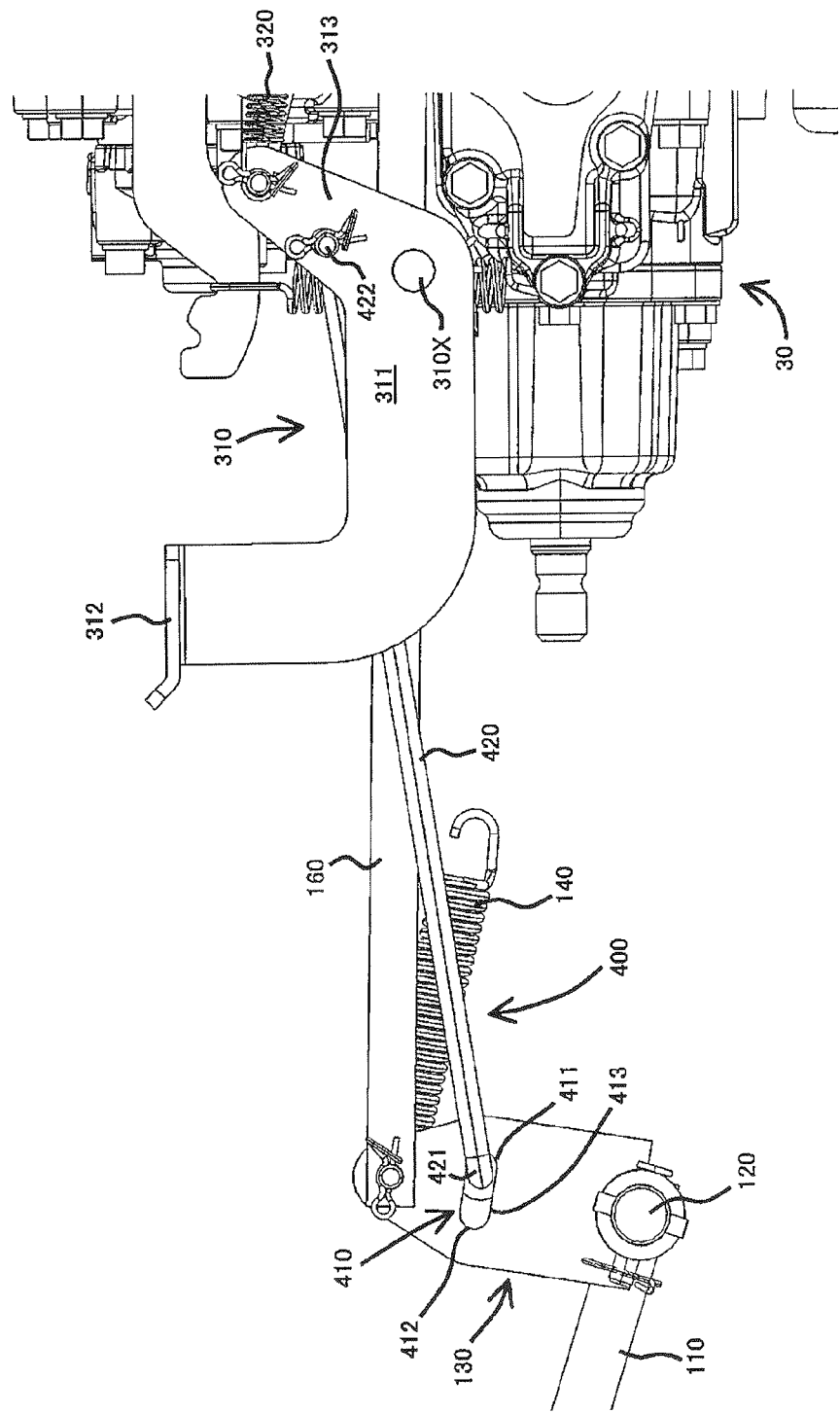
FIG. 13 is a partial enlarged side view of the working vehicle.

FIG. 13 is a left side view of the brake actuating member 130 and the differential-lock operating member 310 as well as the vicinities thereof.

As shown in FIGS. 6 and 13, the brake and differential-lock interlock/prevention mechanism 400 includes an elongated hole 410 that is formed in the brake actuating member 130, and an interlocking member 420 that has a first end 421 engaged into the elongated hole 410 and a second end 422 operatively connected to the differential-lock operating member 310.

As shown in FIG. 13, the elongated hole 410 has a close end 411 that is located close to the differential-lock operating member 310, a distant end 412 that is located distant from the differential-lock operating member 310, and an intermediate portion 413 that communicates with the close end 411 and the distant end 412.

The interlocking member 420 is configured so that the first end 421 is located at the close end 411 in a brake/differential-lock non-operation state where the brake operating member 110 is located at the brake release position and the differential-lock operating member 310 is located at the differential position, and the first end 421 is shifted from the close end 411 to the distant end 412 in the elongated hole 410 as the differential-lock operating member 310 is shifted to the differential-lock position from the brake/differential-lock non-operation state.

The brake and differential-lock interlock/prevention mechanism 400 thus configured operates as follows.

As described above, the first end 421 of the interlocking member 420 is located at the close end 411 of the elongated hole 410 in the brake/differential-lock non-operation state where the brake operating member 110 is located at the brake release position and the differential-lock operating member 310 is located at the differential position.

When the differential-lock operating member 310 is shifted to the differential-lock position from this brake/differential-lock non-operation state, the interlocking member 420 is pressed into a first axial direction (forward in the present embodiment). In this case, the first end 421 of the interlocking member 420 is simply shifted from the close end 411 to the distant end 412 within the elongated hole 410 and does not influence the brake actuating member 130. Accordingly, the differential-lock operating member 310 can be independently operated.

To the contrary, when the brake operating member 110 is shifted to the brake actuation position from the brake/differential-lock non-operation state, the brake actuating member 130 is rotated about the brake operation shaft 120 into the brake actuation direction (counterclockwise direction as viewed from left side in the present embodiment) that is a direction away from the differential-lock operating member 310 (see FIG. 13 and the like). Such rotation of the brake actuating member 130 into the brake actuation direction causes the interlocking member 420 to be shifted into the first axial direction (forward in the present embodiment), so that the differential-lock operating member 310 is rotated about the differential-lock operation shaft 310X from the differential position to the differential-lock position.

In other words, when the brake operating member 110 is shifted to the brake actuation position from the brake/differential-lock non-operation state, in association with this brake operation, the differential mechanism 50 is brought into the differential-lock state via the differential-lock operation mechanism 300.

Accordingly, when the brake mechanism 60 is actuated, braking power is applied equally to the pair of drive axles 6.

In addition to the various effects as described above, the brake/differential-lock operation structure according to the present embodiment exerts the following effects.

Figures 16A, 16B:
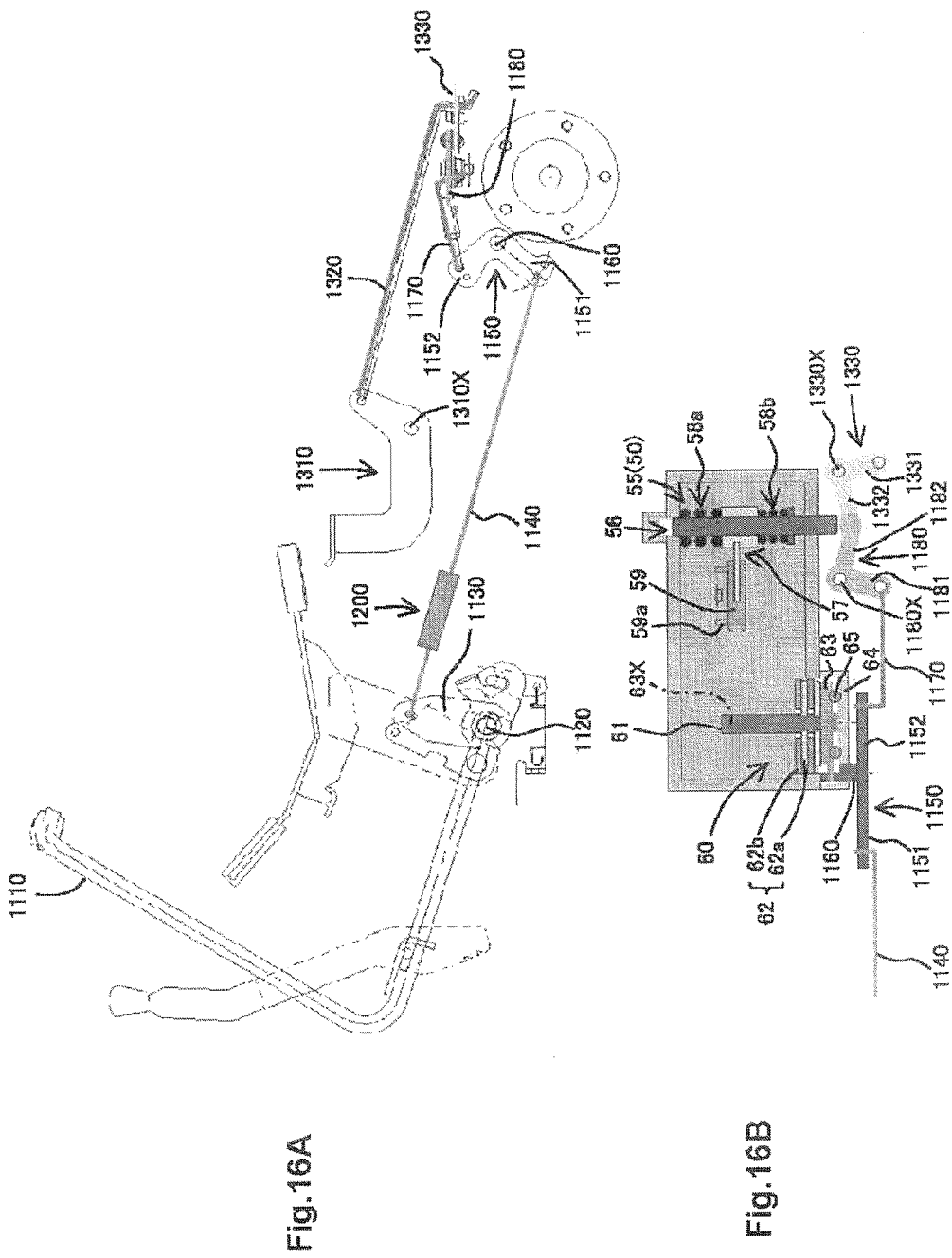
FIGS. 16A and 16B are a schematic side view and a schematic plan view of a conventional brake/differential-lock operation structure, respectively.
Figure 17:
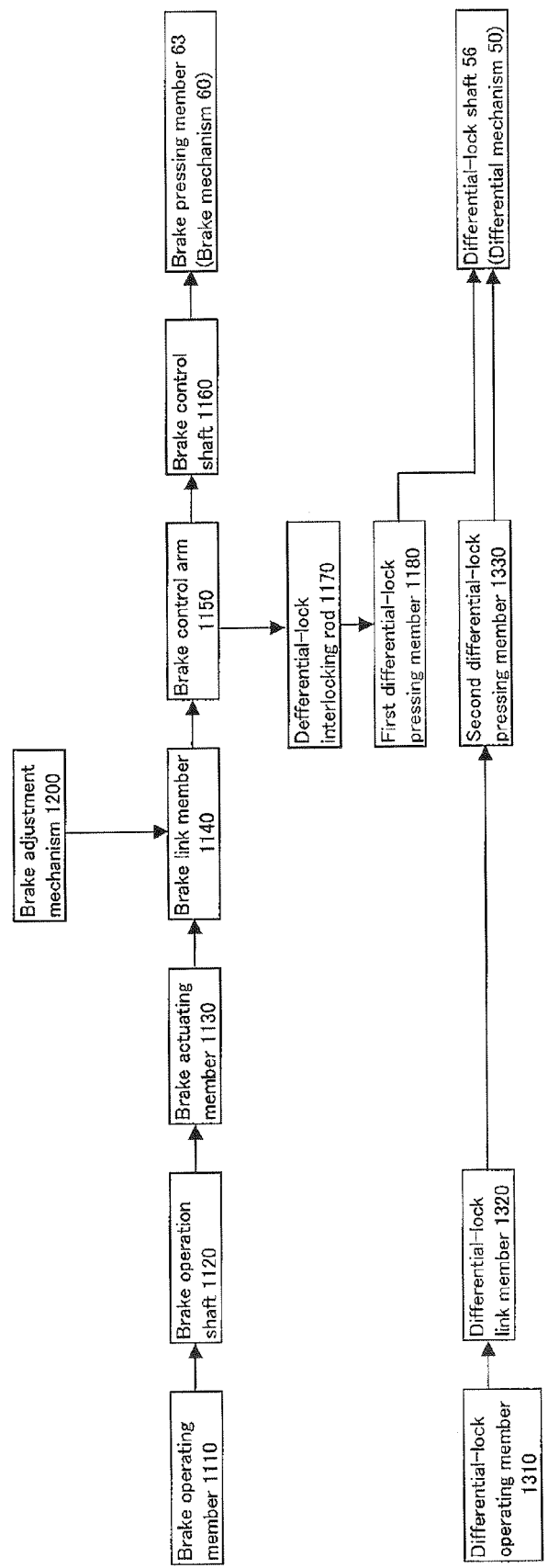
FIG. 17 is a flowchart showing an operational power transmission path in the conventional brake/differential-lock operation structure shown in FIG. 16.

FIG. 17 is a flowchart showing the operational power transmission path of the conventional brake/differential-lock operation structure shown in FIGS. 16A and 16B.

As shown in FIGS. 16A, 16B, and 17, the conventional brake/differential-lock operation structure is configured to extract differential-lock operational power for bringing the differential mechanism 50 into the differential-lock state from the brake operation path that transmits brake operational power from the brake operating member 1110 to the brake mechanism 60, and to switch the transmission state of the differential mechanism 50 via the first differential-lock pressing member 1180 with use of this differential-lock operational power.

In this conventional brake/differential-lock operation structure, the brake adjustment mechanism 1200 is inserted in the brake link member 1140 so as to adjust the axial length of the brake link member 1140.

In this conventional configuration described above, readjustment, with use of the brake adjustment mechanism 1200, of the initial position of the brake pressing member 63 at the time when no operation being made to the brake operating member 1110 in accordance with abrasion of the group of friction plates 62 of the brake mechanism 60 also changes the initial position of the first differential-lock pressing member 1180 at the time when no operation being made to the brake operating member 1110.

For example, when the brake link member 1140 is elongated by the brake adjustment mechanism 1200, the first differential-lock pressing member 1180 unfavorably may press the differential-lock shaft 56 toward the differential-lock position despite the fact that the brake operating member 1110 is located at the brake release position.

Therefore, the conventional configuration requires, upon shifting the brake adjustment mechanism 1200 from the initial state, readjustment of a brake-operation-basis differential-lock operation path for taking out operation power from the brake operation path and transmitting the same to the differential-lock shaft 56 or readjustment of the initial position of the differential-lock shaft 56.

Readjustment of the initial position of the differential-lock shaft 56 also requires readjustment of a differential-lock operation path for extending from the differential-lock operating member 1310 to the second differential-lock pressing member 1330.

To the contrary, in the brake/differential-lock operation structure according to the present embodiment, readjustment of the brake adjustment mechanism 200 requires neither readjustment of a brake-operation-basis differential operation path for bringing the differential mechanism 50 into the differential-lock state in association with the brake operation mechanism 100 nor readjustment of an independent-operation-basis differential operation path for transmitting operation force by the differential-lock operation mechanism 300.

Figure 14:
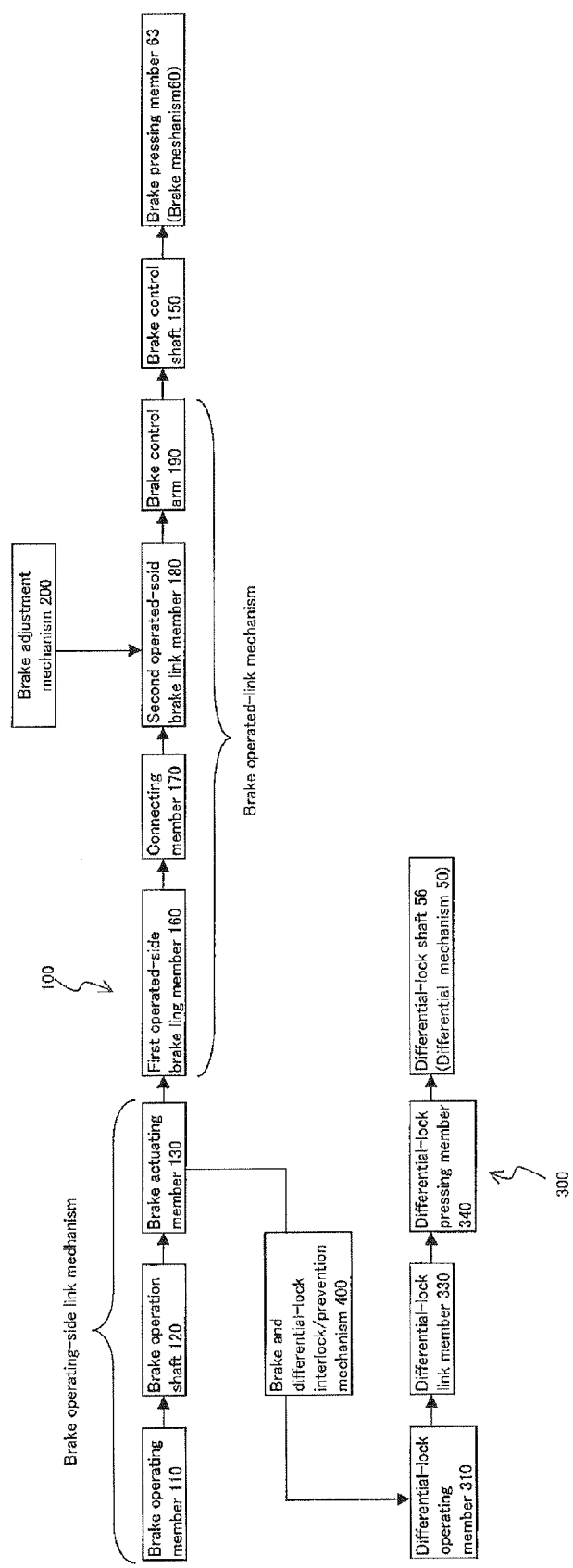
FIG. 14 is a flowchart showing an operational power transmission path in the brake/differential-lock operation structure according to the first embodiment of the present invention.

FIG. 14 is a flowchart showing the operational power transmission path in the brake/differential-lock operation structure according to the present embodiment.

As shown in FIG. 14 and as described earlier, the brake/differential-lock operation structure according to the present embodiment includes the brake and differential-lock interlock/prevention mechanism 400 that allows the differential-lock operation mechanism 300 to be independently operated as well as causes the brake operation mechanism 100 and the differential-lock operation mechanism 300 to be interacted with each other such that the differential mechanism 50 is brought into the differential-lock state in association with braking operation of the brake operation mechanism 100.

As shown in FIG. 14, the brake adjustment mechanism 200 is inserted into the brake operation mechanism 100 so as to be positioned on a downstream side, in the operational power transmission direction, of a connected portion (the brake actuating member 130 in the present embodiment) of the brake operation mechanism 100 at which the brake and differential-lock interlock/prevention mechanism 400 is connected to the brake operation mechanism 100.

This configuration makes it possible to maintain, even if the brake adjustment mechanism 200 is readjusted, the initial settings for both of the brake-operation-basis differential operation path for bringing the differential mechanism into the differential state in association with braking operation of the brake operating member 110 and the independent-operation-basis differential operation path for bringing the differential mechanism 50 into the differential state in accordance with differential-lock manipulation of the differential-lock operating member 310. Consequently, the configuration according to the present embodiment effectively prevents the defect caused by the conventional configuration.

As already described, in the present embodiment, the brake adjustment mechanism 200 is provided at the free end side of the second operated-side link member 180 so as to be inserted between the connecting member 170 and the second operated-side link member 180 in the operational power transmission direction.

The brake/differential-lock operation structure according to the present embodiment further includes the following configuration relating to the switching timing of shifting the differential mechanism 50 from the differential state to the differential-lock state in association with manual operation on the brake operating member 110.

As already described, the brake operating member 110 has the proximal end supported by the brake operation shaft 120 in a relatively non-rotatable manner with respect thereto. In other words, the brake operating member 110 can be manually operated so as to be rotated about the axis line of the brake operation shaft 120.

More specifically, the brake operating member 110 can be manually operated in an operational range extending between a braking power release position and a maximum braking power position that are positioned in the first and second directions around the axis line of the brake operation shaft 120, respectively.

As described above, the brake operation mechanism 100 is configured to rotate the brake pressing member 63 about the rotational axis line 63X into the brake actuation direction by an amount corresponding to the manual operation amount of the brake operating member 110.

Accordingly, the brake mechanism 60 generates braking power by the magnitude corresponding to the manual operation amount of the brake operating member 110 of the brake operation mechanism 100 from the braking power release position to the maximum braking power position.

FIG. 15 is a graph indicating the relationship between the operation position of the brake operating member 110 and the strength of the braking power generated by the brake mechanism 60.

As shown in FIG. 15, in the case where the brake operating member 110 is located at the braking power release position (that is, the case where the brake operating member 110 is not manually operated), no braking power is generated by the brake mechanism 60. As the brake operating member 110 is operated from the braking power release position toward the maximum braking power position, the strength of the braking power generated by the brake mechanism 60 is increased. When the brake operating member 110 reaches the maximum braking power position, the brake mechanism 60 generates the maximum braking power.

In this configuration, the brake and differential-lock interlock/prevention mechanism 400 operatively connects the brake operation mechanism 100 and the differential-lock operation mechanism 300 such that the differential mechanism 50 is brought into the differential state when the brake operating member 110 is located closer to the braking power release position than a predetermined position (hereinafter, referred to as differential/differential-lock switching position) within the operational range, and such that the differential mechanism 50 is brought into the differential-lock state when the brake operating member 110 is located closer to the maximum braking power position than the differential/differential-lock switching position.

More specifically, in a case where the brake operating member 110 is operated from the braking power release position toward the maximum braking power position, until the brake operating member 110 reaches the differential/differential-lock switching position, the differential mechanism 50 remains in the differential state and the brake mechanism 60 starts to generate braking power, which is increased in proportion to the manual operation amount of the brake operating member 110. In other words, while the brake operating member 110 is located between the braking power release position and the differential/differential-lock switching position, there is realized a differential/brake actuation state where the differential mechanism 50 is in the differential state and the brake mechanism 60 generates braking power by the magnitude corresponding to the manual operation amount of the brake operating member 110.

When the brake operating member 110 reaches the differential/differential-lock switching position, the differential mechanism 50 is shifted from the differential state into the differential-lock state. In other words, while the brake operating member 110 is located between the differential/differential-lock switching position and the maximum braking power position, there is realized a differential-lock/brake actuation state where the differential mechanism 50 is in the differential-lock state and the brake mechanism 60 generates braking power by the magnitude corresponding to the manual operation amount of the brake operating member 110.

The differential/differential-lock operation structure thus configured exerts the following effects.

For example, in a configuration in which the differential mechanism 50 is shifted from the differential state into the differential-lock state after the brake operating member 110 has been located at the maximum braking power position, the maximum braking power generated by the brake mechanism 60 is applied to the input portion of the differential mechanism 50 in a state where the pair of drive axles 6 are differentially driven to each other. Accordingly, the working vehicle 1 may turn in an unintended direction when the working vehicle 1 is stopped by the braking power of the brake mechanism 60.

Particularly in a state where the pair of drive axles 6 receive traveling loads unequal to each other as in a case where the working vehicle 1 is traveling across an inclined road, when stopping the working vehicle 1 by braking power of the brake mechanism 60, the braking power may not be effectively applied to one of the drive axles 6 that receives a smaller traveling load, thereby increasing the possibility of causing the working vehicle to be turned in an unintended direction.

On the other hand, in the configuration in which, at the time when the brake operating member 110 is operated, the differential mechanism 50 is shifted from the differential state into the differential-lock state and then the brake mechanism 60 generates braking power, the differential mechanism 50 is always in the differential-lock state at any time when receiving the braking power from the brake mechanism 60. Accordingly, if the brake mechanism 60 is actuated while the working vehicle 1 is making a turn, the brake mechanism 60 applies the braking power with the differential mechanism 50 being in the differential-lock state. As a result, one of the driving wheels 5 that is positioned on an outer side with the turning center as a reference may unfavorably slip.

Furthermore, in the configuration in which the differential mechanism 50 is shifted from the differential state into the differential-lock state and then the brake mechanism 60 starts to generate braking power, the braking distance of the working vehicle 1 may be undesirably increased.

More specifically, the shift of the differential mechanism 50 from the differential state into the differential-lock state is established by engagement of the engaging portion 59a provided in the differential-lock member 59 into the engaged portion 511 provided in the input gear 510.

Accordingly, the period of time required for engagement of the engaging portion 59a into the engaged portion 511 results in loss of time, which increases the braking distance of the working vehicle 1.

To the contrary, according to the present embodiment, as described earlier, the differential/brake actuation state is established while the brake operating member 110 is operated between the braking power release position and the differential/differential-lock switching position, and the differential-lock/brake actuation state is established while the brake operating member 110 is operated between the differential/differential-lock switching position and the maximum braking power position.

With this configuration, the working vehicle 1 is in the differential-lock/brake actuation state at the time when the working vehicle 1 is stopped with the maximum braking power of the brake mechanism 60. Therefore, it is possible to effectively prevent the defect that the working vehicle 1 is turned in an unintended direction when stopping the working vehicle.

In an initial stage of braking operation where the brake operating member 110 is operated between the braking power release position and the differential/differential-lock switching position, the working vehicle 1 is brought into the differential/brake actuation state where the brake mechanism 60 generates braking power with the differential mechanism 50 being maintained in the differential state.

Accordingly, if the brake operating member 110 is operated up to the differential/differential-lock switching position when the working vehicle 1 is making turn, braking power of the brake mechanism 60 can be applied to the travel power transmission path with the pair of driving wheels 5 being differentially driven to each other.

Moreover, according to the present embodiment, in the initial stage of braking operation of the brake operating member 110, the brake mechanism 60 starts to generate braking power without waiting for engagement of the engaging portion 59*a* into the engaged portion 511. Therefore, it is possible to effectively reduce the braking distance required to stop the working vehicle 1 by operating the brake operating member 110.

As already described, in the present embodiment, the brake adjustment mechanism 200 is inserted in the brake operation mechanism 100 at a position that is located on a downstream side, in the operational power transmission direction, of the connected portion (the brake actuating member 130 in the present embodiment) at which the brake and differential-lock interlock/prevention mechanism 400 is connected to the brake operation mechanism 100 (see FIG. 14).

Therefore, readjustment of the brake adjustment mechanism 200 causes no change in timing of switching the differential mechanism 50 from the differential state into the differential-lock state with respect to the operating position of the brake operating member 110.

The differential/differential-lock switching position is preferably set to a position closer to the braking power release position than an intermediate position in the operational range of the brake operating member 110, and is more preferably set to a position as close as possible to the braking power release position in the operational range of the brake operating member 110.

The configuration makes it possible to improve operability of the brake operating member 110, while exerting the effects of allowing the brake mechanism 60 to be actuated with the differential mechanism 50 being maintained in the differential state and preventing the working vehicle 1 from turning in an unintended direction when the working vehicle 1 is stopped by the maximum braking power of the brake mechanism 60.

More specifically, while the brake operating member 110 is located between the braking power release position and the differential/differential-lock switching position, there is required power for shifting both of the brake pressing member 63 and the differential-lock pressing member 340 in order to operate the brake operating member 110. Further, the operational power required for operating the brake mechanism 60 is increased in proportion to the braking power of the brake mechanism 60.

Accordingly, setting the differential/differential-lock switching position to be closer to the braking power release position than the intermediate position in the operational range of the brake operating member 110 increases the range in which the brake operating member 110 could be operated with small operational power. Therefore, it is possible to improve the operability of the brake operating member 110.

For example, in a case where the brake operating member 110 has an operational range L, the differential/differential-lock switching position can be set at a position that is distant from the braking power release position by 0.1 to 0.3 □L.

Second Embodiment

Described below is a preferred embodiment of the present invention with reference to the accompanying drawings.

Figure 18:
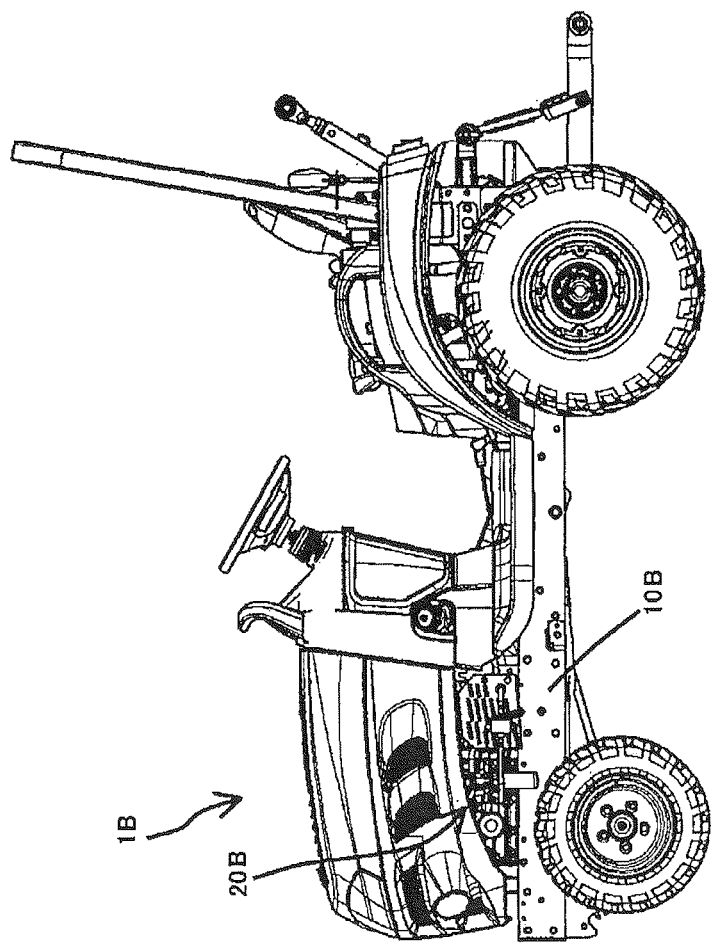
FIG. 18 is a side view of a working vehicle to which a travel speed operation apparatus according to a second embodiment of the present invention is applied

FIG. 18 is a side view of a working vehicle 1B to which a travel speed operation apparatus 100B according to the present embodiment is applied.

Figure 19:
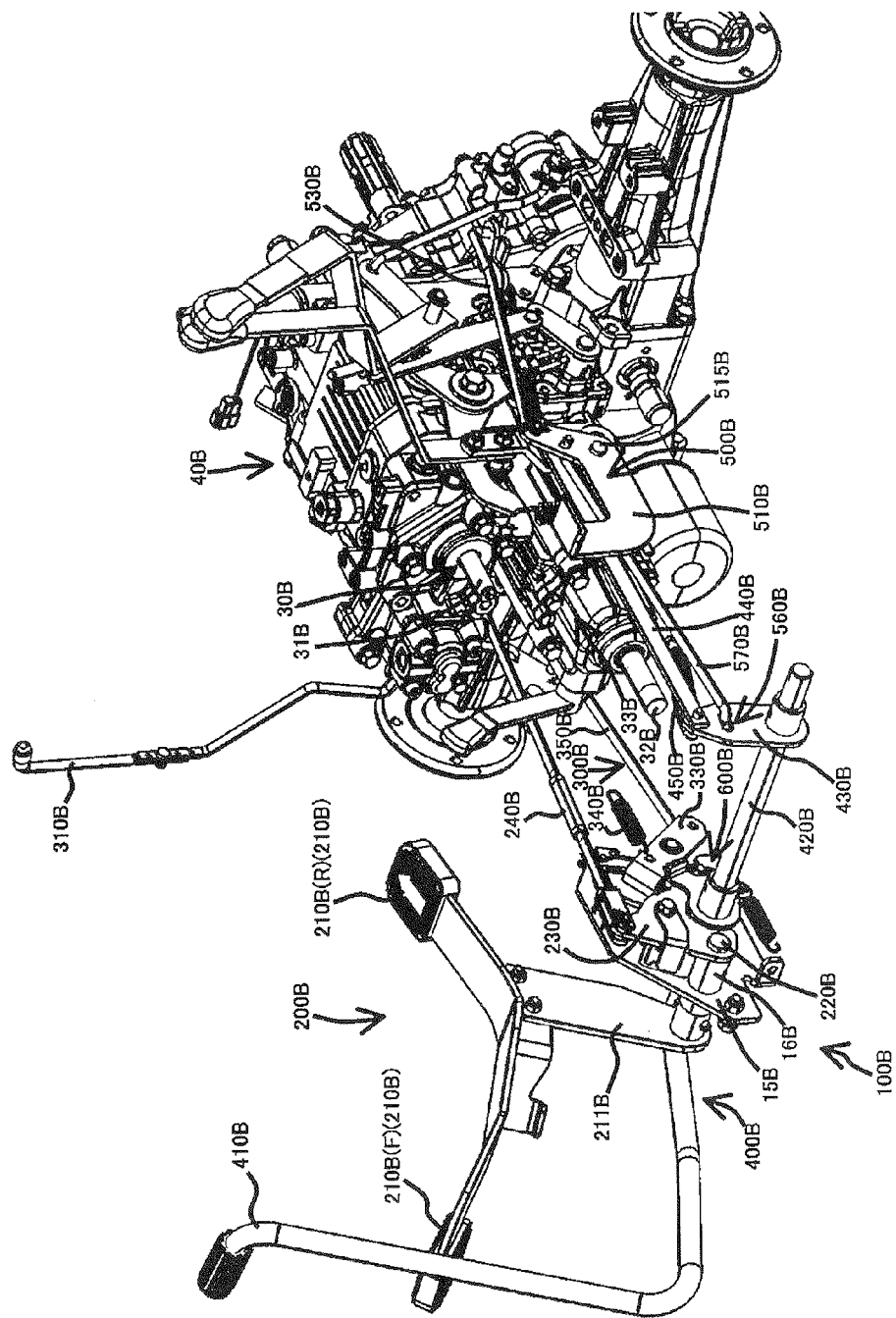
FIG. 19 is a perspective view of the travel speed operation apparatus as viewed from front and left sides.
Figure 20:
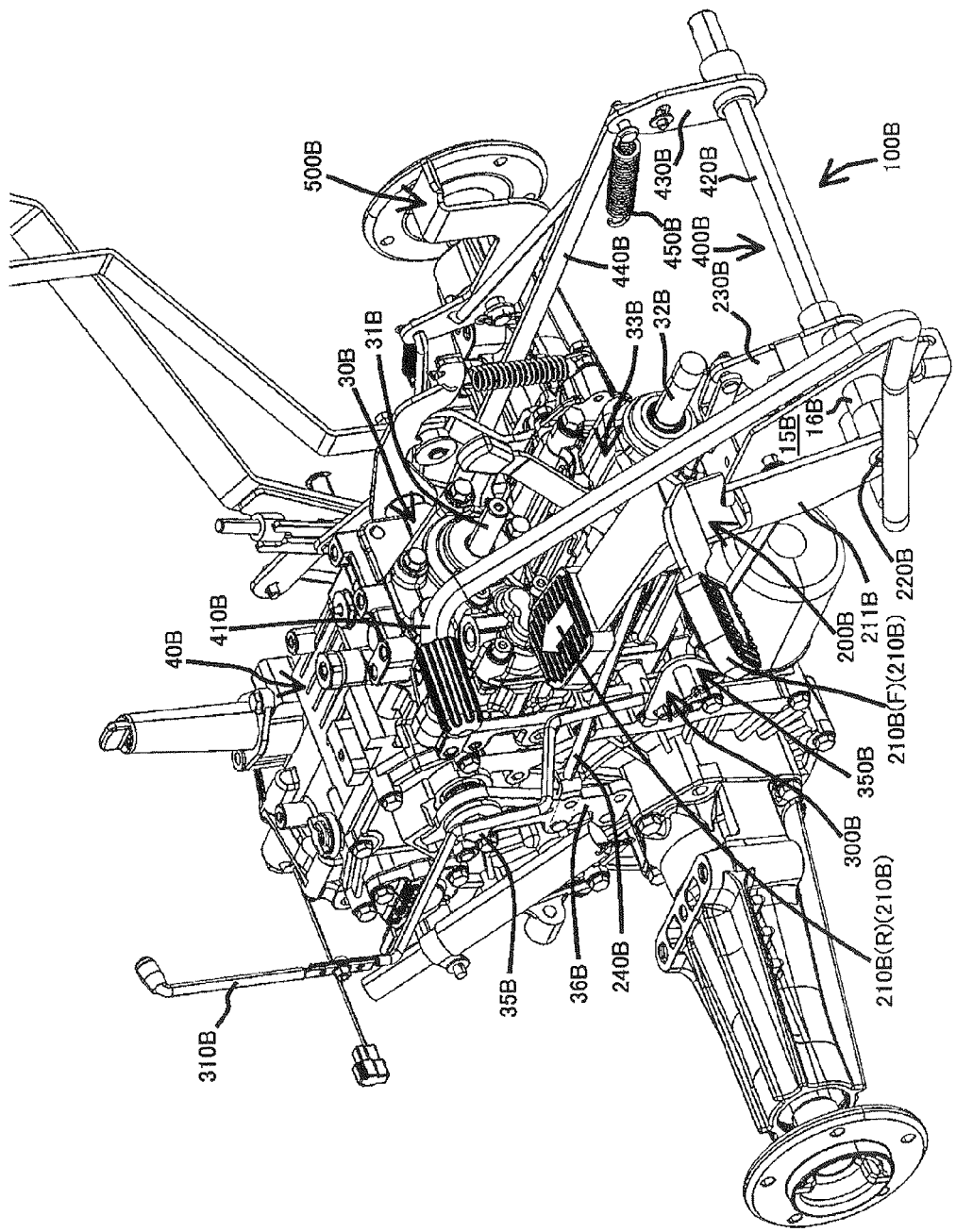
FIG. 20 is a perspective view of the travel speed operation apparatus as viewed from front and right sides.

FIGS. 19 and 20 are front perspective views of the travel speed operation apparatus 100B according to the present embodiment, and FIGS. 19 and 20 are perspective views as viewed from left and right sides with a forward travel direction of the working vehicle being as a reference, respectively.

As shown in FIGS. 18 to 20, the working vehicle 1B includes a vehicle frame 10B, a driving power source 20B that is disposed on a front portion of the vehicle frame 10B, an HST 30B that is operatively connected to the driving power source 20B, a transmission case 40B that is connected to a rear portion of the vehicle frame 10B, and a travel brake mechanism (not shown) provided in the transmission case 40B.

The HST 30B includes, as shown in FIGS. 19 and 20, a pump shaft 31B that is operatively connected to the driving power source 20B, a hydraulic pump main body (not shown) which is supported by the pump shaft 31B in a relatively non-rotatable manner with respect thereto, a hydraulic motor main body (not shown) which is fluidly connected to the hydraulic pump main body, a motor shaft 32B which supports the hydraulic motor main body in a relatively non-rotatable manner with respect thereto, and an HST case 33B that accommodates the hydraulic pump main body and the hydraulic motor main body integrally or separately.

In the HST 30B, at least one of the hydraulic pump main body and the hydraulic motor main body is of the variable displacement type. Variation in suction/discharge amount of at least one (hereinafter, referred to as variable displacement member(s)) of the hydraulic pump main body and/or the hydraulic motor main body, which are/is of the variable displacement type, changes the rotational speed of the rotational power outputted from the motor shaft 32B relative to the rotational speed of the rotational power inputted to the pump shaft 31B.

The HST 30B is thus provided, in addition to the above components, with an output adjusting member that varies the suction/discharge amount of the variable displacement member.

The output adjusting member includes, for example, a movable swash plate (not shown) that varies the suction/discharge amount of the variable displacement member, and a control shaft 35B that slants the movable swash plate.

In the configuration shown in the drawings, both the hydraulic pump main body and the hydraulic motor main body are of the variable displacement type.

Accordingly, the HST 30B includes a pump-side output adjusting member and a motor-side output adjusting member which function as the output adjusting member.

The pump-side output adjusting member is configured so as to take a neutral state of causing the suction/discharge amount of the hydraulic pump main body to be zero, a forward travel state of causing the suction/discharge amount of the hydraulic pump main body to be changed in a forward travel direction, and a rearward travel state of causing the suction/discharge amount of the hydraulic pump main body to be changed in a rearward travel direction.

The motor-side output adjusting member is configured so as to take a high-speed state of causing the hydraulic motor main body to be rotated with high speed with respect to a predetermined amount discharged from the hydraulic pump main body, and a low-speed state of causing the hydraulic motor main body to be rotated with low speed with respect to the predetermined amount.

The working vehicle 1B further includes the travel speed operation apparatus 100B.

As shown in FIGS. 19 and 20, the travel speed operation apparatus 100B includes a speed change operation mechanism 200B that operates the HST 30B, a cruise operation mechanism 300B that switches between a cruising state of holding the speed change operation mechanism 200B at an arbitrary speed change position to constantly maintain the output from the HST and a cruise release state where the cruising state is released, and a brake operation mechanism 400B that operates a brake actuator (not shown) provided in the travel brake apparatus.

Described first is the speed change operation mechanism 200B.

The speed change operation mechanism 200B includes a speed change operating member 210B capable of being manually operated, a speed change operation shaft 220B that is rotated around its axis line in accordance with manual operation on the speed change operating member 210B, a speed change actuating member 230B that is supported by the speed change operation shaft 220B in a relatively non-rotatable manner with respect thereto, and an HST operation link 240B that operatively connects the speed change actuating member 230B and the output adjusting member.

In the present embodiment, the speed change operation mechanism 200B is configured to manually operate the pump-side output adjusting member of the output adjusting member that is capable of taking a forward travel state, a neutral state or a rearward travel state.

Figure 21:
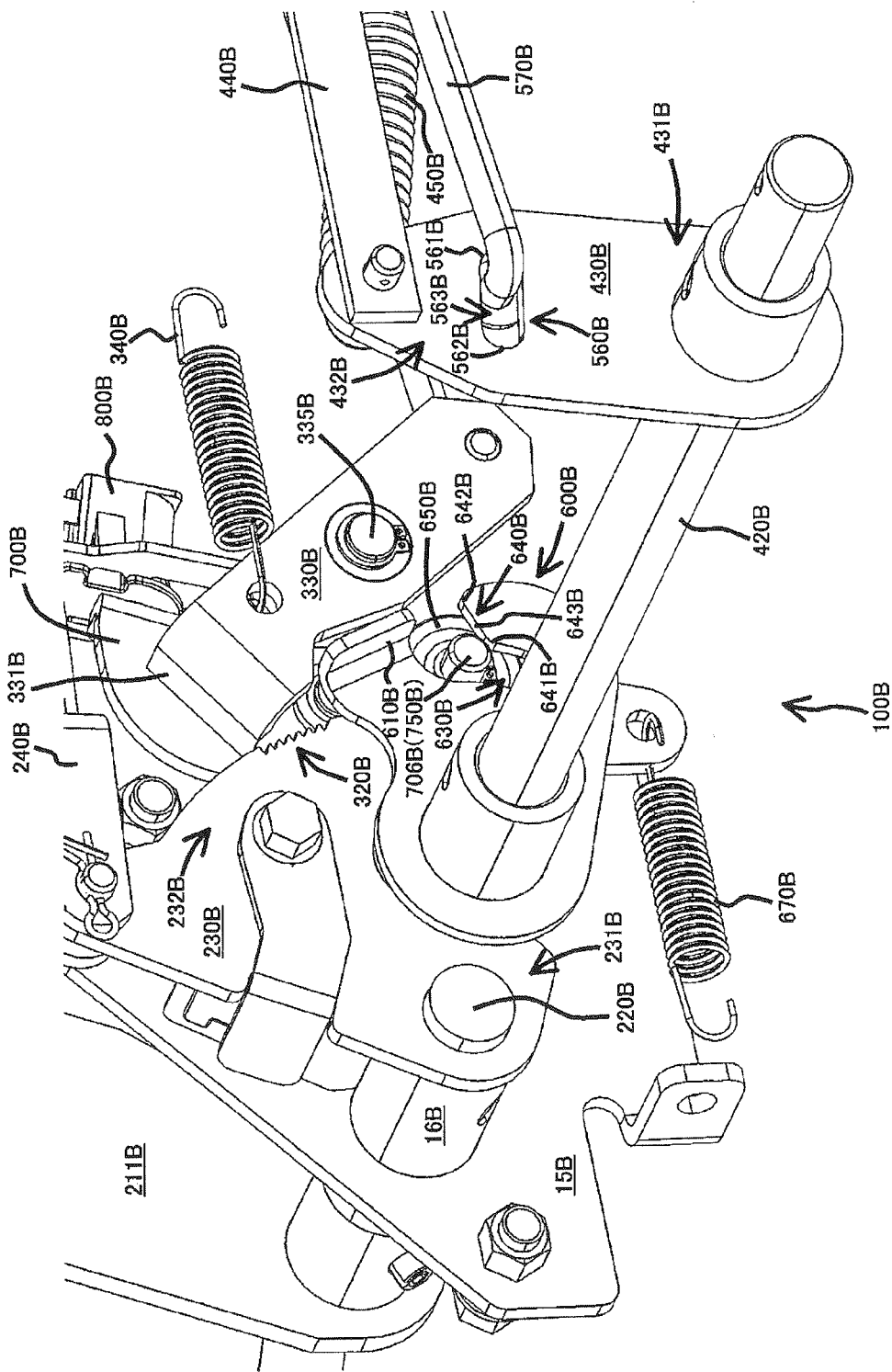
FIG. 21 is a partially enlarged perspective view of the travel speed operation apparatus.

FIG. 21 is a partially enlarged perspective view of the travel speed operation apparatus 100B.

As shown in FIGS. 19 to 21, the speed change operation shaft 220B is supported in a rotatable manner around its axis line while being along the vehicle width direction.

In the present embodiment, the travel speed operation apparatus 100B has a fixed plate 15B that is fixed and supported directly or indirectly by the vehicle frame 10B, and the speed change operation shaft 220B is inserted, in a rotatable manner around the axis line, into a cylindrical member 16B supported by the fixed plate 15B.

As described earlier, the speed change operation mechanism 200B is configured to operate the pump-side output adjusting member that can be brought into the forward travel state, the neutral state, or the rearward travel state.

Accordingly, the speed change operating member 210B is configured to shift the pump-side output adjusting member to a forward travel side and a rearward travel side.

More specifically, as shown in FIGS. 19 and 20, the speed change operating member 210B has a forward travel pedal 210B(F) that functions as a forward travel operating member, a rearward travel pedal 210B(R) that functions as a rearward travel operating member, and a speed change arm 211 that has a lower end supported by the speed change operation shaft 220B in a relatively non-rotatable manner with respect thereto and an upper end supporting the forward travel pedal 210B(F) and the rearward travel pedal 210B(R).

With this configuration, upon pressing down the forward travel pedal 210B(F), the speed change operation shaft 220B is rotated around the axis line in a first direction (counter-clockwise direction as viewed from left side) via the speed change arm 211. On the other hand, upon pressing down the rearward travel pedal 210B(R), the speed change operation shaft 220B is rotated around the axis line in a second direction (clockwise direction as viewed from left side) via the speed change arm 211.

In the configuration shown in the drawings, the speed change operating member 210B is embodied as a seesaw pedal that is provided integrally with the forward travel pedal 210B(F) and the rearward travel pedal 210B(R).

The speed change actuating member 230B has a radially inner portion 231B that is supported by the speed change operation shaft 220B in a relatively non-rotatable manner with respect thereto, and a radially outer portion 232B that extends radially outward from the radially inner portion 231B.

As shown in FIG. 21, in the present embodiment, the speed change actuating member 230B has a plate shape.

The HST operation link 240B has a first end connected to the radially outer portion 232B of the speed change actuating member 230B and a second end operatively connected to a control shaft 35B (see FIG. 20) of the pump-side output adjusting member.

In the present embodiment, as shown in FIG. 20, the pump-side output adjusting member also has, in addition to the movable swash plate and the control shaft 35B, a control arm 36B that is supported by the outer end of the control shaft 35B in a relatively non-rotatable manner with respect thereto. The second end of the HST operation link 240B is connected to the control arm 36B.

The speed change operation mechanism 200B operates as follows.

In a state where the speed change operating member 210B is not operated, the speed change operation mechanism 200B is maintained in a neutral state by an operation-side neutral return mechanism (to be described later) provided in the travel speed operation apparatus 100B and/or an HST-side neutral return mechanism (not shown) additionally provided to the output adjusting member (the pump-side output adjusting member in the present embodiment) of the HST 30B.

When the speed change operating member 210B is operated into the forward travel side against biasing force of the operation-side neutral return mechanism and/or the HST-side neutral return mechanism, the speed change operation shaft 220B is rotated around the axis line into a first direction so as to rotate the speed change actuating member 230B about the speed change operation shaft 220B into a first direction (forward travel side). Such rotation into the forward travel side of the speed change actuating member 230B shifts the HST operation link 240B in a first axial direction, and the control shaft 35B is thus rotated around the axis line into the forward travel side via the control arm 36B.

On the other hand, when the speed change operating member 210B is operated into the rearward travel side against biasing force of the operation-side neutral return mechanism and/or the HST-side neutral return mechanism, the speed change operation shaft 220B is rotated around the axis line into a second direction to thereby rotate the speed change actuating member 230B about the speed change operation shaft 220B into a second direction (rearward travel side). Such rotation into the rearward travel side of the speed change actuating member 230B shifts the HST operation link 240B in a second axial direction, and the control shaft 35B is thus rotated around the axis line into the rearward travel side via the control arm 36B.

Next described is the cruise operation mechanism 300B.

The cruise operation mechanism 300B is configured to be brought into the cruising state where the speed change operation mechanism 200B maintains at a predetermined speed and a cruise release state where the cruising state is released, in accordance with operation of the cruise operating member 310B capable of being manually operated.

More specifically, as shown in FIGS. 19 to 21, the cruise operation mechanism 300B includes the cruise operating member 310B, a plurality of ratchet teeth 320B that is provided on the speed change actuating member 230B so as to be directed radially outward with the axis line of the speed change operation shaft 220B being as a reference, a cruising member 330B that has a locking claw 331B selectively engageable with one of the ratchet teeth 320B and is capable of taking, around the cruise shaft 335B, a cruising position where the locking claw 331B is engaged with one of the ratchet teeth 320B and a cruise release position where the locking claw 331B is distant from the ratchet teeth 320B, a cruise release biasing member 340B that biases the cruising member 330B toward the cruise release position about the cruise shaft 335B, and a cruise link 350B that operatively connects the cruise operating member 310B and the cruising member 330B.

The cruise operation mechanism 300B operates as follows.

While the HST 30B is operated to change the speed via the speed change operation mechanism 200B in a forward travel region (where the working vehicle is caused to travel forward), if the cruising member 330B is located at the cruising position against biasing force of the cruise release biasing member 340B via the cruise operating member 310B, the locking claw 331B is engaged with corresponding one of the ratchet teeth 320B to fix the position of the speed change actuating member 230B around the speed change operation shaft 220B. As a result, the working vehicle 1B is maintained in the cruising state (traveling state with a constant speed).

Even when manual operation on the cruise operating member 310B is canceled after the cruise operating member 310B is located at the cruising position against biasing force of the cruise release biasing member 340B, the cruising member 330B is held at the cruising position against the biasing force of the cruise release biasing member 340B for the following reasons.

Figure 22:
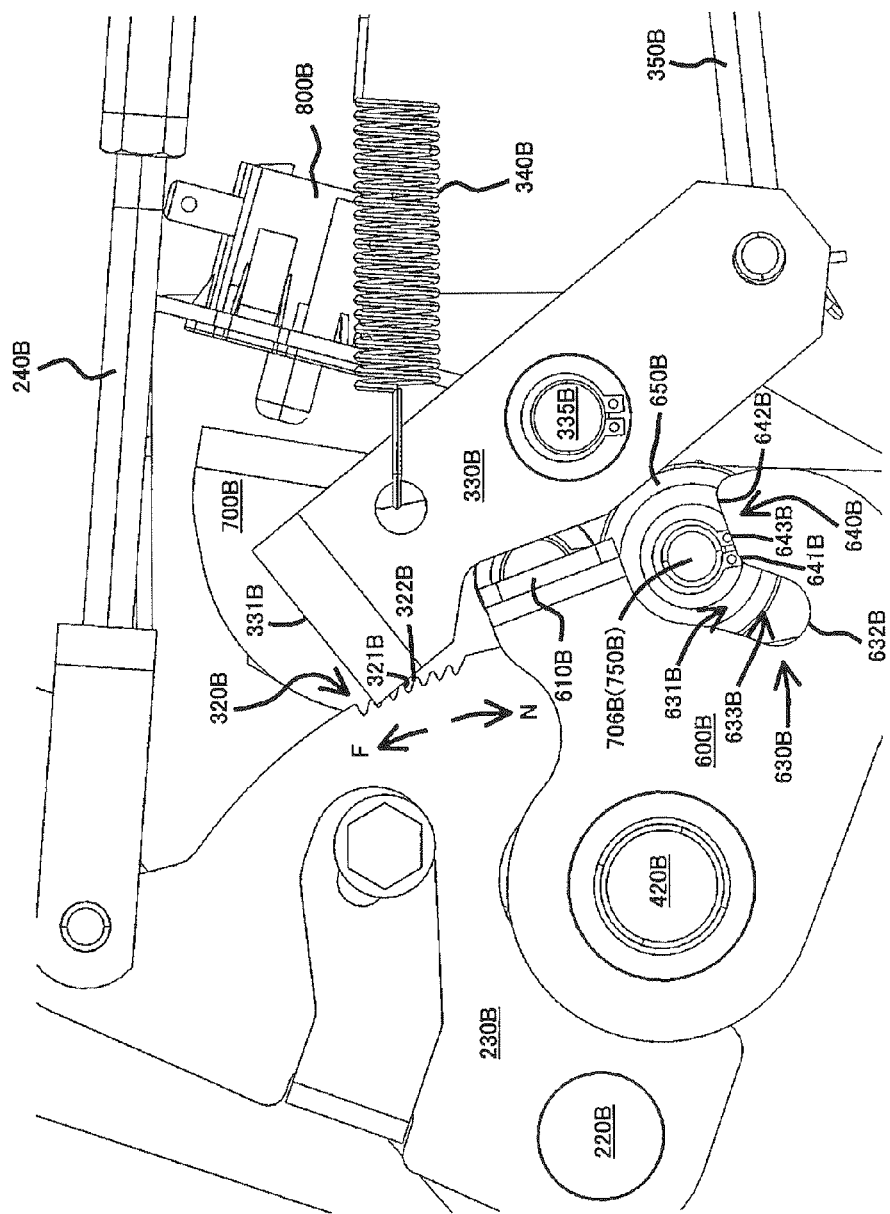
FIG. 22 is an enlarged side view of a vicinity of ratchet teeth of a cruise operation mechanism in the travel speed operation apparatus.

FIG. 22 is an enlarged side view of the ratchet teeth 320B and the vicinity thereof.

As described above, the speed change actuating member 230B provided with the plurality of ratchet teeth 320B is biased toward the neutral position by the operation-side neutral return mechanism and/or the HST-side neutral return mechanism.

Accordingly, the plurality of ratchet teeth 320B are biased toward the neutral position (into the direction indicated by an arrow N in FIG. 22) in the state where the speed change actuating member 230B is turned about the speed change operation shaft 220B into the forward travel side.

As shown in FIG. 22, the ratchet teeth 320B each have a first surface 321B directed to the neutral position around the speed change operation shaft 220B and a second surface 322B directed in the forward travel side with the state where the speed change actuating member 230B is turned into the forward travel being as a reference.

The first surface 321B is engaged with the locking claw 331B in a case where the speed change actuating member 230B that has been turned into the forward travel side is being returned to the neutral position by the operation-side neutral return mechanism and/or the HST-side neutral return mechanism.

On the other hand, in the state where the first surface 321B is engaged with the locking claw 331B, the second surface 322B is distant from the locking claw 331B toward the neutral position in the circumferential direction with the speed change operation shaft 220B as a reference.

In other words, there exists a space between the second surface 322B and the locking claw 331B in the state where the first surface 321B is engaged with the locking claw 331B.

In this configuration, while the HST 30B is operated to change the speed in the forward travel region via the speed change operation mechanism 200B, if the cruising member 330B is located at the cruising position via the cruise operating member 310B against biasing force of the cruise release biasing member 340B, the locking claw 331B is engaged with corresponding one of the ratchet teeth 320B.

When manual operation on the speed change operation mechanism 200B is canceled in this state, the speed change actuating member 230B is biased toward the neutral position about the speed change operation shaft 220B by the operation-side neutral return mechanism and/or the HST-side neutral return mechanism, and the first surface 321B is brought into contact with the locking claw 331B while being biased toward the neutral position about the speed change operation shaft 220B.

Such contact between the first surface 321B and the locking claw 331B causes frictional resistance against turn of the cruising member 330B toward the cruise release position about the cruise shaft 335B due to the biasing force of the cruise release biasing member 340B.

Therefore, the cruising member 330B is held at the cruising position even when manual operation on the cruise operating member 310B is canceled after the cruise operating member 310B is located at the cruising position against the biasing force of the cruise release biasing member 340B.

On the other hand, if the cruise operating member 310B is operated into the release direction in the case where the cruising member 330B is located at the cruising position, the cruising member 330B is turned about the cruise shaft 335B toward the cruise release position so that engagement is released between the locking claw 331B and the first surface 321B of the corresponding one of the ratchet teeth 320B. Accordingly, the cruising member 330B is located at the cruise release position by the biasing force of the cruise release biasing member 340B.

In the configuration according to the present embodiment, operation of the speed change operating member 210B also releases the cruising state.

More specifically, while the HST 30B is operated to change the speed in the forward travel region via the speed change operating member 210B, if manual operation on the speed change operating member 210B is canceled after the cruising member 330B is located at the cruising position via the cruise operating member 310B against the biasing force of the cruise release biasing member 340B, the cruising member 330B is held at the cruising position by frictional resistance between the first surface 321B and the locking claw 331B, as described above.

As described above, there exists the space between the second surface 322B and the locking claw 331B so that the speed change actuating member 230B is allowed to turn about the speed change operation shaft 220B into the forward travel side.

In other words, in the state where the cruising member 330B is held at the cruising position, the speed change operating member 210B can be operated into the forward travel side by a distance corresponding to the space between the second surface 322B and the locking claw 331B.

When the speed change operating member 210B is manipulated into the forward travel side in the cruising state, engagement is released between the first surface 321B and the locking claw 331B so that the cruising member 330B is returned to the cruise release position by the biasing force of the cruise release biasing member 340B.

Described next is the brake operation mechanism 400B.

As shown in FIGS. 19 and 20, the brake operation mechanism 400B includes a brake operating member 410B capable of being manually operated, a brake operation shaft 420B that is rotated around its axis line in accordance with manual operation on the brake operating member 410B, a brake actuating member 430B that is supported by the brake operation shaft 420B in a relatively non-rotatable manner with respect thereto, a brake link 440B that operatively connects the brake actuating member 430B and the brake actuator, and a brake release biasing member 450B that operatively biases the brake actuating member 430B toward the brake release position.

As shown in FIGS. 19 and 20, the brake operation shaft 420B is supported in a rotatable manner around its axis line while being along the vehicle width direction.

The brake operating member 410B is connected to the brake operation shaft 420B in a relatively non-rotatable manner with respect thereto.

In the present embodiment, as shown in FIGS. 19 and 20, the brake operating member 410B is provided as a brake pedal.

The brake pedal has a proximal end connected to the brake operation shaft 420B in a relatively non-rotatable manner with respect thereto and a free end provided with a press step portion on which a driver can step to press down.

As shown in FIG. 21, the brake actuating member 430B has a radially inner portion 431B that is supported by the brake operation shaft 420B in a relatively non-rotatable manner with respect thereto and a radially outer portion 432B that extends radially outward from the radially inner portion 431B.

In the present embodiment, as shown in FIGS. 19 to 21, the brake actuating member 430B has a plate shape.

The brake link 440B has a first end connected to the radially outer portion 432B of the brake actuating member 430B and a second end connected directly or indirectly to the brake actuator.

The brake release biasing member 450B has a first end connected to a fixing member such as the vehicle frame 10B and a second end connected to the radially outer portion 432B of the brake actuating member 430B so as to bias the brake actuating member 430B toward the brake release position.

The brake operation mechanism 400B thus configured operates as follows.

In the state where the brake operating member 410B is not manually operated by a driver, the brake actuating member 430B is located at the brake release position around the brake operation shaft 420B by biasing force of the brake release biasing member 450B so that the brake actuator is brought into the non-actuation state via the brake link 440B.

On the other hand, when the brake operating member 410B is manipulated to the brake actuation position against the biasing force of the brake release biasing member 450B, the brake operation shaft 420B is rotated into the brake actuation direction that is a first direction around the axis line, the brake actuation direction and the brake actuating member 430B is accordingly turned to the brake actuation position about the brake operation shaft 420B.

Such turn of the brake actuating member 430B brings the brake actuator into the actuation state via the brake link 440B.

In the present embodiment, the working vehicle 1B includes a differential gear mechanism (not shown) which differentially transmits the output from the HST 30B to pair of driving wheels (a pair of rear wheels in the present embodiment) on which the travel brake apparatus operatively acts, a differential-lock mechanism (not shown) which locks differential transmission state by the differential gear mechanism, and a differential-lock operation mechanism 500B (see FIGS. 19 and 20) which is used to manipulate to operate the differential-lock mechanism. The brake operation mechanism 400B has a brake and differential-lock link structure that allows independent operation of the differential-lock operation mechanism 500B irrespective of operation or non-operation of the brake operating member 410B, as well as brings the differential-lock operation mechanism 500B into the differential-lock state in association with shifting the travel brake apparatus via the brake operating member 410B from the brake release state into the brake actuation state.

Figure 23:
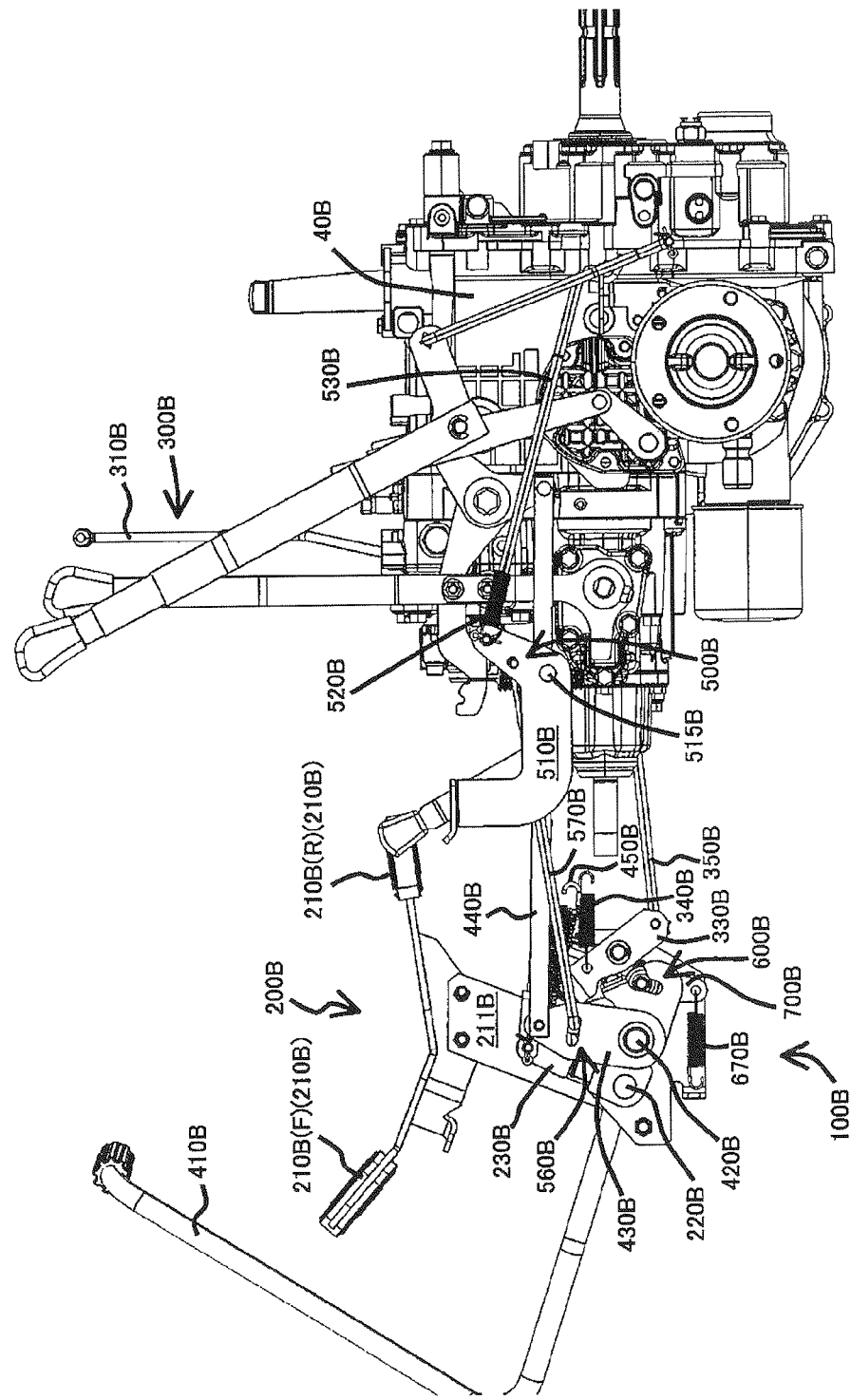
FIG. 23 is a left side view of the travel speed operation apparatus and a transmission case of the working vehicle.
Figure 24:
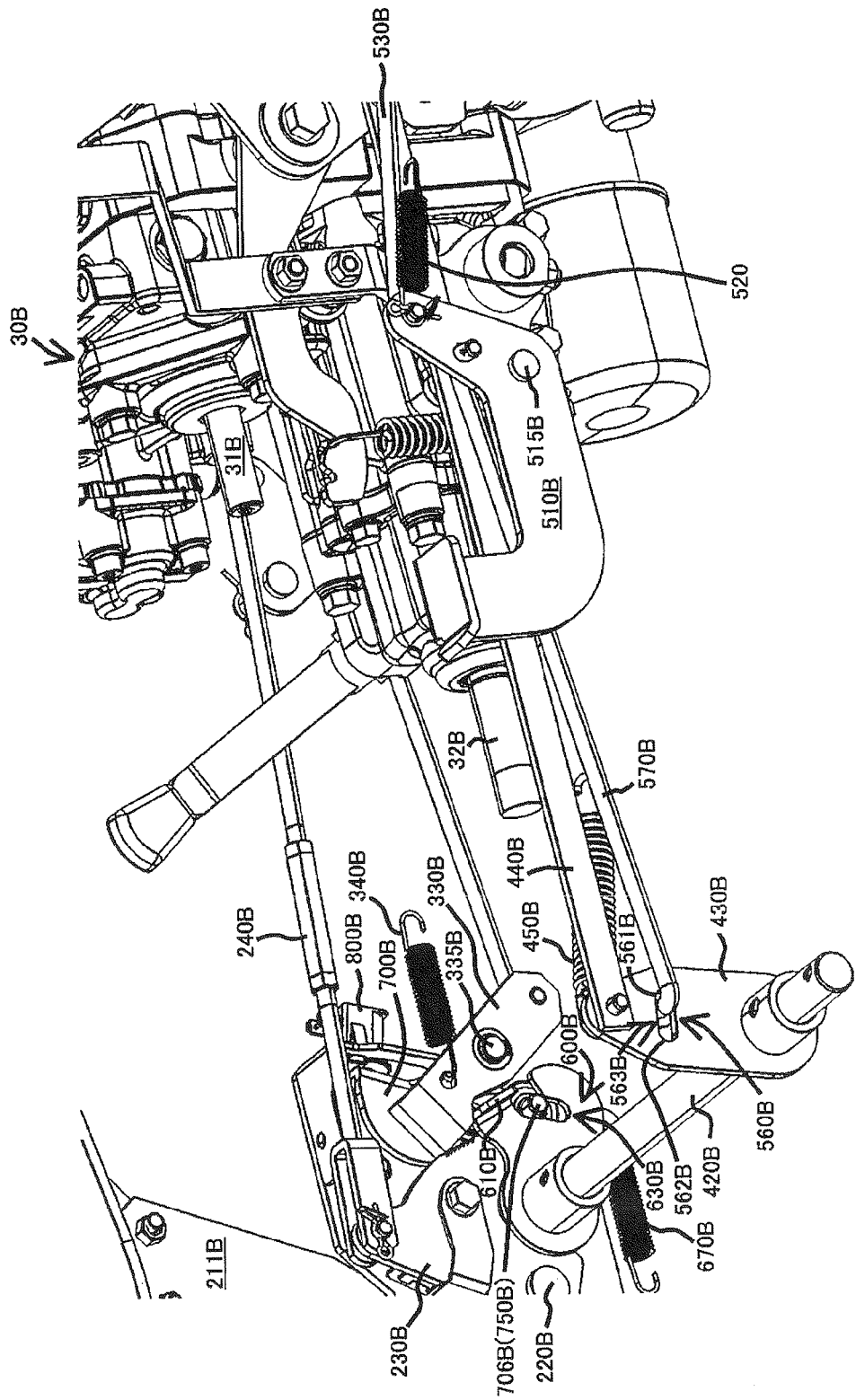
FIG. 24 is a perspective view of a brake and differential-lock link structure of the travel speed operation apparatus.

FIG. 23 is a left side view of the travel speed operation apparatus 100B and the transmission case 40B. FIG. 24 is a perspective view of the brake and differential-lock link structure.

As shown in FIGS. 23 and 24, the differential-lock operation mechanism 500B includes a differential-lock operating member 510B (a differential-lock pedal in the present embodiment) which is supported in a rotatable manner about a differential-lock operation shaft 515B along the vehicle width direction, a differential-lock release biasing member 520B that biases the differential-lock operating member 510B toward the differential-lock release position, and a differential-lock link 530B that has a first end connected to the differential-lock operating member 510B and a second end operatively connected to the differential-lock mechanism. The differential-lock operation mechanism 500B is configured such that the differential-lock mechanism is shifted from the differential-lock release state into the differential-lock state by shifting the differential-lock operating member 510B from the differential-lock release position to the differential-lock position against biasing force of the differential-lock release biasing member 520B.

As shown in FIGS. 21, 23, and 24, the brake and differential-lock link structure has an elongated hole 560B that is formed in the brake actuating member 430B, and a rigid link member 570B that has a first end connected to the brake actuating member 430B through the elongated hole 560B and a second end connected to the differential-lock operating member 510B.

The elongated hole 560B has a close end 561B (a rear end in the present embodiment) which is close to the differential-lock operating member 510B, a distant end 562B that is distant from the differential-lock operating member 510B, and an intermediate portion 563B that communicates with the close end 561B and the distant end 562B.

The first end of the link member 570B is located at the close end 561B of the elongated hole 560B when the brake actuating member 430B is located at the brake release position and the differential-lock operating member 510B is located at the differential-lock release position. On the other hand, the first end is located at the distant end 562B of the elongated hole 560B when the brake actuating member 430B is located at the brake release position and the differential-lock operating member 510B is located at the differential-lock position.

The brake and differential-lock link structure operates as follows.

In the state where the brake operating member 410B is not operated (in other words, the state where the travel brake apparatus is in the non-actuation state), if the differential-lock operating member 510B is operated from the differential-lock release position to the differential-lock position, the differential-lock mechanism is shifted from the differential-lock release state into the differential-lock state via the differential-lock link 530B.

In this case, since the first end of the link member 570B is shifted from the close end 561B to the distant end 562B within the elongated hole 560B, the brake actuating member 430B is not shifted by manual operation of the differential-lock operating member 510B from the differential-lock release position to the differential-lock position. Accordingly, the differential-lock mechanism is brought into the differential-lock state with the travel brake apparatus being maintained in the brake non-actuation state.

Described below is the case where the brake operating member 410B is operated from the brake release position to the brake actuation position in the state where the differential-lock operating member 510B is not operated (in other words, the state where the differential-lock mechanism is in the differential-lock release state).

In this case, the brake actuating member 430B is turned about the brake operation shaft 420B into a first direction (into the direction of causing the elongated hole 560B to be moved away from the differential-lock operating member 510B, namely, counterclockwise direction in FIGS. 21, 23, and 24) in association with the manual operation of the brake operating member 410B.

As described above, the first end of the link member 570B is located at the close end 561B of the elongated hole 560B when both of the brake operation mechanism 400B and the differential-lock operation mechanism 500B are in the non-operation state. Accordingly, when the brake actuating member 430B is turned about the brake operation shaft 420B into the first direction, the differential-lock operating member 510B is turned from the differential-lock release position to the differential-lock position via the link member 570B.

Therefore, when the travel brake apparatus is shifted from the brake release state into the brake actuation state via the brake operating member 410B, the differential-lock mechanism is automatically shifted from the differential-lock release state into the differential-lock state with no operation of the differential-lock operation mechanism 500B.

As shown in FIGS. 19, 21, 22, 24 and the like, the travel speed operation apparatus 100B according to the present embodiment includes, in addition to the above components, a brake interlock arm 600B that is supported by the brake operation shaft 420B in a relatively non-rotatable manner with respect thereto. The travel speed operation apparatus 100B is configured so that the cruising state is released not only by manual operation on the cruise operating member 310B or the speed change operating member 210B but also by manual operation on the brake operating member 410B.

Figure 25:
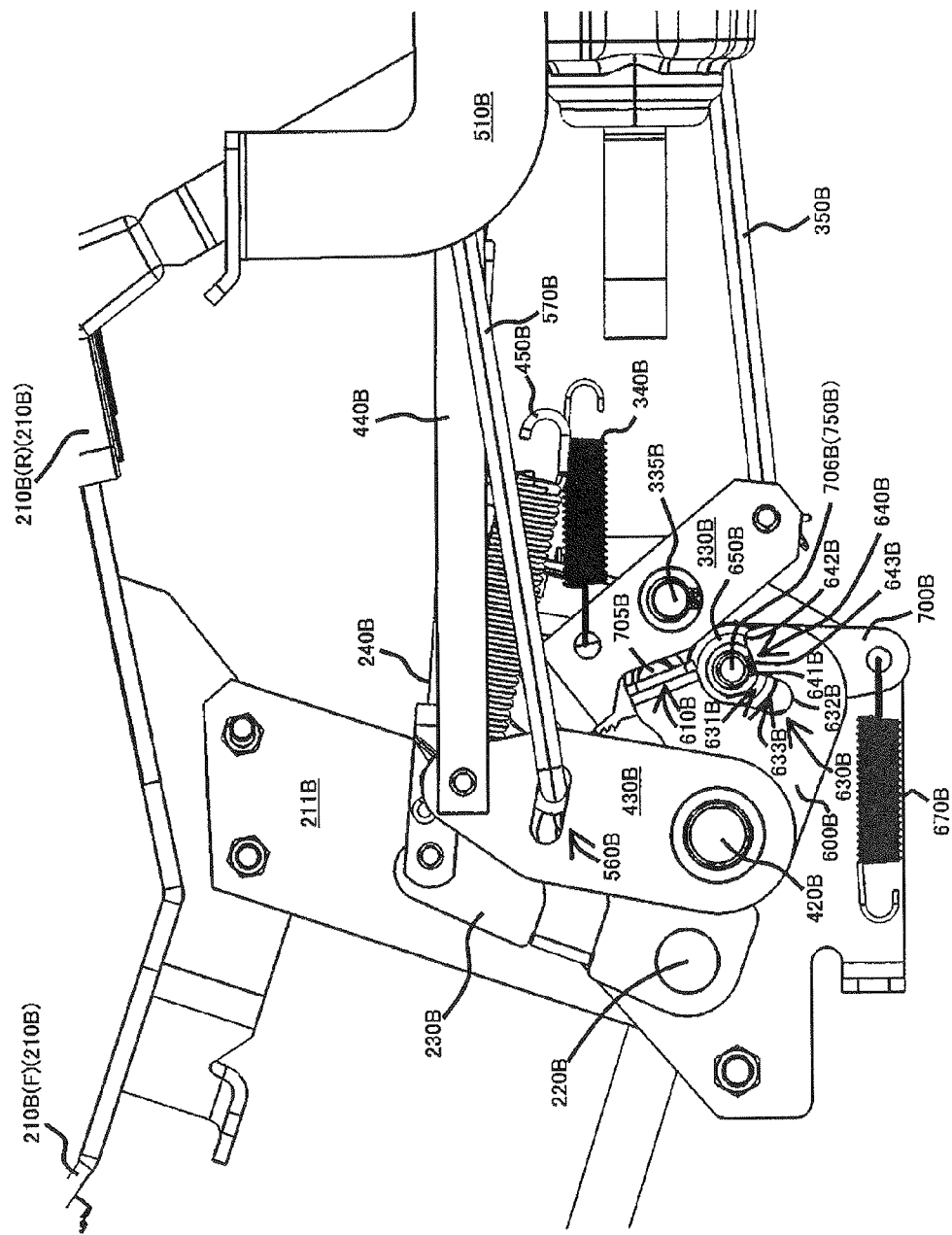
FIG. 25 is a partial side view of the travel speed operation apparatus in the case where the cruise operation mechanism is in the cruising state and a brake operation mechanism of the travel speed operation apparatus is in the brake release state.

FIG. 25 is a partial side view of the travel speed operation apparatus 100B in the case where the cruise operation mechanism 300B is in the cruising state (the state where the cruise operating member 310B is located at the cruising position) and the brake operation mechanism 400B is in the brake release state (the initial state where the brake operating member 410B is not operated by a driver).

Figure 26:
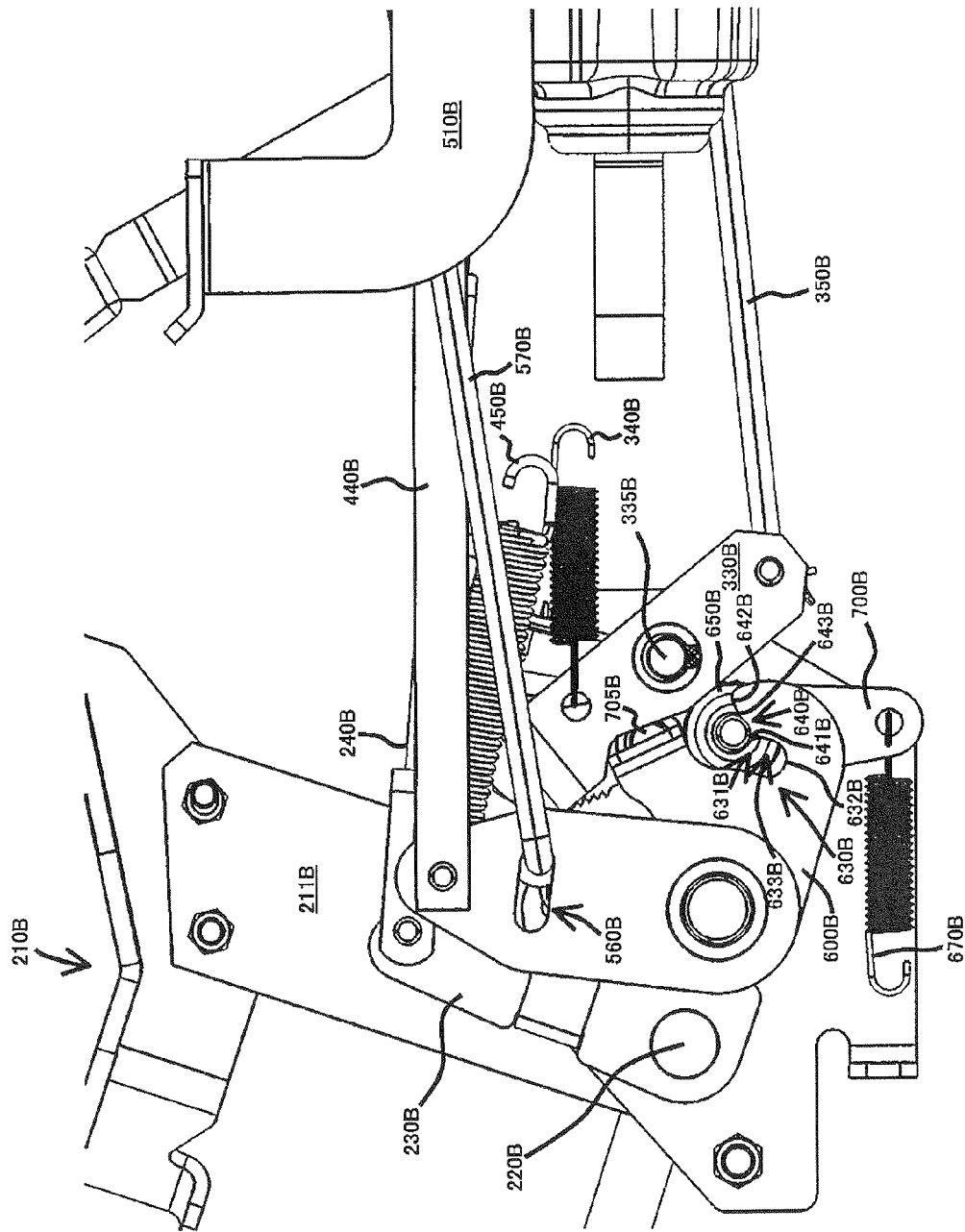
FIG. 26 is a partial side view of the travel speed operation apparatus in the case where the cruise operation mechanism is in the cruising state and the brake operation mechanism is being shifted from the brake release state into the brake actuation state.

FIG. 26 is a partial side view of the travel speed operation apparatus 100B in the case where the cruise operation mechanism 300B is in the cruising state and the brake operation mechanism 400B is being shifted from the brake release state into the brake actuation state.

Figure 27:
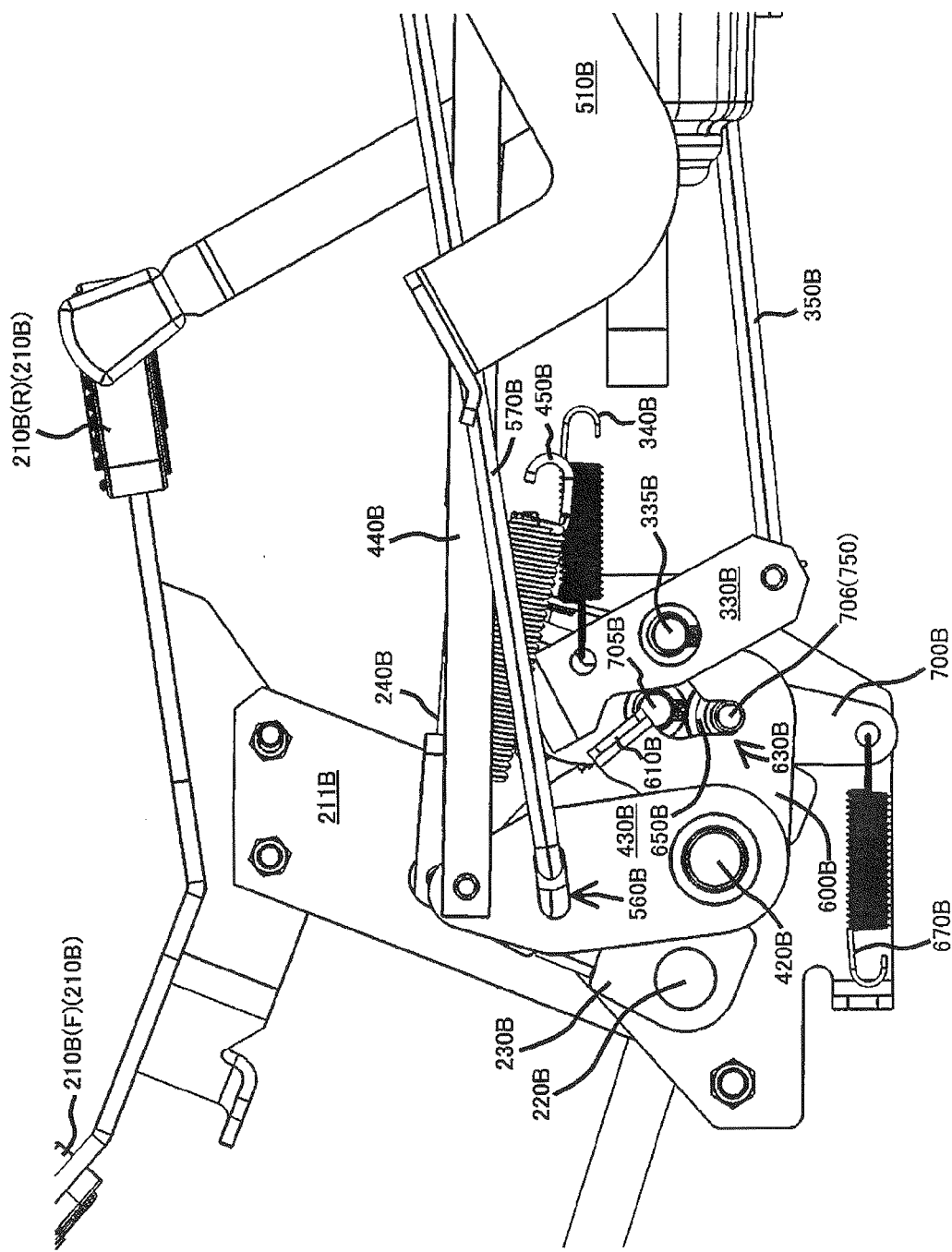
FIG. 27 is a partial side view of the travel speed operation apparatus in the case where the brake operation mechanism is in the brake actuation state.

Further, FIG. 27 is a partial side view of the travel speed operation apparatus 100B in the case where the brake operation mechanism 400B is in the brake actuation state.

As shown in FIGS. 25 to 27, the brake interlock arm 600B has a cruise release arm portion 610B that presses the cruising member 330B that has been located at the cruising position about the cruise shaft 335B toward the cruise release position in accordance with operation of the brake operating member 410B from the brake release position to the brake actuation position.

More specifically, the brake interlock arm 600B is turned about the brake operation shaft 420B into the brake actuation direction (counterclockwise in FIGS. 25 to 27) that is a first direction about the shaft 420B together with the brake operation shaft 420B in accordance with operation of the brake operating member 410B from the brake release position to the brake actuation position.

The cruise release arm portion 610B is distant from the cruising member 330B that has been located at the cruising position when the brake interlock arm 600B is located at the brake release position (see FIG. 25). The cruise release arm portion 610B is engaged with the cruising member 330B that has been located at the cruising position when the brake interlock arm 600B is turned about the brake operation shaft 420B from the brake release position into the first direction (see FIG. 26).

As the brake interlock arm 600B is turned about the brake operation shaft 420B into the first direction beyond the position indicated in FIG. 26, the cruise release arm portion 610B presses the cruising member 330B about the cruise shaft 335B into the cruise release direction.

The cruising member 330B is disengaged from the ratchet teeth 320B by pressing power of the cruise release arm portion 610B, and is turned toward the cruise release position by biasing force of the cruise release biasing member 340B (see FIG. 27).

The travel speed operation apparatus 100B is further provided with the operation-side neutral return mechanism that returns the speed change operation mechanism 200B into the neutral state upon cancellation of manual operation on the speed change operating member 210B.

Figure 28:
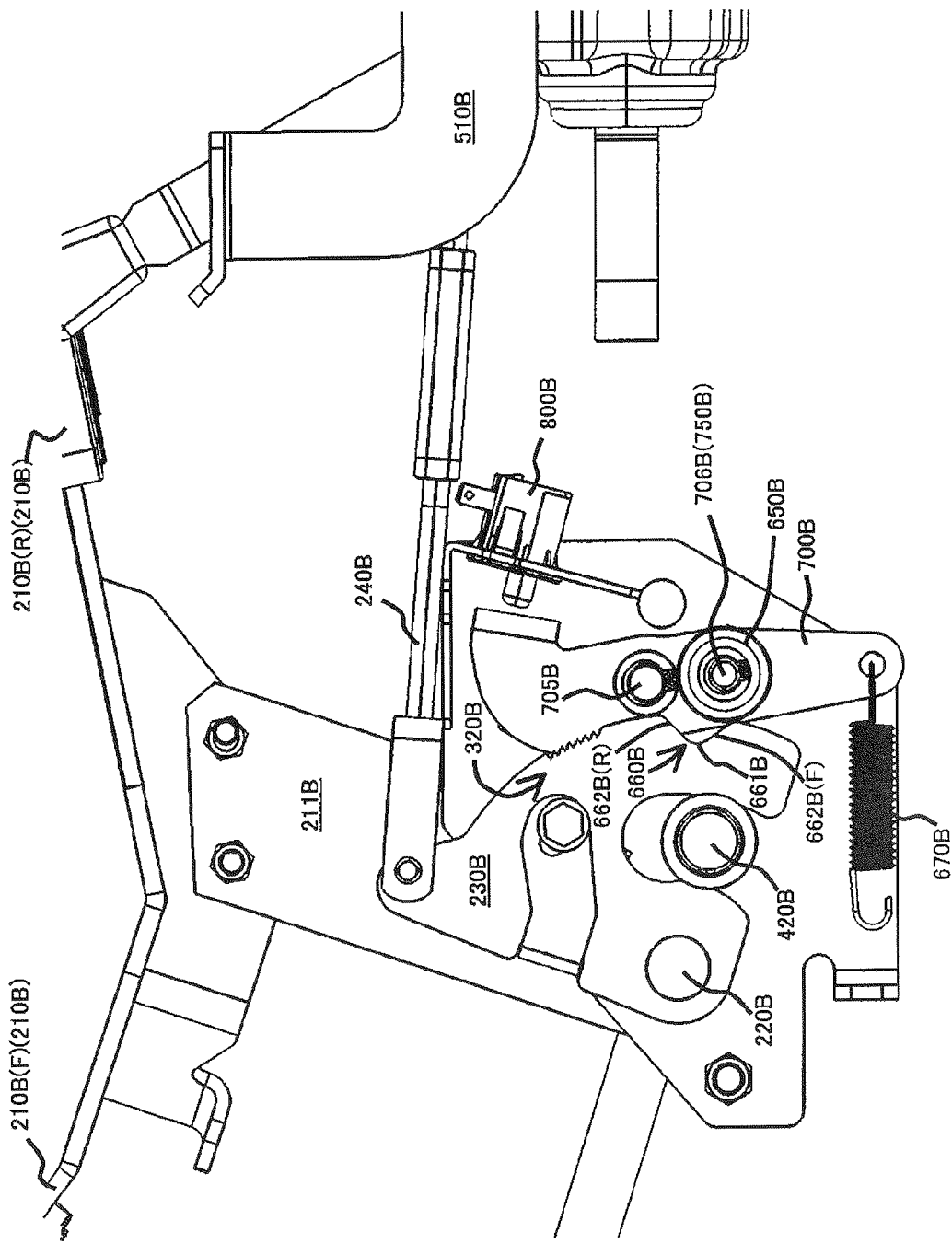
FIG. 28 is a side view corresponding to FIG. 25 with a cruising member of the cruise operation mechanism and a brake actuating member of the brake operation mechanism being omitted.
Figure 29:
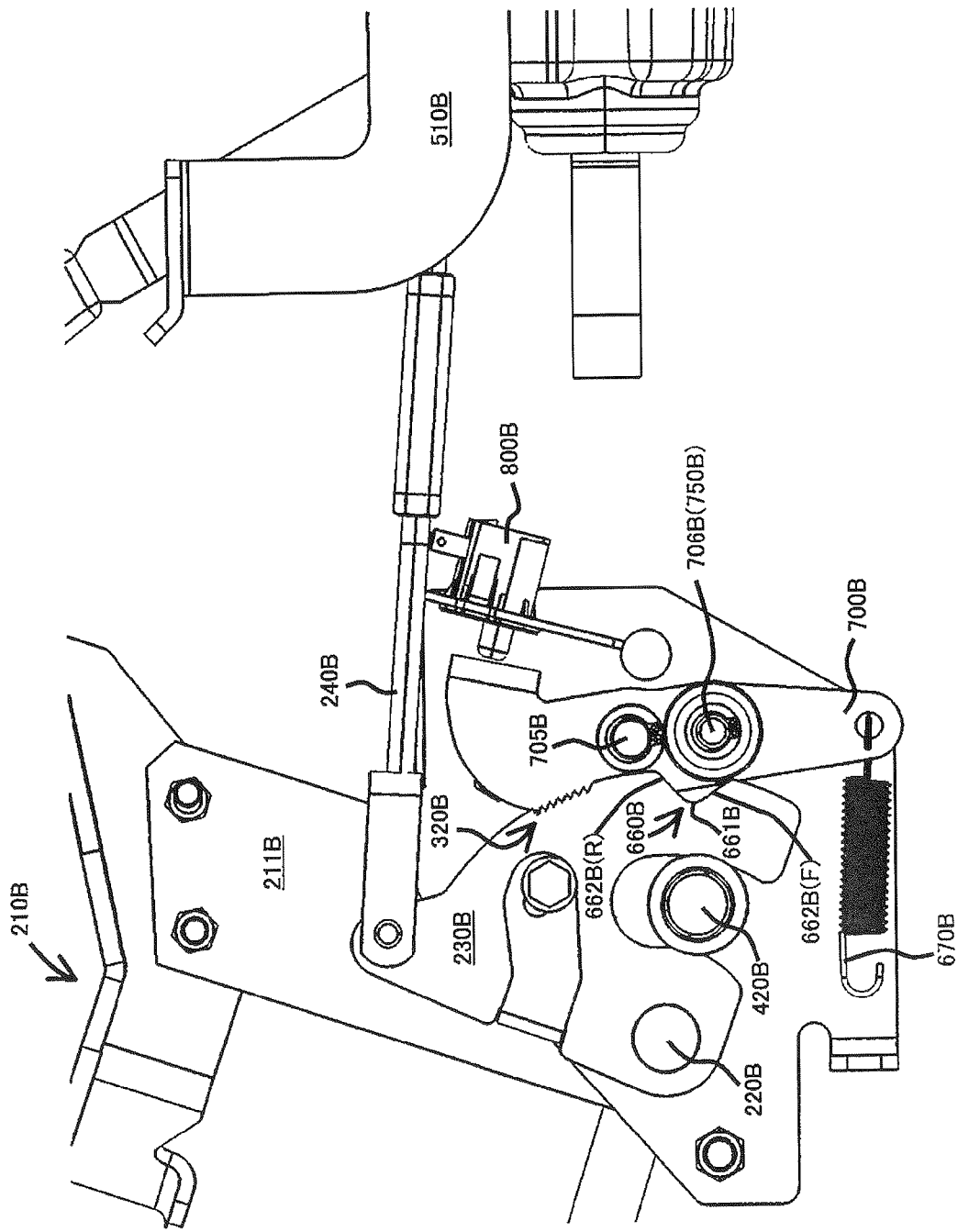
FIG. 29 is a side view corresponding to FIG. 26 with the cruising member and the brake actuating member being omitted.
Figure 30:
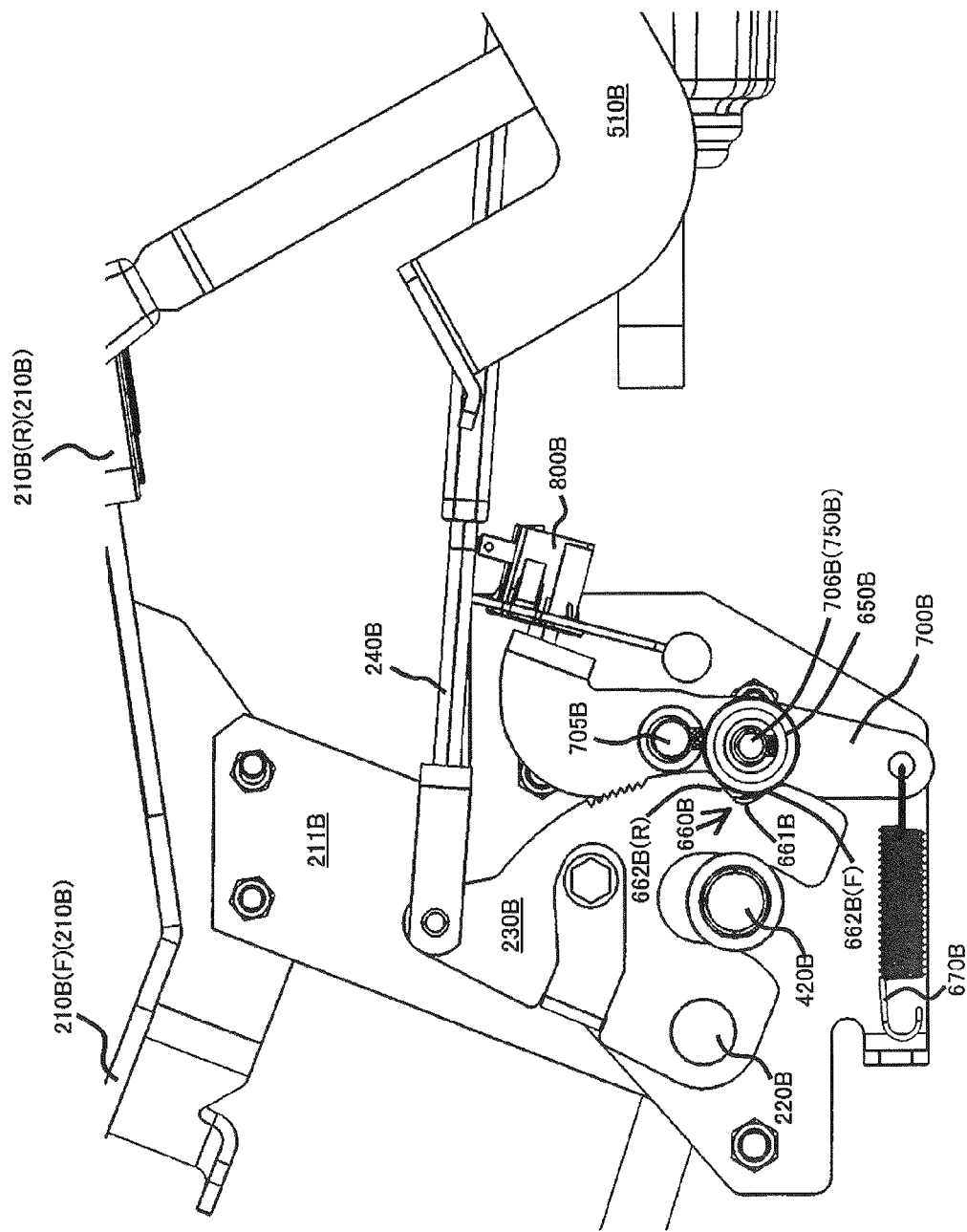
FIG. 30 is a side view corresponding to FIG. 27 with the cruising member and the brake actuating member being omitted.

FIGS. 28 to 30 are side views corresponding respectively to FIGS. 25 to 27 with the brake actuating member 430B and the cruising member 330B being not shown.

As shown in FIGS. 25 to 30, the travel speed operation apparatus 100B is provided, in addition to the above components, with a speed change interlock arm 700B that is supported in a swingable manner about a pivot shaft 705B disposed in parallel with the speed change operation shaft 220B.

As shown in FIGS. 28 to 30, the operation-side neutral return mechanism includes a speed change interlocking cam portion 650B that is provided to the speed change interlock arm 700B, a speed change interlocking cam surface 660B that is provided to the speed change actuating member 230B so as to be engaged with the speed change interlocking cam portion 650B, and a speed change interlock arm biasing member 670B that biases the speed change interlock arm 700B about the pivot shaft 705B in the direction of causing the speed change interlocking cam portion 650B to be engaged with the speed change interlocking cam surface 660B.

The speed change interlocking cam portion 650B is extended in parallel with the pivot shaft 705B at a position distant radially outward from the pivot shaft 705B.

In the present embodiment, as shown in FIGS. 28 to 30, the speed change interlocking cam portion 650B is configured as a bearing member that is supported sin a relatively rotatable manner by a support shaft 706B provided to the speed change interlock arm 700B.

As shown in FIGS. 28 to 30, the speed change interlocking cam surface 660B includes a deepest portion 661B that is located at the radially inner most end with the axis line of the speed change operation shaft 220B being as a reference, and a pair of inclined portions 662B(F) and 662B(R) that are extended in one and the other sides in a circumferential direction with the axis line of the speed change operation shaft 220B being as a reference in a state of sandwiching the deepest portion 661B and are positioned away from the axis line as a distance from the deepest portion 661B in the circumferential direction is increased.

The pair of inclined portions 662B(F) and 662B(R) are specifically referred to as a forward-travel-side inclined portion 662B(F) and a rearward-travel-side inclined portion 662B(R) that are engaged with the speed change interlocking cam portion 650B when the speed change actuating member 230B is turned about the speed change operation shaft 220B into the forward travel side and the rearward travel side, respectively.

The speed change actuating member 230B has an outer peripheral surface facing radially outward from the axis line of the speed change operation shaft 220B being as a reference.

In the present embodiment, as shown in FIGS. 28 to 30, the speed change interlocking cam surface 660B is formed on the outer peripheral surface of the speed change actuating member 230B.

It is noted that the plurality of ratchet teeth 320B is formed also on the outer peripheral surface.

The speed change interlock arm biasing member 670B has a first end connected to the speed change interlock arm 700B and a second end connected directly or indirectly to a fixing member (not shown) such as the vehicle frame 10B so as to bias the speed change interlock arm 700B in such a direction as to cause the speed change interlocking cam portion 650B to be engaged with the speed change interlocking cam surface 660B.

The operation-side neutral return mechanism thus configured operates as follows.

As already described, when the speed change operating member 210B is operated into the forward travel side, the speed change actuating member 230B is turned about the speed change operation shaft 220B into the forward travel side (counterclockwise direction in FIGS. 28 to 30). In this case, the forward-travel-side cam surface 662B(F) presses the speed change interlocking cam portion 650B, so that the speed change actuating member 230B turns the speed change interlock arm 700B to a non-neutral position against biasing force of the speed change interlock arm biasing member 670B (see FIG. 28).

When manual operation on the speed change operating member 210B is canceled in the state shown in FIG. 28, the speed change interlocking cam portion 650B presses the forward-travel-side cam surface 662B(F) with use of the biasing force of the speed change interlock arm biasing member 670B (see FIG. 29), and the speed change actuating member 230B is eventually returned to the neutral position from the non-neutral position (see FIG. 30).

In this case, the speed change interlocking cam portion 650B is held by the speed change interlocking cam surface 660B at a position corresponding to the deepest portion 661B, and both of the speed change actuating member 230B and the speed change interlock arm 700B are therefore held at the respective neutral positions.

Figure 31:
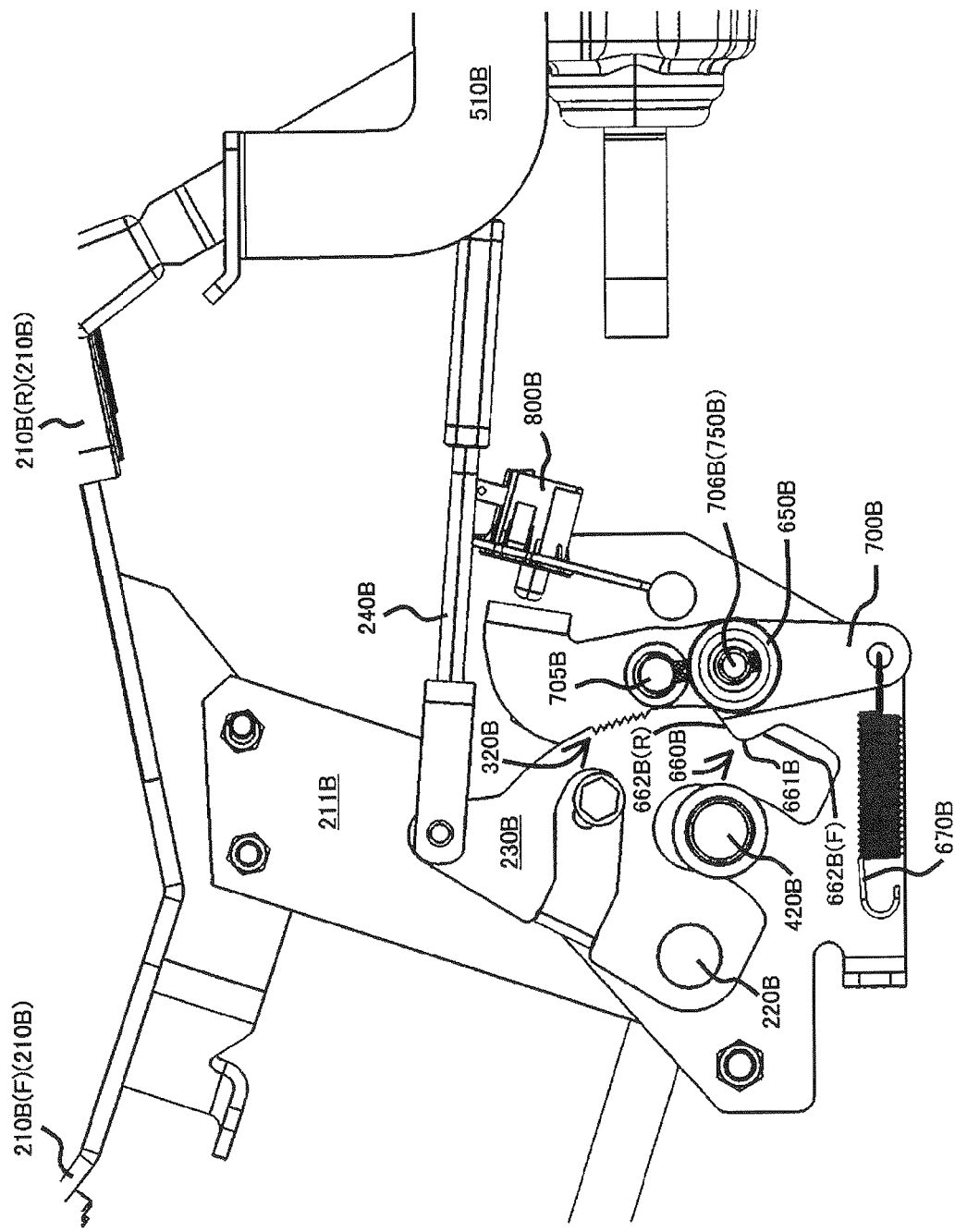
FIG. 31 is a side view of the travel speed operation apparatus with the cruising member and the brake actuating member being omitted, and shows the state where the speed change operation mechanism is operated into the rearward travel side.

FIG. 31 is a side view corresponding to FIG. 28, showing the state where the speed change operating member 210B is operated into the rearward travel side.

When the speed change operating member 210B is operated into the rearward travel side, the speed change actuating member 230B is turned about the speed change operation shaft 220B into the rearward travel side (clockwise direction in FIG. 31). In this case, the rearward-travel-side cam surface 662B(R) presses the speed change interlocking cam portion 650B, so that the speed change actuating member 230B turns the speed change interlock arm 700B from the neutral position to a non-neutral position against the biasing force of the speed change interlock arm biasing member 670B.

Also in the case where the speed change operating member 210B is operated into the rearward travel side, the speed change interlock arm 700B is rotated about the pivot shaft 705B into the direction identical with that in the case when the speed change operating member 210B is operated into the forward travel side (see FIGS. 28 and 31).

When manual operation on the speed change operating member 210B is canceled in the state where the speed change operating member 210B is operated into the rearward travel side, the speed change interlocking cam portion 650B presses the rearward-travel-side cam surface 662B(R) with use of biasing force of the speed change interlock arm biasing member 670B, so that both of the speed change actuating member 230B and the speed change interlock arm 700B are returned to the respective neutral positions from the respective non-neutral positions (see FIG. 30).

The travel speed operation apparatus 100B according to the present embodiment further includes an on-braking HST-side neutral return mechanism that prevents the HST 30B from being brought into the output state while the travel brake apparatus is in operation.

As shown in FIGS. 25 to 27, the on-braking HST-side neutral return mechanism includes a brake interlocking cam portion 750B provided to the speed change interlock arm 700B and a neutral groove 630B provided in the brake interlock arm 600B.

The brake interlocking cam portion 750B is extended in parallel with the pivot shaft 705B at a position distant radially outward from the cruise shaft 335B.

In the present embodiment, as shown in FIGS. 25 to 31, the brake interlocking cam portion 750B is provided coaxially with the speed change interlocking cam portion 650B.

In other words, in the present embodiment, the support shaft 706B supporting the bearing member, which functions as the speed change interlocking cam portion 650B, functions as the brake interlocking cam portion 750B.

As shown in FIG. 27, the on-braking HST-side neutral return mechanism is configured such that the brake interlocking cam portion 750B is engaged in the neutral groove 630B when the brake interlock arm 600B is located at the brake actuation position in association with manipulation of the brake operating member 410B to the brake actuation position. The brake interlocking cam portion 750B and the neutral groove 630B are configured such that the speed change interlock arm 700B is located at the neutral position in the state where the brake interlocking cam portion 750B is engaged in the neutral groove 630B.

More specifically, as shown in FIGS. 25 to 27, the neutral groove 630B has a first end 631B that is close to the pivot shaft 705B serving as the center of turn of the speed change interlock arm 700B, a second end 632B that is distant from the pivot shaft 705B, and an intermediate portion 633B that communicates with the first end 631B and the second end 632B, wherein first end 631B is formed as an open end.

More specifically, the neutral groove 630B is extended substantially radially from the axis line of the pivot shaft 705B that is the center of turn of the speed change interlock arm 700B. Accordingly, when the brake interlocking cam portion 750B provided to the speed change interlock arm 700B is engaged in the neutral groove 630B, the speed change interlock arm 700B is held at the neutral position in a state of being non-rotatable about the pivot shaft 705B.

The on-braking HST-side neutral return mechanism is preferably provided with a guide surface 640B that guides the brake interlocking cam portion 750B into the neutral groove 630B when the brake interlock arm 600B is shifted about the brake operation shaft 420B from the brake release position to the brake actuation position in association with manipulation of the brake operating member 410B from the brake release position to the brake actuation position in the state where the speed change operating member 210B is located at a non-neutral position (in other words, the state where the speed change operating member 210B is operated either in the forward travel region or in the rearward travel region).

In the present embodiment, as shown in FIGS. 25 to 27, the guide surface 640B is provided on the brake interlock arm 600B.

More specifically, the guide surface 640B has a radially inner end 641B and a radially outer end 642B that are respectively located radially inside and outside with the axis line of the brake operation shaft 420B being as a reference, and an inclined surface 643B that is extended between the radially inner end 641B and the radially outer end 642B.

The radially inner end 641B is provided continuously to the open end of the neutral groove 630B.

The inclined surface 643B is inclined so as to guide the brake interlocking cam portion 750B from the radially outer end 642B toward the radially inner end 641B when the brake interlock arm 600B is turned about the brake operation shaft 420B from the brake actuation position to the brake release position.

The on-braking HST-side neutral return mechanism operates as follows.

In the travel state where the speed change operating member 210B is operated into the forward travel side and the brake operating member 410B is not operated (see FIG. 25), when the brake operating member 410B starts to be operated from the brake release position toward the brake actuation position, the brake interlock arm 600B is turned about the brake operation shaft 420B from the brake release position toward the brake actuation position (counterclockwise direction in FIG. 25) so that the guide surface 640B is engaged with the brake interlocking cam portion 750B (see FIG. 26).

If the brake operating member 410B is operated further toward the brake actuation position in this state, the brake interlock arm 600B is also turned about the brake operation shaft 420B further into the brake actuation direction. Such turn of the brake interlock arm 600B causes the brake interlocking cam portion 750B to be guided by the guide surface 640B so as to be engaged into the neutral groove 630B. Accordingly, the speed change interlock arm 700B is held in a non-rotatable manner at the neutral position (see FIG. 27).

As described above, when the speed change interlock arm 700B is located at the neutral position, the speed change actuating member 230B is also held at the neutral position by the function of the speed change interlocking cam portion 650B and the speed change interlocking cam surface 660B (see FIG. 30).

As a result, the HST 30B, which is operatively connected with the speed change actuating member 230B, is maintained in the neutral state.

As described above, in the travel speed operation apparatus 100B according to the present embodiment, the speed change operation mechanism 200B is incapable of being operated in the neutral state in a state where the travel brake apparatus is brought into the brake actuation state via the brake operation mechanism 400B.

It is therefore possible to reliably prevent output of travel driving power from the HST 30B while the travel brake apparatus being in operation, which effectively prevents abrasion and damages to the travel brake apparatus and/or the HST 30B.

The travel speed operation apparatus 100B according to the present embodiment is further provided, in addition to the above components, with a neutral switch 800B that detects the neutral state of the HST 30B.

As shown in FIGS. 28 to 31, the neutral switch 800B is configured to detect whether or not the speed change interlock arm 700B is located at the neutral position.

As described above, the direction of turn of the speed change interlock arm 700B about the pivot shaft 705B upon turn of the speed change actuating member 230B from the neutral position into the forward travel side (see FIG. 28) is made identical with the direction of turn of the speed change interlock arm 700B about the pivot shaft 705B upon turn of the speed change actuating member 230B from the neutral position into the rearward travel side (see FIG. 31).

Accordingly, the HST neutral detection structure can be facilitated by the configuration of detecting the neutral state of the HST 30B by detection of the neutral position of the speed change interlock arm 700B with use of the neutral switch 800B.

In the present embodiment, the neutral switch 800B is provided as a contact switch.

Third Embodiment

Described below is a hood structure of a working vehicle according to an embodiment of the present invention. It is noted that the technical scope of the present invention is not limited to the embodiment but may be applied widely to the entire scope of the technical idea truly intended from the present invention, which will be apparent from the matters described in the specification and the drawings thereof.

Figure 32:
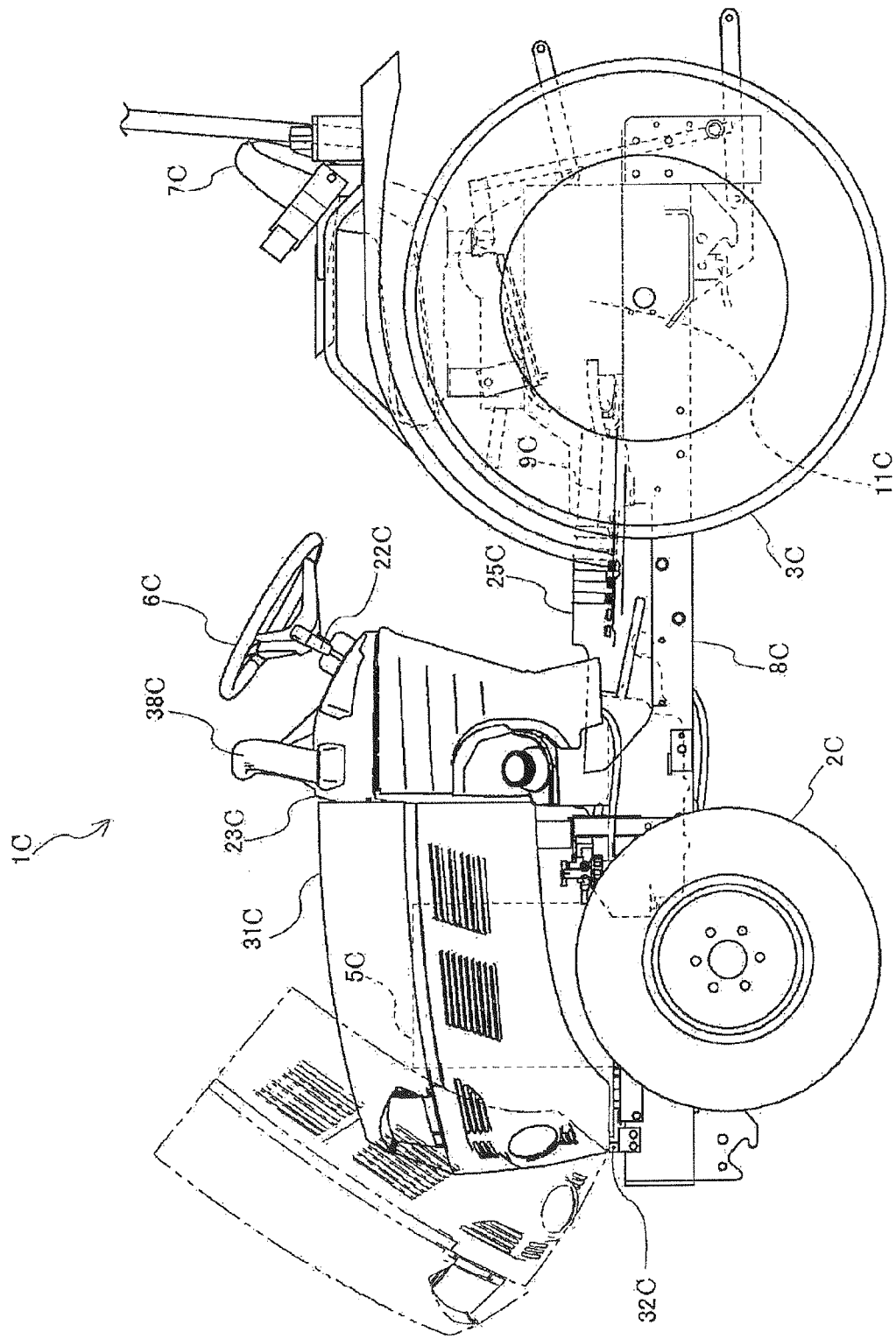
FIG. 32 is a side view of one example of a working vehicle to which a hood structure according to the present invention is applied.

FIG. 32 is a side view of a working vehicle (tractor) to which the hood structure according to the present embodiment is applied.

As shown in FIG. 32, the hood structure has a hood 31C openable about a pivot axis along the vehicle width direction. FIG. 32 indicates the positions of the closed and opened hood 31C by solid and two-dot chain lines, respectively.

Figure 33:
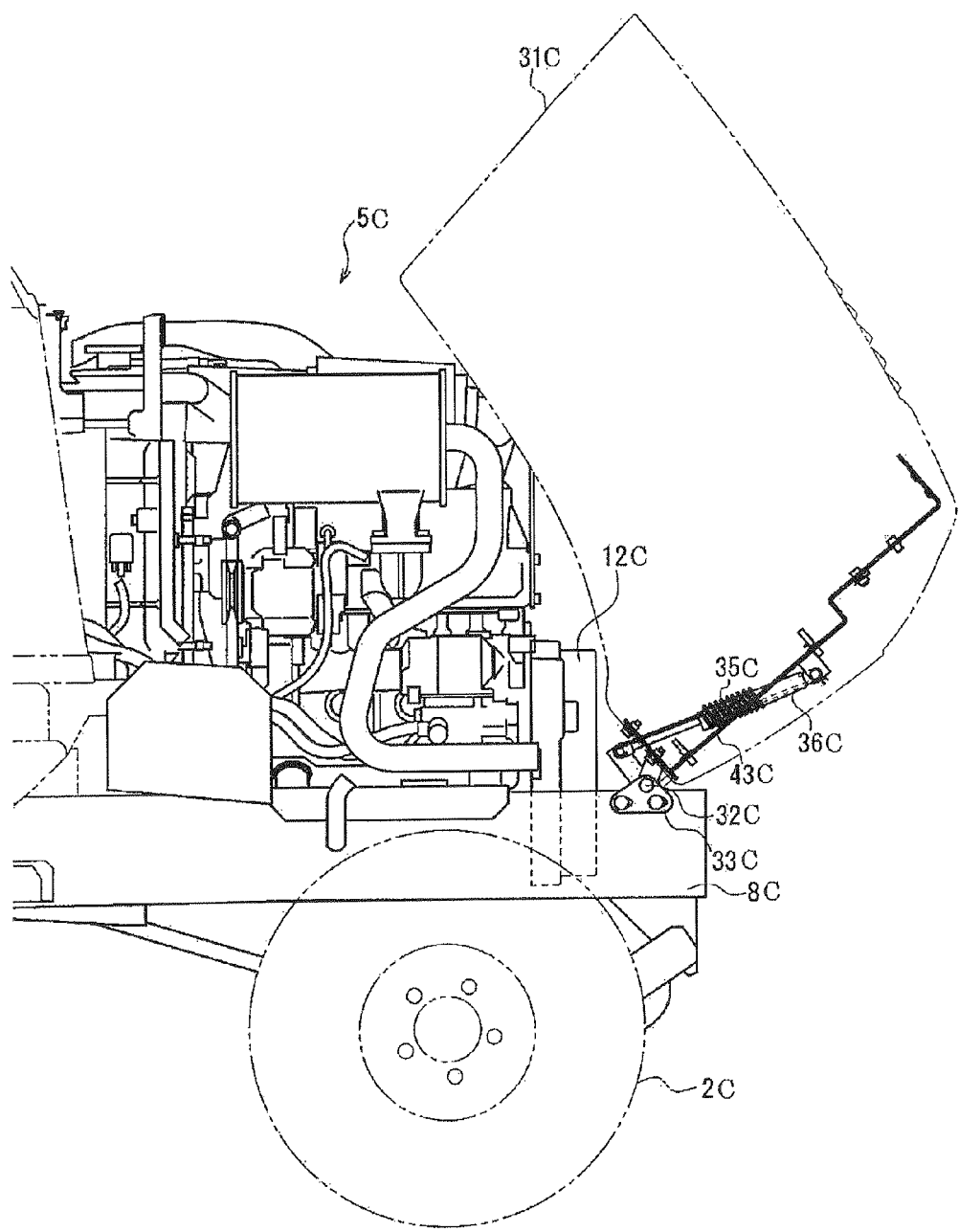
FIG. 33 is a side view of a front portion of the working vehicle in the state where the hood is located at the open position.

FIG. 33 is a side view of the front portion of the working vehicle in the state where the hood 31C is located at the open position.

Figure 34:
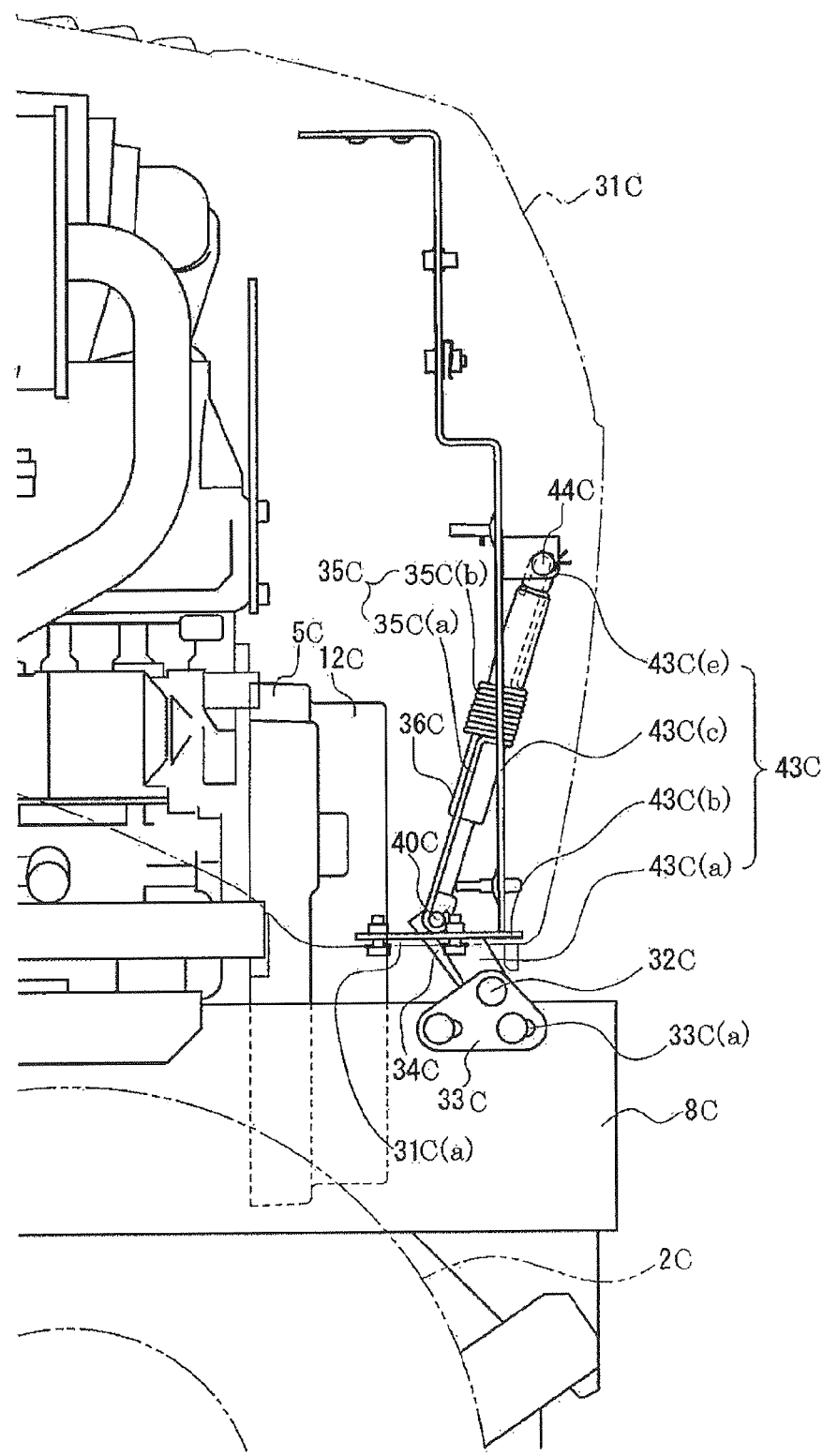
FIG. 34 is a enlarged side view of the front portion of the working vehicle in the states where the hood is located at the closed position.
Figure 35:
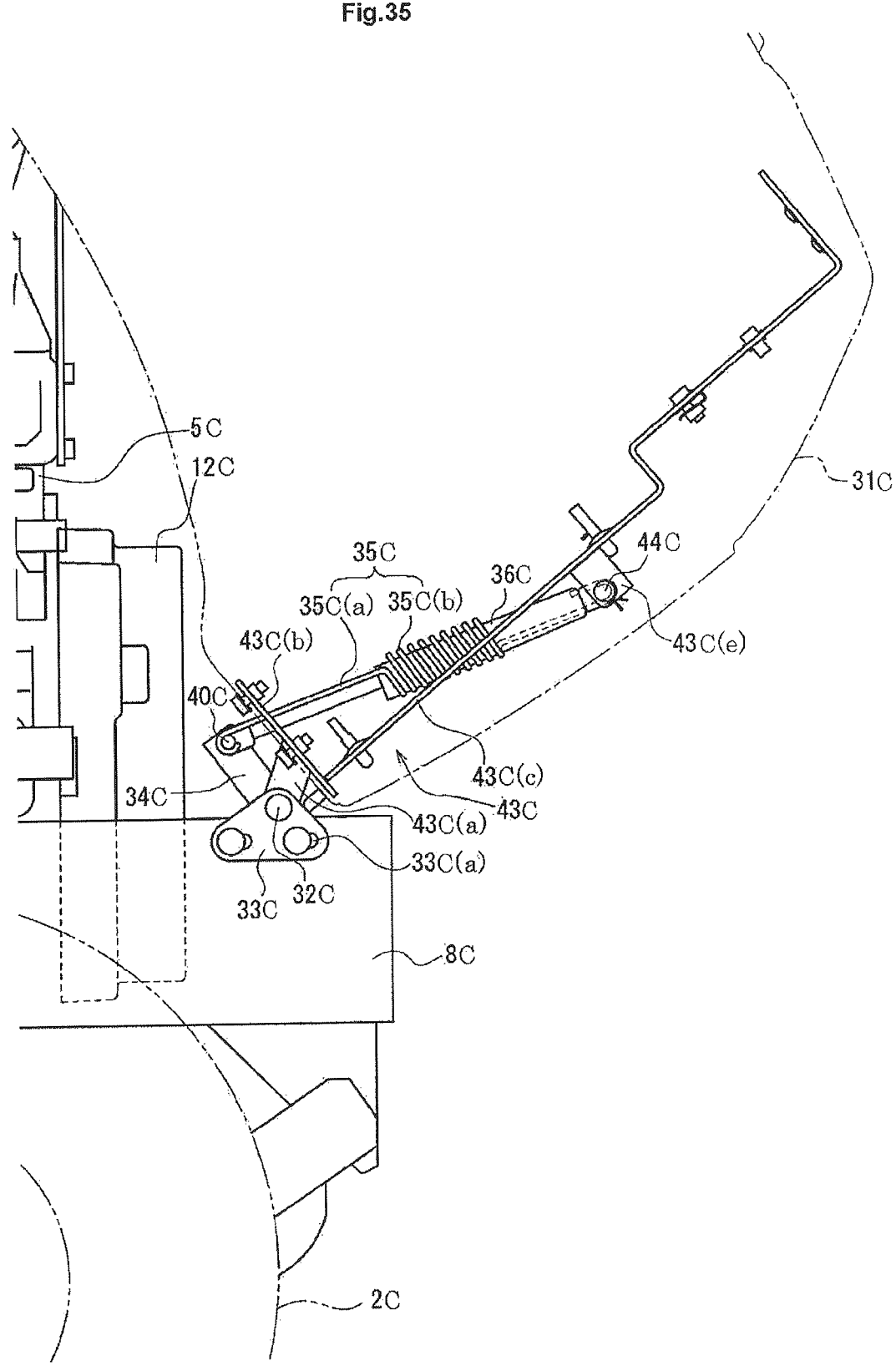
FIG. 35 is a enlarged side view of the front portion of the working vehicle in the states where the hood is located at the open position.

Further, FIGS. 34 and 35 are enlarged side views of the front portion of the working vehicle in the states where the hood 31C is located at the closed position and at the open position, respectively.

Figure 36:
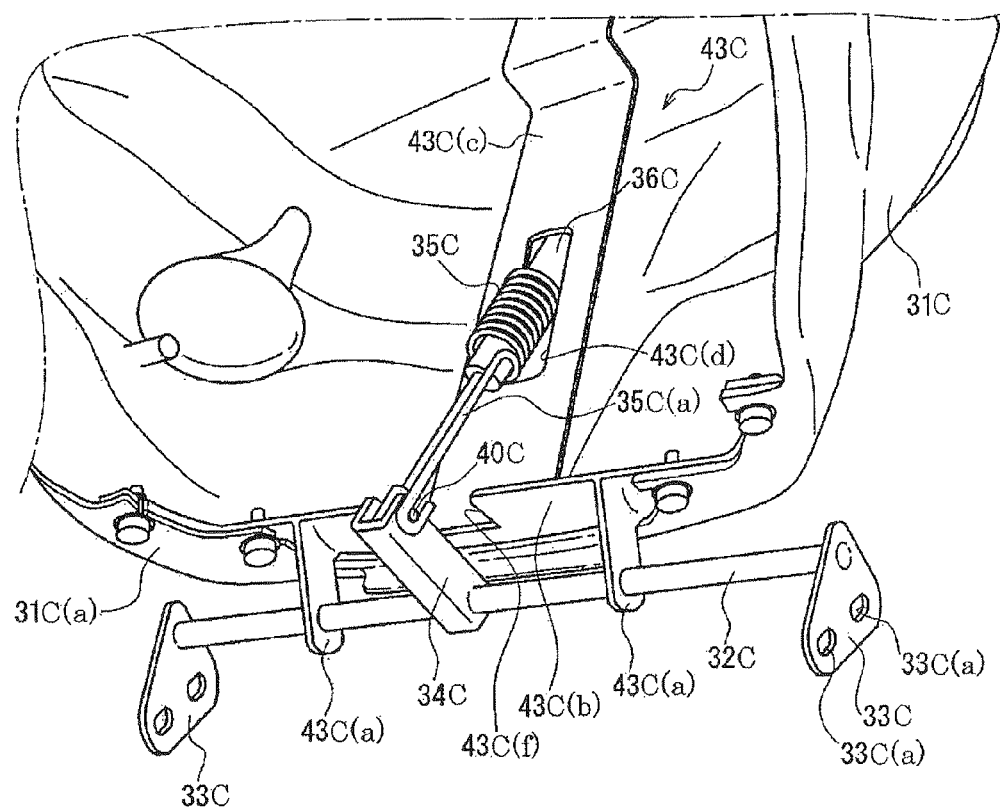
FIG. 36 is a perspective view of the hood in the state of being located at the open position.

FIG. 36 is a perspective view of the portion of the pivot axis of the hood 31C in the state where the hood 31C is located at the open position.

Firstly described is the entire configuration of the tractor 1C as one embodiment of the working vehicle to which the hood structure of the present invention is applicable. It is noted that, in the present embodiment, the terms expressing the directions of front, rear, left, and right of the vehicle indicates the directions with the forward travel direction as a reference.

As shown in FIG. 32, the tractor 1C has a vehicle body inclusive of a pair of left and right vehicle body frames 8C and 8C that are extended in the vehicle lengthwise direction, front wheels 2C and 2C as well as rear wheels 3C and 3C that are supported respectively at the front and rear portions of the vehicle body, an engine 5C that is mounted on the front portion of the vehicle body, and the hood 31C that covers the engine 5C, a radiator, a battery, and the like. The space inside the hood 31C configures an engine compartment.

The tractor 1C further includes a dashboard 23C that is disposed behind the hood 31C, and an assist grip 38C and a steering wheel 6C are projected upward from the dashboard 23C.

The tractor 1C also includes a driver's seat 7C that is disposed behind the steering wheel 6C, and there are disposed on one of sides of the driver's seat 7C a main speed change lever, a working machine elevating lever, a PTO speed change lever, and the like (not shown).

There are arranged on the dashboard 23C an instrument panel, a key switch, a forward/rearward travel switch lever 22C, and the like. Moreover, disposed below and between the dashboard 23C and the driver's seat 7C is a step 25C, on which a clutch pedal, a brake pedal, and the like are arranged.

The engine 5C is supported by the vehicle body in a vibration-preventing manner.

There is fixed a flywheel to the front portion of a crankshaft of the engine 5C, and the front portion and the outer periphery of the flywheel are covered with a flywheel cover 12 so as to be protected, as shown in FIG. 33.

Disposed at the rear portion of the crankshaft is a clutch, which is operatively connected with an input shaft of a transmission case 11C being disposed at the rear portion of the vehicle body frames 8C and 8C via a drive shaft 9C, a universal joint, and the like. With this configuration, driving power generated by the engine 5C is transmitted to the transmission case 11C.

The transmission case 11C accommodates a transmission apparatus, and the driving power from the engine 5C to the transmission case 11C is speed changed by the transmission apparatus and is then transmitted to the rear wheels 3C and 3C as well as to the front wheels 2C and 2C through a front wheel drive shaft (not shown). The driving power from the engine 5C to the transmission case 11C is transmitted also to a PTO shaft that projects rearward from the transmission case 11C.

The hood structure is described below.

As shown in FIGS. 33 to 36, the hood structure includes a pivot shaft 32C that functions as the pivot axis of the hood 31C, the hood 31C that can be located around the pivot shaft 32C at the closed position of covering the engine 5C and the open position exposing the engine 5C, and a first support body 43C that connects the hood 31C and the pivot shaft 32C so as to allow the hood 31C to be turnable about the pivot shaft 32C.

The hood 31C is supported by the pivot shaft 32C via the first support body 43C such that the center of gravity thereof is located on a virtual vertical plane passing through the pivot shaft 32C in a case where the hood 31C is located at a halfway position between the closed position and the open position.

More specifically, in a case where the hood 31C is opened or closed between the closed position and the open position that are on first and second sides around the pivot shaft 32C, the own weight of the hood 31C serves as closing biasing force of biasing the hood 31C toward the closed position on the first side around the pivot shaft 32C while the hood 31C is located between the closed position and the halfway position. On the other hand, the own weight of the hood 31C serves as opening biasing force of biasing the hood 31C toward the open position on the second side around the pivot shaft 32C while the hood 31C is located between the halfway position and the open position.

In the present embodiment, the lower front portion of the hood 31C is supported by the pivot shaft 32C via the first support body 43C.

Accordingly, the hood 31C has a box shape with a lower side and a rear side being opened, and the hood 31C is shifted to the open position by turning the rear end in a forward direction about the pivot shaft 32C from the closed position.

There is provided a lock member (not shown) in the center along the vehicle width direction at the rear portion of the hood 31C. The hood 31C can be locked at the closed position by the lock member and a support member that is provided directly or indirectly to the vehicle body frames 8C and 8C.

In the present embodiment, as shown in FIGS. 33 to 36, the pivot shaft 32C is attached to the front portions of the left and right vehicle body frames 8C and 8C via stays 33C and 33C in a state of being along the vehicle width direction.

More specifically, the stays 33C and 33C are connected respectively to the left and right vehicle body frames 8C and 8C so as to be substantially along the vertical direction.

The pivot shaft 32C is supported by the stays 33C and 33C so as to be along the vehicle width direction.

In the present embodiment, the stays 33C and 33C each have a contact portion that is brought into contact with corresponding one of the vehicle body frames 8C and 8C and an upper extending portion that is extended upward from the contact portion. The pivot shaft 32C is supported by the upper extending portions.

In the present embodiment, the stays 33C and 33C are each fixed by fixing members such as bolts to a side surface in the upper front portion of the corresponding one of the vehicle body frames 8C and 8C.

The stays 33C and 33C are preferably fixed to the vehicle body frames 8C and 8C with use of the fixing members such as bolts outside the closed hood 31C.

This configuration allows easy access to the fixing members, and pivot shaft members including the pivot shaft 32C and the stays 33C and 33C can be detached and attached integrally from/to the hood 31C.

Each of the stays 33C and 33C is formed with a bolt hole 33C(a) for allowing the bolt to be inserted therethrough, which is preferably formed as an elongated hole. Such a configuration allows the stays 33C and 33C to be fixed respectively to the vehicle body frames 8C and 8C with the positions thereof being adjustable. As a result, manufacturing errors of the hood 31C may be ignored to achieve improvement in workability of assembling the hood 31C to the vehicle body frames 8C and 8C.

According to the present embodiment, as described above, the pivot shaft 32C is supported by the vehicle body frames 8C and 8C via the stays 33C and 33C. Alternatively, it is of course possible to support the pivot shaft 32C directly by the vehicle body frames 8C and 8C.

As described earlier, the first support body 43C connects the hood 31C to the pivot shaft 32C so that the hood 31C is turnable about the pivot shaft 32C.

In other words, as shown in FIGS. 34 to 36, the hood 31C is supported by the pivot shaft 32C via the first support body 43C.

More specifically, the first support body 43C has an arm portion 43C(a) that has a proximal end supported by the pivot shaft 32C in a rotatable manner around the axis line of the pivot shaft 32C and a distal end that directly or indirectly supporting the hood 31C.

In the present embodiment, as shown in FIG. 36, the first support body 43C has, in addition to the arm portion 43C(a), a fixed horizontal portion 43C(b) that is formed integrally with the distal end of the arm portion 43C(a) and is fixed to the hood 31C.

There is formed in the proximal end of the arm portion 43C(a) an opening that allows the pivot shaft 32C to be inserted therethrough, and the arm portion 43C(a) is supported by the pivot shaft 32C at the opening in a relatively rotatable manner with respect thereto.

In the present embodiment, as shown in FIG. 36, the first support body 43C has two such arm portions 43C(a) on the left and on the right so as to be distant from each other along the axis line of the pivot shaft 32C.

The axial positions of the arm portions 43C(a) in the axis line of the pivot shaft 32C are each fixed by a locking ring (not shown).

As shown in FIG. 36, the hood 31C is provided in the lower front portion with an edge portion 31C(a) that is bent inward. The fixed horizontal portion 43C(b) is fixed to the edge portion 31C(a) with use of a plurality of fixing members such as bolts.

As shown in FIGS. 34 to 36, the hood support structure is further provided with a second support body 34C that is fixed to the pivot shaft 32C, a first biasing member 35C that has a first end connected to the second support body 34C and a second end connected directly or indirectly to the hood 31C, and a second biasing member 36C that has a first end connected to the second support body 34C and a second end connected directly or indirectly to the hood 31C.

As shown in FIG. 36, the second support body 34C has a proximal end fixed to the pivot shaft 32C and a distal end extending radially outward with the axis line of the pivot shaft 32C as a reference.

As shown in FIGS. 34 and 35, in the present embodiment, the distal end of the second support body 34C is located on a first side around the pivot shaft 32C with a virtual vertical plane passing through the pivot shaft 32C being as a reference. In other words, the second support body 34C is fixed to the pivot shaft 32C in such a manner as to project obliquely upward and rearward from the pivot shaft 32C.

As shown in FIG. 36, the second support body 34C is fixed to the pivot shaft 32C at the substantially center in the axis line of the pivot shaft 32C between the pair of arm portions 43C(a).

In the present embodiment, the second support body 34C is formed by bending a plate substantially into a U-letter shape in cross section with a pair of side surfaces and an end surface connecting corresponding ends of the pair of side surfaces.

The second support body 34C is provided at the proximal end of each of the side surfaces with an axial hole that is opened along the vehicle width direction. More specifically, the second support body 34C is fixed by welding or the like to the pivot shaft 32C inserted through the axial holes substantially at the center in the vehicle width direction thereof with the distal end being located on the first side around the pivot shaft 32C with the virtual vertical plane as a reference.

The first biasing member 35C generates closing biasing force that biases the hood 31C into the first direction, namely, into the closed direction, around the pivot shaft 32C, and the closing biasing force is increased in proportion to the turn of the hood 31C into the second direction, namely, into the open direction around the pivot shaft 32C.

In the present embodiment, as shown in FIGS. 33 to 36, the first biasing member 35C is configured as a tension spring.

The tension spring has a first end connected to the second support body 34C.

More specifically, the tension spring has a coil portion 35C(b) and a pair of linear bar portions 35C(a) that respectively extend from opposite ends of the coil portion 35C(b) into opposite directions. There is provided a locking portion at a distal end of each of the pair of bar portions 35C(a).

The locking portion of one of the pair of bar portions 35C(a) is connected to the second support body 34C via a support pin 40C.

More specifically, there is formed, at each of the distal ends of the pair of side surfaces of the second support body 34C, a pin hole that is opened in the vehicle width direction. The support pin 40C is fixed to the second support body 34C by way of a fixing member such as a snap pin or a C-ring while being inserted through the pin holes. The locking portion of one of the pair of bar portions 35C(a) in the tension spring is engaged with the support pin 40C.

The second end of the tension spring is connected directly or indirectly to the hood 31C so that the distance between the first and second ends is gradually increased as the hood 31C is turned about the pivot shaft 32C from the closed position toward the open position.

More specifically, the second end of the tension spring is connected directly or indirectly to the hood 31C so as to be located on the second side around the pivot shaft 32C with a virtual plane connecting the first end of the tension spring and the pivot shaft 32C being as a reference in the entire opening and closing range of the hood 31C.

In the present embodiment, as shown in FIGS. 34 and 35, while the first end of the tension spring that is connected to the second support body 34C is fixed at a position on the first side around the pivot shaft 32C with the virtual vertical plane as a reference, the second end of the tension spring that is supported directly or indirectly by the hood 31C is turned about the pivot shaft 32C together with the hood 31C on the second side around the pivot shaft 32C with the virtual vertical plane as a reference.

The second biasing member 36C always generates opening biasing force that biases with a constant magnitude the hood 31C toward the open position on the second side around the pivot shaft 32C.

In other words, the second biasing member 36C biases with a constant magnitude the hood 31C toward the second side around the pivot shaft 32C irrespective of the position of the turning hood 31C.

In the present embodiment, the closing biasing force of the first biasing member 35C is made equal to the sum of the opening biasing force caused by the own weight of the hood 31C and the opening biasing force of the second biasing member 36C in the case where the hood 31C is located at the open position.

More specifically, as described above, the first biasing member 35C is configured to gradually increase the closing biasing force as the hood 31C is turned from the closed position toward the open position. The maximum closing biasing force is thus generated when the hood 31C is located at the open position.

The maximum closing biasing force is set to be equal to the sum of the opening biasing force caused by the own weight of the hood 31C and the opening biasing force applied by the second biasing member 36C in the case where the hood 31C is located at the open position.

Such a configuration allows the hood 31C to be held at the open position with no provision of an open position hold mechanism such as a support rod exclusive for holding the hood 31C at the open position.

Furthermore, this configuration prevents as much as possible that the first biasing member 35C and the second biasing member 36C adversely affect the opening and closing of the hood 31C.

As described above, the closing biasing force of the first biasing member 35C is gradually increased as the hood 31C is opened from the first side toward the second side around the pivot shaft 32C. In other words, out of area through which the hood 31C passes through when being operated from the closed position to the open position, in a range from the closed position to the halfway position where the own weight of the hood 31C is applied into the closing direction, the closing biasing force applied by the first biasing member 35C is not significantly increased. Accordingly, it is possible to prevent as much as possible that the first biasing member 35C adversely affects the opening of the hood 31C.

On the other hand, in the case where the hood 31C is located at the open position, the first biasing member 35C applies the maximum closing biasing force. As a result, the hood 31C can be easily closed irrespective of the opening biasing force applied by the second biasing member 36C.

In the present embodiment, as described earlier, the first biasing member 35C is provided as the tension spring.

In this configuration, the tension spring preferably has substantially a natural length in the case where the hood 31C is located at the closed position.

The configuration makes it possible to reduce as much as possible closing biasing force that has been generated by the tension spring upon opening the hood 31C from the closed position toward the open position. As a result, the hood 31C can be opened more easily.

In the present embodiment, the second biasing member 36C is provided as a gas spring.

Accordingly, the hood 31C can be opened and closed slowly due to the buffering effect of the gas spring.

The gas spring is of the single rod type including a cylinder portion filled with gas and an arm portion that has a proximal end accommodated in the cylinder portion in a reciprocable manner and a distal end extending outward from the cylinder portion.

One of the cylinder portion and the arm portion (the arm portion in the present embodiment) is connected to the second support body 34C, and the remaining one (the cylinder portion in the present embodiment) is connected directly or indirectly to the hood 31C.

It is of course possible to adopt, in place of the gas spring of the single rod type, a gas spring of the double rod type including a cylinder portion and a pair of rod portions extending into opposite directions respectively from opposite ends of the cylinder portion.

Further alternatively, it is possible to adopt a hydraulic damper or the like in place of the gas spring.

As shown in FIGS. 34 to 36, in the present embodiment, the tension spring is mounted to surround the gas spring, thereby achieving a compact configuration in comparison to a configuration in which the tension spring and the gas spring are provided in parallel to each other.

Further, in the configuration in which the tension spring is mounted to surround the gas spring, the opposite ends of the tension spring are disposed close to the opposite ends of the gas spring, respectively. As a result, it is possible to facilitate connecting work of the tension spring and the gas spring.

As shown in FIGS. 34 and 35, in the present embodiment, the first ends of the tension spring and the gas spring are connected to the second support body 34C, while the second ends thereof are connected to the hood 31C via the first support body 43C.

More specifically, as shown in FIGS. 34 to 36, the first support body 43C is provided, in addition to the left and right arm portions 43C(a) and the fixed horizontal portion 43C(b), with a fixed vertical portion 43C(c) that has a plate shape and extends upward from the fixed horizontal portion 43C(b) while being spaced apart from the inner surface of the front end of the hood 31C.

The fixed vertical portion 43C(c) is disposed in the center of the vehicle width direction, and the upper portion of the fixed vertical portion 43C(c) is fixed to the inner surface of the front end of the hood 31C by a fixing member such as a bolt.

As shown in FIGS. 34 to 36, the fixed vertical portion 43C(c) is provided at a vertically halfway portion with an opening 43C(d) that penetrates in the vehicle lengthwise direction, as well as a support stay 43C(e) that is extended oppositely with respect to the second support body 34C from a surface opposite to the second support body 34C (the front surface in the present embodiment) above the opening 43C(d).

The first biasing member 35C and the second biasing member 36C are configured so that the first ends are connected to the second support body 34C and the second ends (in the present embodiment, the locking portion of the remaining one of the pair of bar portions 35C(a) of the tension spring and the cylinder portion of the gas spring) are connected to the support stay 43C(e) in a state where the first and second biasing members 35C and 36C are inserted through the opening 43C(d).

The configuration where the tension spring and the gas spring are inserted through the opening 43C(d) so as to extend obliquely across the fixed vertical portion 43C(c) makes it possible to arrange the tension spring and the gas spring in a compact manner within the front end of the hood 31C.

In the configuration shown in the drawings, the support stay 43C(e) is provided with a support pin 44 along the vehicle width direction, and the cylinder portion of the gas spring is pivotally supported by the support pin 44 and the locking portion of the remaining one of the pair of bar portions 35C(a) of the tension spring is engaged with the support pin 44.

It is of course possible to form a cutout in place of the opening 43C(d).

As apparently shown in FIG. 36, the fixed horizontal portion 43C(b) can be preferably formed with a cutout 43C(f) that is opened to the edge close to the second support body 34C at the center in the vehicle width direction.

In this configuration, the tension spring and the gas spring can be disposed compactly while preventing the tension spring and the gas spring from interrupting the fixed horizontal portion 43C(b) in the case where the hood 31C is opened or closed.

What is claimed is:
1. A working vehicle comprising:
   a brake operation structure;
   a friction-plate type brake mechanism that has group of friction plates and a brake pressing member and is configured so that, in accordance with rotation of the brake pressing member about a rotational axis line into a brake actuation direction, the group of friction plates are brought into frictional contact with each other to operatively apply braking power to a drive axle;
   a transmission case that accommodates the brake mechanism;
   a driver's seat that is supported on an upper surface of the transmission case via a driver's seat support frame; and
   a fender that covers a side of the driver's seat;
   the brake operation structure comprising:
   a brake operation mechanism that rotates the brake pressing member about the rotational axis line into the brake actuation direction in accordance with manual operation; and a brake adjustment mechanism that adjusts an initial position of the brake pressing member around the rotational axis line at a time when the brake operation mechanism is not in operation;

the brake operation structure being characterized in that, the brake adjustment mechanism is inserted in the brake operation mechanism at a position allowing the brake adjustment mechanism to be accessed from above the fender trough through an opening that is provided at the fender for allowing the driver's seat support frame to be mounted.

2. A working vehicle comprising:

a brake operation structure;

a friction-plate type brake mechanism that has group of friction plates and a brake pressing member and is configured so that, in accordance with rotation of the brake pressing member about a rotational axis line into a brake actuation direction, the group of friction plates are brought into frictional contact with each other to operatively apply braking power to a drive axle;

a transmission case that accommodates the brake mechanism;

a driver's seat that is disposed above the transmission case;

a fender that covers a side of the driver's seat and to which a lever guide member is detachably mounted so as to cover a lever opening formed in the fender; and a speed change lever that is disposed so that grip portion thereof is positioned beside the driver's seat and above the fender trough a guide hole formed in the lever guide member;

the brake operation structure comprising:

a brake operation mechanism that rotates the brake pressing member about the rotational axis line into the brake actuation direction in accordance with manual operation; and a brake adjustment mechanism that adjusts an initial position of the brake pressing member around the rotational axis line at a time when the brake operation mechanism is not in operation;

the brake operation structure being characterized in that, the brake adjustment mechanism is inserted in the brake operation mechanism at a position allowing the brake adjustment mechanism to be accessed from above the fender through the lever opening that appears by detaching the lever guide member from the fender.

\* \* \* \* \*

UNITED STATES PATENT AND TRADEMARK OFFICE
CERTIFICATE OF CORRECTION

PATENT NO. : 8,485,304 B2
APPLICATION NO. : 12/678633
DATED : July 16, 2013
INVENTOR(S) : Toshikazu Matsubayashi It is certified that error appears in the above-identified patent and that said Letters Patent is hereby corrected as shown below:

In the Claims

In column 57, line 9 (claim 1): "fender trough through an opening" should be replaced with --fender through an opening--.

Signed and Sealed this
Fifth Day of November, 2013

Teresa Stanek Rea
*Deputy Director of the United States Patent and Trademark Office*